US008143603B2

(12) United States Patent
Suhara et al.

(10) Patent No.: US 8,143,603 B2
(45) Date of Patent: Mar. 27, 2012

(54) ELECTROSTATIC LATENT IMAGE MEASURING DEVICE

(75) Inventors: Hiroyuki Suhara, Yokohama (JP); Nobuaki Kubo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 335 days.

(21) Appl. No.: 12/390,243

(22) Filed: Feb. 20, 2009

(65) Prior Publication Data

US 2009/0220256 A1 Sep. 3, 2009

(30) Foreign Application Priority Data

Feb. 28, 2008 (JP) ................................ 2008-048761
Mar. 13, 2008 (JP) ................................ 2008-064114

(51) Int. Cl.
*G03G 15/00* (2006.01)
*G01N 27/60* (2006.01)

(52) U.S. Cl. .................. 250/492.2; 250/492.1; 250/397; 250/398; 430/48; 430/50; 430/56

(58) Field of Classification Search ............... 250/492.1, 250/492.2, 397, 398; 355/67; 399/159; 430/48, 430/50

See application file for complete search history.

(56) References Cited

U.S. PATENT DOCUMENTS 5,294,944 A 3/1994 Takeyama et al.
5,374,980 A 12/1994 Kubo et al.
6,372,397 B1 * 4/2002 Maruyama et al. .......... 430/59.6
6,416,915 B1 * 7/2002 Kikuchi et al. ................ 430/56
7,403,316 B2 7/2008 Amada
7,550,238 B2 * 6/2009 Ohshima et al. ........... 430/58.05
7,560,204 B2 * 7/2009 Toda et al. ................. 430/58.05
7,563,553 B2 * 7/2009 Kikuchi et al. ............... 430/130
7,612,570 B2 * 11/2009 Suhara ..................... 324/754.22
7,653,339 B2 * 1/2010 Yamashita et al. ............ 399/346
7,764,906 B2 * 7/2010 Niimi ............................ 399/159
7,785,762 B2 * 8/2010 Niimi ......................... 430/125.2
7,838,188 B2 * 11/2010 Mori et al. ................... 430/58.7
7,846,635 B2 * 12/2010 Niimi ....................... 430/123.43
7,862,969 B2 * 1/2011 Suzuki et al. ................ 430/58.7
7,894,750 B2 * 2/2011 Inaba et al. ................... 399/159
2005/0238987 A1 * 10/2005 Ohshima et al. .............. 430/125
2005/0287452 A1 * 12/2005 Tamura et al. ............... 430/58.7
2006/0198659 A1 * 9/2006 Niimi ............................ 399/128
2006/0292480 A1 * 12/2006 Niimi ............................ 430/124
2007/0172752 A1 * 7/2007 Niimi ....................... 430/123.43
2007/0212625 A1 * 9/2007 Suzuki et al. ................ 430/58.7
2007/0231720 A1 * 10/2007 Mori et al. ................... 430/58.7
2007/0292780 A1 * 12/2007 Nagai et al. .................. 430/58.2
2008/0031653 A1 * 2/2008 Niimi ............................ 399/111
2008/0056746 A1 3/2008 Suhara
2008/0100895 A1 5/2008 Hayashi et al.

(Continued)

FOREIGN PATENT DOCUMENTS

JP 3-29867 2/1991

(Continued)

*Primary Examiner* — David A Vanore
(74) *Attorney, Agent, or Firm* — Dickstein Shapiro LLP

(57) ABSTRACT

An electrostatic latent image measuring device includes a charged particle optical system which irradiates an electron beam and charges a photoconductor sample, an exposure optical system which forms an electrostatic latent image on a surface of the photoconductor sample, and a scanning unit which scans the surface of the photoconductor sample by the electron beam, a distribution of the electrostatic latent image on the surface of the sample being measured by a signal detected by the scanning.

14 Claims, 33 Drawing Sheets

U.S. PATENT DOCUMENTS

| | | | | |
|---|---|---|---|---|
| 2008/0123159 | A1 | 5/2008 | Hayashi et al. | |
| 2008/0170282 | A1 | 7/2008 | Amada et al. | |
| 2008/0219601 | A1 | 9/2008 | Arai et al. | |
| 2010/0196049 | A1* | 8/2010 | Niimi | 399/159 |

FOREIGN PATENT DOCUMENTS

| | | |
|---|---|---|
| JP | 3-49143 | 3/1991 |
| JP | 3-200100 | 9/1991 |
| JP | 11-184188 | 7/1999 |
| JP | 3009179 | 12/1999 |
| JP | 2002-103355 | 4/2002 |
| JP | 2003-295696 | 10/2003 |
| JP | 2003-305881 | 10/2003 |
| JP | 2004-251800 | 9/2004 |
| JP | 2005-166542 | 6/2005 |
| JP | 3854707 | 9/2006 |
| JP | 2006-294515 | 10/2006 |
| JP | 2008-233376 | 10/2008 |

* cited by examiner 1 by 1

2 by 2

1dot LATTICE

EXPOSURE MASK PATTERN

OBTAINED LATENT IMAGE

EXPOSURE PATTERN

EXPOSURE MASK PATTERN

A: BEAM SPOT DIAMETER

B: LATENT IMAGE DIAMETER

D: LATENT IMAGE DEPTH

ELECTROSTATIC LATENT IMAGE MEASURING DEVICE

PRIORITY CLAIM

The present application is based on and claims priorities from Japanese Patent Applications No. 2008-048761, filed on, Feb. 28, 2008, and No. 2008-064114, filed on Mar. 13, 2008, the disclosures of which are hereby incorporated by reference in their entirety.

BACKGROUND OF THE INVENTION

1. Field of the Invention

The present invention relates to an electrostatic latent image measuring device, an electrostatic latent image measuring method, and an image forming device, which measure a surface potential distribution and a surface charge distribution of a photoconductor and analyze the surface.

2. Description of the Related Art

An electrophotographic image forming device such as a copying machine or a printer uses a photoconductor.

The following processes are performed relative to the photoconductor.

A charging process which uniformly charges the electrophotographic photoconductor.

An exposing process irradiates light corresponding to an image onto the uniformly charged photoconductor, removes the charge in the portion onto which the light is irradiated, and forms an electrostatic latent image.

A developing process, which forms a visible image by toner on the electrostatic latent image by transferring charged fine particles (hereinafter, referred to as toner) onto the above charged portion.

A process which transfers the visualized (developed) toner image on paper or another transfer member.

A process which fuses the toner forming a transfer image on paper or a transfer member.

A cleaning process which cleans the residual toner on the photoconductor after transferring the toner image on paper or a transfer member.

A process which eliminates an electric charge remaining on the photoconductor.

The photoconductor is the heart of the image forming device. By analyzing the influences from the above processes to the photoconductor, an essential problem for forming an image can be discovered.

Moreover, solving the essential problem may lead to a new invention or new discovery.

Since a process factor and a process quality in the above processes significantly affect a quality of an output image, it is required to directly observe the photoconductor in some way for evaluating the processes.

Thereby, the quality of the final output image can be directly analyzed. It is also expected that a significant response or suggestion can be obtained regarding an improvement in the quality of the processes.

More particularly, the above processes are performed to the photoconductor, and a method of analyzing these processes is introduced. Thereby, the formation of the latent image on the surface of the photoconductor can be analyzed, and it is expected to obtain extremely important information for obtaining a high quality image by directly or indirectly evaluating the quality of the electrostatic latent image after exposing.

By understanding a mechanism in which exposure light is converted into an electrostatic latent image, the information to be obtained from the electrostatic latent image can be used for designing and developing an optical system for exposing. It is expected that an image forming device which can form a high quality image at low cost, for example, can be designed.

However, it is extremely difficult to measure an electrostatic latent image, and an actual image forming device can not measure the electrostatic latent image at present.

For example, as a method of measuring an electrostatic latent image, an SPM (scanning probe microscope) is introduced. In such a device, a head sensor such as a cantilever is moved closer to a sample having an electric potential distribution, and the electrostatic attractive force and the dielectric current generated by the mutual influence between the electrostatic latent image and the cantilever are measured, and then these are converted into the electric potential distribution. However, a method of measuring an electrostatic latent image which visually displays the results of the measurement has not been obtained yet.

As a dielectric current type device, inventions described in JP3009179B and JP H11-184188A are known.

However, in these devices, it is necessary to move the head sensor closer to the sample. In order to obtain a spatial resolution of 10 μm, for example, it is necessary to set the distance between the sensor and the sample to 10 μm or below.

Accurate distance measurement is required for setting such a condition, and the measurement needs to be performed many times.

In the measurement method performed many times, an actual electrostatic latent image can not be measured because natural discharge or absorption of a substance occurs during the measurement, and the condition of the latent image varies from hour to hour during the measurement by the influence of the sensor itself, so that the real-time condition of the electrostatic latent image can not be obtained.

As a more realistic measurement method, a method of applying an electric charge to coloring toner, visualizing (developing) an electrostatic latent image by absorbing the charged coloring toner onto the electrostatic latent image with a coulomb force, and transferring the toner image on paper or a tape, can be adopted.

However, in these methods, since the development and transfer processes are conducted, the electrostatic latent image is not directly measured.

To the present inventor's knowledge, a method which directly picks up various events on the surface of the photoconductor has not been developed yet.

On the other hand, a method of measuring an electric potential pattern using an electron beam is conventionally known.

This method is used for analyzing failure of an LSI. In this method, it is necessary for the sample to be a conductor.

However, considering a conductive property of a semiconductor such as Si, the material of the photoconductor is rather an insulating material, so that such a measuring method can not be applied to measure a photoconductor sample.

In the conductive sample, the electric potential distribution can be maintained for a long period of time by applying a constant current, a low voltage of about 5V is applied, and also the range is narrow. Therefore, a charge-up phenomenon does not occur.

Accordingly, if an electric beam is irradiated onto such a conductive sample, a problem regarding the measurement does not occur in the photoconductor in which the above electric potential changes.

For this reason, this method can not be directly applied to a general photoconductor.

In a general dielectric body, an electric charge can be semipermanently maintained. However, in the photoconductor, the electric charge can not be maintained for a long period of time because the photoconductor has some conductive property, so that the surface potential of the photoconductor is lowered by dark decay with time.

Since a time of which the photoconductor maintains an electric charge is about several tens of seconds at most even in a dark room, when trying to observe an electrostatic latent image in a scanning electron microscope after charging and exposing, the electrostatic latent image formed on the photoconductor sample disappears in the preparation step, so that the electrostatic latent image can not be observed.

The photoconductor for use in an electrophotographic process generally has a cylindrical shape.

It is desired to measure the distribution of the electrostatic latent image on the cylindrical photoconductor at high resolution without destroying the distribution.

It is also desired to provide a new technique such as a device which evaluates the change in the electrostatic latent image of the photoconductor by the time degradation associated with the use of a unit for generating an electric charge distribution on the photoconductor, a device which forms an electrostatic latent image, a measuring method and the like.

In addition, the applicants of the present application have already filed an invention regarding the above new technique (reference to JP2006-294515A, for example).

It is known that the electric charge is spatially scattered in the sample.

For this reason, the surface charge described herein means a condition in which the electric charge distribution is large in the in-plane direction compared to that in the thickness direction.

The concept of the electric charge includes not only an electron but also an ion.

The surface charge also means a condition in which the surface includes a conductive portion, and an electric potential distribution is generated on the surface of the sample or the vicinity thereof by applying a voltage to the conductive portion.

Conventionally, as a method which measures a surface potential of a photoconductor or the like, there is a method which moves a sensor head closer to a sample having electric potential distribution, measures an electrostatic attractive force and an induction current resulting from the mutual influences, and converts the electrostatic attractive force and the induction current into an electric potential distribution.

In this method, the resolution is low at about several millimeters, and 1 micron resolution can not be obtained.

A method which measures an electric potential in 1 micron order by means of an electron beam is conventionally known as a method which evaluates an LSI chip.

However, this evaluation is conducted on a conductive portion in the LSI in which a current flows, the electric potential is low at about +5V, and also an electric potential is limited. Therefore, this evaluation can not be conducted on a negative electric charge of several hundred to several thousand V, which is a target to be measured in the present invention.

A method which observes an electrostatic latent image by means of an electron beam is described in JP H03-049143A, for example.

In the conventional observation method, a sample is limited to an LSI chip or a sample capable of storing and maintaining an electrostatic latent image.

Namely, an electrostatic latent image formed on a general photoconductor in which dark decay occurs can not be measured.

Since a general dielectric body semi-permanently maintains an electric charge, even if time-consuming measurement is conducted after forming an electric charge distribution, the result of the measurement is not affected.

However, since the resistance value of the photoconductor is not infinity, the electric charge can not be maintained for a long period of time in the photoconductor. For this reason, the dark decay occurs, and then the surface potential is decreased with time.

A time of which the photoconductor can maintain the electric charge is several tens of seconds at most.

Consequently, when trying to observe an electrostatic latent image in a scanning electron microscope (SEM) after charging and exposing, the electrostatic latent image is disappeared in the preparation stage.

In the invention described in JP H03-200100A, not only is a wavelength used different, but also a latent image of a beam profile, a desired beam diameter and no line pattern can not be formed.

As a result, the present inventors invented a method which measures an electrostatic latent image even on a photoconductor sample having dark decay (refer to, for example, JP H03-200100A and JP 2003-295696A).

If the surface of the sample includes an electric charge distribution, an electric field distribution according to the electric charge distribution on the surface is formed in a space.

The secondary electron generated by the incident electrons is thereby brought back by the electric field, and the number of electrons which reach a detector is reduced.

Therefore, a contrast image according to the electric charge distribution on the surface, in which a portion having a strong electric field is dark and a portion having a weak electric field is bright, can be detected.

When exposing, the exposed portion becomes black and the non-exposed portion becomes white, and the electrostatic latent image formed by the exposure can be measured.

In the meanwhile, there is a method which forms an electrostatic latent image by turning on and turning off a semiconductor laser having a wavelength from a visible light area to an infrared light area (hereinafter, referred to as a LD (laser diode)) as an exposure light source for forming an electrostatic latent image.

The semiconductor laser oscillates a laser by applying a reference driving current or more, and a constant reference driving current or below (bias current) is always applied to the semiconductor laser even during the time of turning-off.

If the bias current is supplied to the semiconductor laser, the semiconductor laser emits light by an emission mechanism similar to that of an LED.

This means that the semiconductor laser emits light even in the turning-off condition when the bias current is supplied.

In this case, the light volume is weak, so this light volume does not affect the electrostatic latent image when the irradiation time is short.

However, if the irradiation time is long, the integrated light volume is increased. If the integrated light volume reaches a required exposure amount, the electrostatic latent image is formed.

As a result, a desired electrostatic latent image can not be formed.

For this reason, in order to form a desired electrostatic latent image, it is necessary to control the irradiation time of light to be irradiated on the sample by the emission with the bias current in the turning-off period.

As another problem, there is a problem that the scanning area is changed if the sample is charged.

By the electric charge on the surface of the sample, the electric field in the device is changed, and the orbit of the scanning electron is curved.

For this reason, if data is loaded as an image with a condition which is the same as the condition in the non-charging, the size of the image is slightly different from the size of the actual image.

Accordingly, it is required to accurately measure the coordinate of the sample from the loaded data.

It is difficult to previously estimate the amount of change in the scanning area because various conditions such as a charging electric potential and a height of a sample are changed.

A conventional method of measuring an electrostatic latent image includes a method of correcting image data according to a reference sample in which a size of a hole and a projection are previously known.

However, since the standard material is generally a conductive sample, the standard sample can not be charged.

An insulated sample can be charged, but a desired charging electric potential can not be applied to a desired area which becomes a standard, and the electric charge can not be removed in the insulated sample.

A sample from which an electric charge can be removed includes a photoconductor sample. However, the photoconductor sample is easily affected by electrostatic fatigue and light fatigue, so that the charging condition is changed, and the photoconductor sample can not be used as the standard sample.

A method which provides a projection on a sample or damages a sample for use as a standard sample is not appropriate because it damages the sample (refer to, for example, JP2004-251800A and JP2008-233376A).

SUMMARY OF THE INVENTION

It is, therefore, an object of the present invention to provide an electrostatic latent image measuring device and an electrostatic latent image measuring method which can measure a size of an electrostatic latent image with high accuracy by measuring a coordinate of a sample relative to the change in an observation area by electrification without damaging the sample, and an image forming device having an image carrier measured by using the electrostatic latent image measuring device and the electrostatic latent image measuring method.

It is also an object of the present invention to provide an electrostatic latent image measuring device, an electrostatic latent image measuring method and an image forming device which irradiate a charged particle beam and form an electrostatic latent image on a photoconductor, and measures the photoconductor condition having the electrostatic latent image in a short time and with high resolution without causing damage.

In order to achieve the above object, the present invention relates to an electrostatic latent image measuring device including a charged particle optical system which irradiates an electron beam and charges a photoconductor sample, an exposure optical system which forms an electrostatic latent image on a surface of the photoconductor sample, and a scanning unit which scans the surface of the photoconductor sample by the electron beam, a distribution of the electrostatic latent image on the surface of the sample being measured by a signal detected by the scanning.

Preferably, the exposure optical system includes a semiconductor laser as a light source, and a luminous flux of the light source is irradiated outside an electron beam scanning area of the photoconductor sample.

Preferably, the exposure optical system includes a semiconductor laser as a light source, and the optical system includes a shutter which shields offset emission by a bias current of the semiconductor laser.

Preferably, the electrostatic latent image measuring device further includes a unit which opens the shutter in connection with a synchronization signal of the exposure optical system.

Preferably, the electrostatic latent image measuring device further includes a unit which opens the shutter and closes the shutter after forming the electrostatic latent image with the detected synchronization signal of the exposure optical system as a trigger signal.

Preferably, the electrostatic latent image measuring device further includes a unit which illuminates the semiconductor laser Td+Tr late after receiving a synchronization signal as a trigger output, where a time to start opening the shutter after detecting the synchronization signal is Td and a time to open an effective diameter of a laser light after the start of the opening of the shutter is Tr.

Preferably, a condition, Tr<Tf*Pon/Poff is satisfied, where one scanning time by the exposure optical system is Tf, the light volume of the offset emission by the bias current when turning off the semiconductor laser is Poff, and the light volume when illuminating the semiconductor laser is Pon.

Preferably, the shutter is a mechanical shutter.

Preferably, the shutter is disposed outside a vacuum chamber so as to control noise by a change in an electromagnetic field.

Preferably, the electrostatic latent image measuring device further includes a unit which measures the distribution of the electrostatic latent image under a condition having an area where a component in a normal direction of the surface of the photoconductor sample of a speed of the incident charged particle reverses.

The present invention also relates to an electrostatic latent image measuring device including a unit which irradiates an electron beam to a photoconductor sample, and charges the photoconductor sample, an exposure optical system which forms an electrostatic latent image on a surface of the photoconductor sample, the surface of the sample being scanned by the electron beam, and a distribution of the electrostatic latent image of the surface of the photoconductor sample being measured by a signal detected by the scanning, a unit which forms a pattern of the electrostatic latent image having a known size on the surface of the photoconductor sample by irradiating light whose wavelength is 400-800 nm, a unit which loads a latent image obtained as the electrostatic latent image, and a unit which measures a coordinates of the photoconductor sample.

The present invention is also relates to an electrostatic latent image measuring device including a vacuum chamber of an exposure optical system located separately from the vacuum chamber, a sample stage which locates a sample in a predetermined position of the vacuum chamber, a driving unit located outside the vacuum chamber which drives the sample stage, wherein scanning light from the exposure optical system enters from a window provided in a shoulder portion of the vacuum chamber, the sample in the vacuum chamber is scanned by a scanning unit of the exposure optical system, and a light-shielding member and a mechanical shutter are provided between the exposure optical system and the window provided in the shoulder portion of the vacuum chamber.

Preferably, the light-shielding member includes a cylindrical opening, and the opening includes a positioning and fastening section which is coaxial with an opening of the mechanical shutter.

Preferably, the exposure optical system includes a first adjuster which adjusts an irradiation position of light from a light source irradiating the sample placed on the vacuum chamber from an elevation direction of about 45°.

Preferably, the exposure optical system includes a second adjuster which adjusts the scanning light in a predetermined range and can adjust the exposure optical system in an incident axis direction or a horizontal direction.

Preferably, the exposure optical system includes an optical scanning unit which is blocked by an optical housing and a cover, the electrostatic latent image measuring device further comprising a light-shielding unit, which blocks outside light in addition to the scanning light between the vacuum chamber and the light scanning unit provided in the vacuum chamber.

Preferably, the light-shielding unit includes a first light-shielding unit and a second light-shielding unit, the first light-shielding unit including a plurality of cylindrical portions each of which has a different diameter, the second light-shielding unit including a cylindrical member which is inserted between the plurality of cylindrical portions, and the first and second light-shielding units are disposed such that a central axis of the plurality of cylindrical portions coincides with a central axis of the cylindrical portion which is inserted therebetween.

Preferably, the first light-shielding unit and the second light-shielding unit have a combination portion including a labyrinth structure.

Preferably, a soft light-shielding member is inserted between the first and second light-shielding units.

Preferably, the soft light-blocking member is an elastic body or a rubber-coated non-woven fabric.

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

DETAILED DESCRIPTION OF THE PREFERRED EMBODIMENTS

Hereinafter, an electrostatic latent image measuring device, an electrostatic latent image measuring method, and an image forming device according to the embodiments of the present invention will be described with reference to the drawings.

Figure 1:
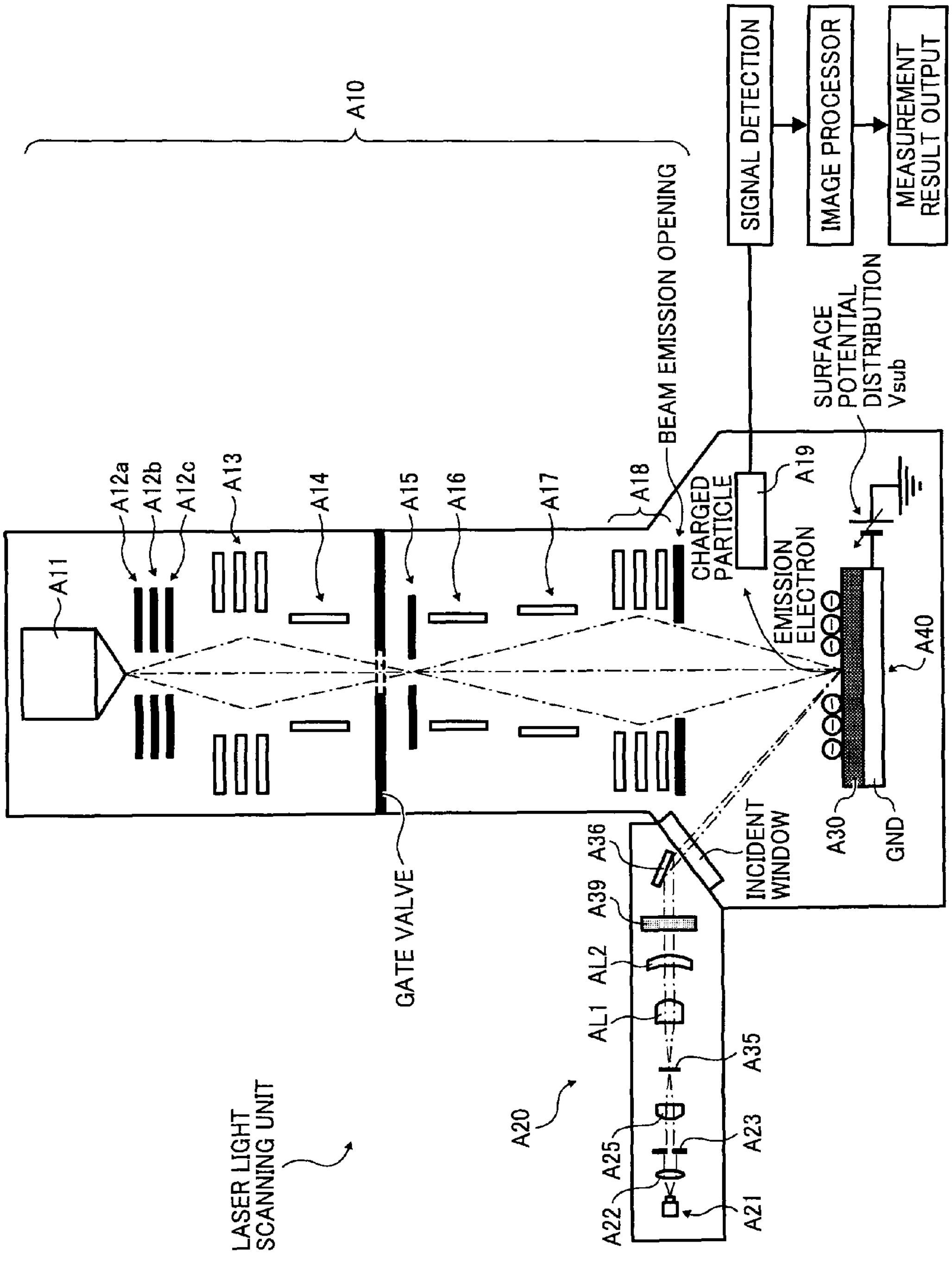
FIG. 1 is a view illustrating an optical arrangement of an electrostatic latent image measuring device according to Embodiment 1 of the present invention.
Figure 2:
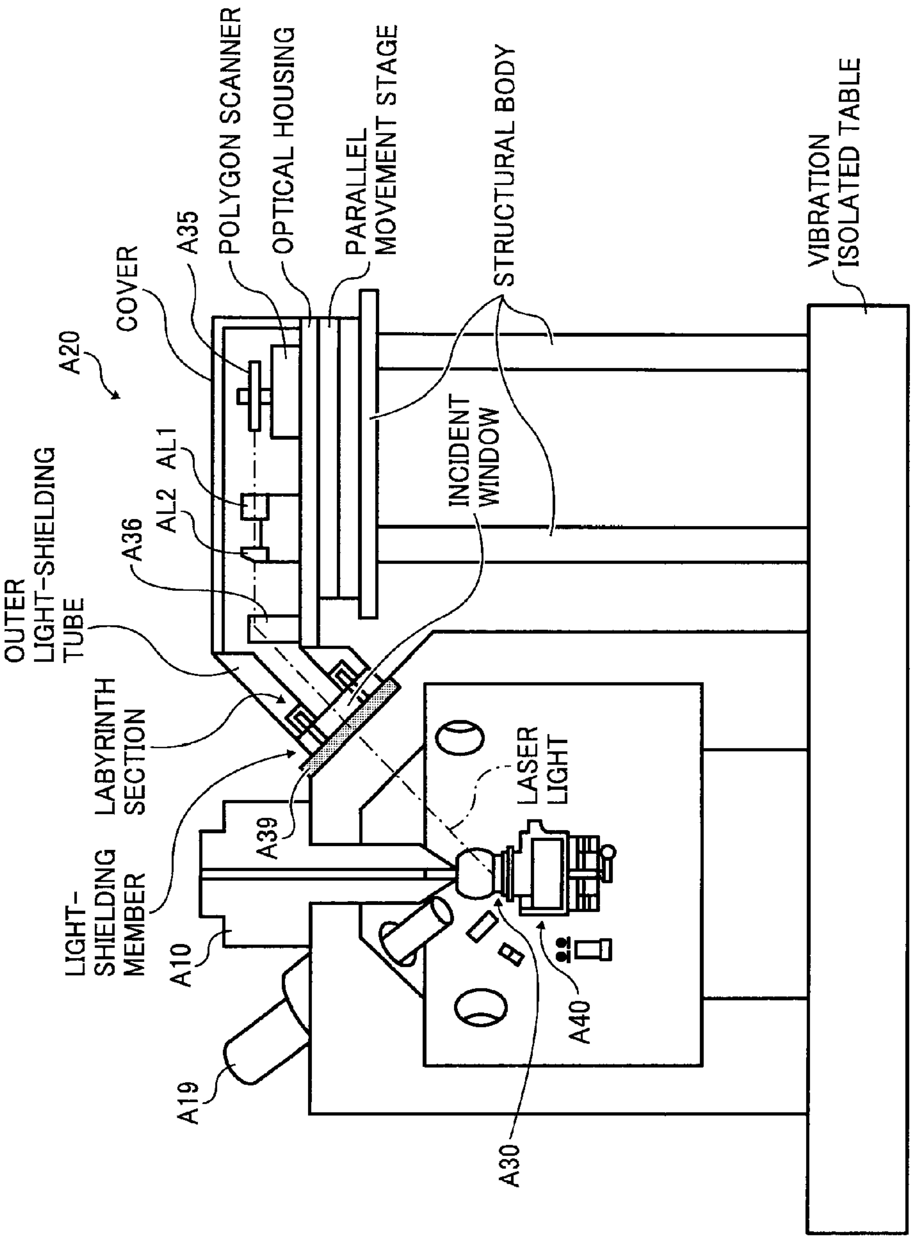
FIG. 2 is a longitudinal sectional view illustrating an enlarged main portion of the above embodiment.

FIGS. 1, 2 illustrate an electrostatic latent image measuring device according to the present embodiment.

The electrostatic latent image measuring device according to the present embodiment includes a charged particle optical system A10 which irradiates a charged particle beam, an exposure optical system A20, a stage A40 onto which a sample is placed, and a detector A19 which detects a charged particle such as a surface (reflection) scattering charged particle and a secondary electron.

In this case, the charged particle indicates a particle which is influenced by an electric field or a magnetic field, such as an electron or an ion.

Hereinafter, the embodiment which irradiates an electron beam will be described.

Referring to FIG. 1, the charged particle optical system A10 includes an electron gun A11 which generates an electron beam, a suppressor electrode A12*a* which controls an electron beam, an extractor A12*b*, an acceleration electrode A12*c* which controls an energy of an electron beam, a condenser lens A13 which condenses the electron beam emitted from the electron gun A11, a beam blanking electrode A14, a movable aperture stop A15, an eccentric lens A16 which changes a traveling direction of an electron beam, a deflection electrode (scanning lens) A17 which scans the electron beam having passed through the eccentric lens A16, and an objective lens A18 which re-condenses the electron beam having passed through the deflection electrode 17.

A driving power source (not shown) is connected to each of the lenses, electrodes and the like.

As the detector A19 which detects a charged particle such as a secondary electron and a surface (reflection) scattering electron, a scintillator, a photomultiplier or the like is used.

The scintillator is generally configured to capture a charged particle by applying a high voltage such as a leading voltage of about 8-10 kV.

A photoconductor sample A30 is placed on the stage A40.

The back face side of the photoconductor sample A30 is generally connected to a ground GND via the stage A40, but a voltage can be applied to the back face side of the photoconductor sample A30 if required.

An emitted particle includes an electron or an ion, and the measurement is generally conducted by detecting an electron. However, when detecting a positive ion, a contrast image can be observed by applying a negative drawing voltage to the detector.

The above-described components are incorporated into a vacuum chamber.

The optical system A20 includes an LD (laser diode) light source A21 as a semiconductor laser light source with a wavelength from visible light to infrared light, a collimator lens A22, an aperture stop A23, and a cylindrical lens A25.

The optical system A20 can generates a predetermined beam diameter and a beam profile on the photoconductor sample A30.

The optical system is configured to irradiate light at an appropriate exposure time and appropriate exposure energy by an LD controller (not shown).

In order to form a line pattern on the photoconductor sample A30, a scanning mechanism using a galvano mirror or a polygon mirror may be provided in the optical system A20.

Figure 10A:
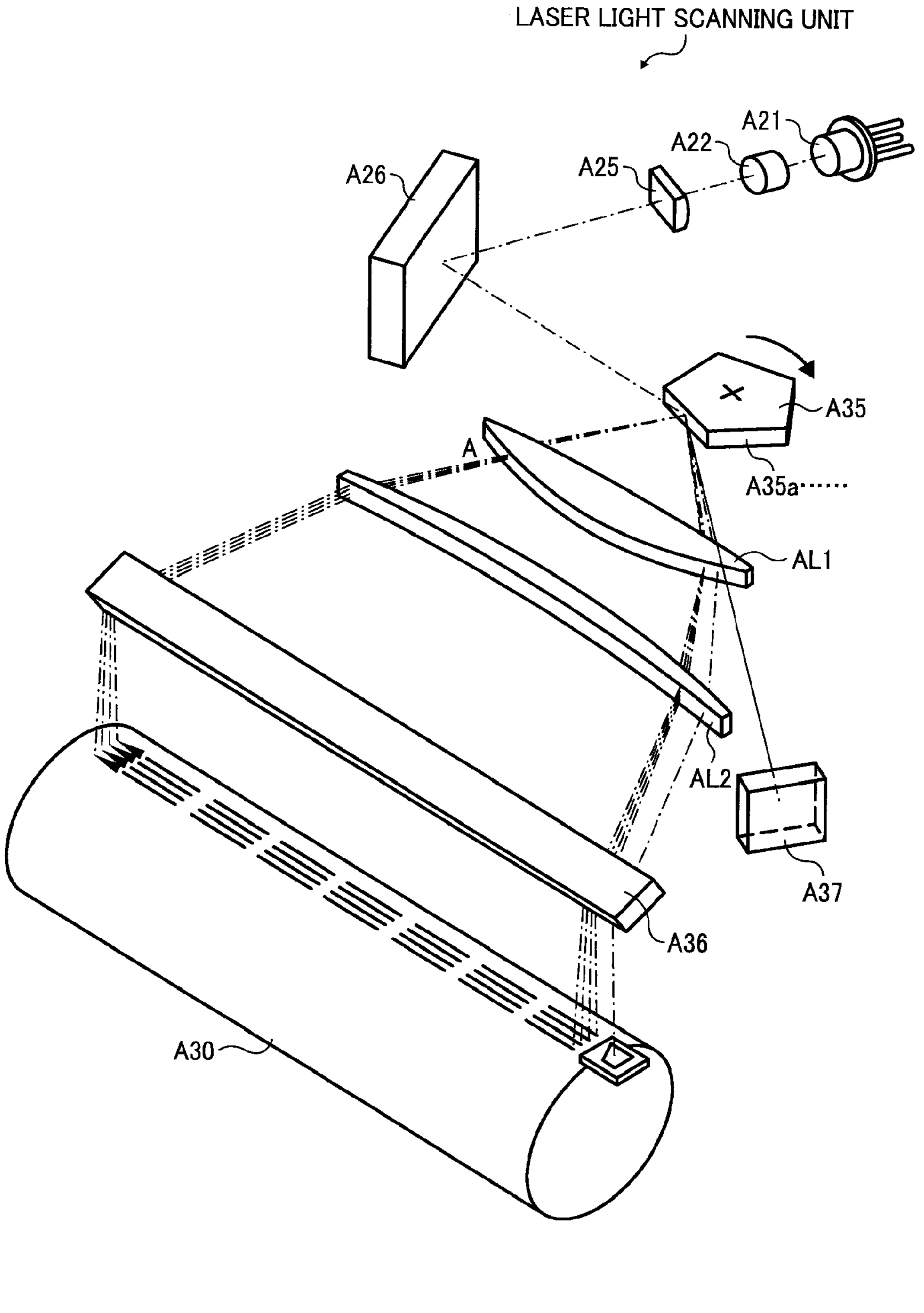
FIG. 10A is a perspective view illustrating an example of a laser scanning unit which can be used in the above embodiment.
Figure 10B:
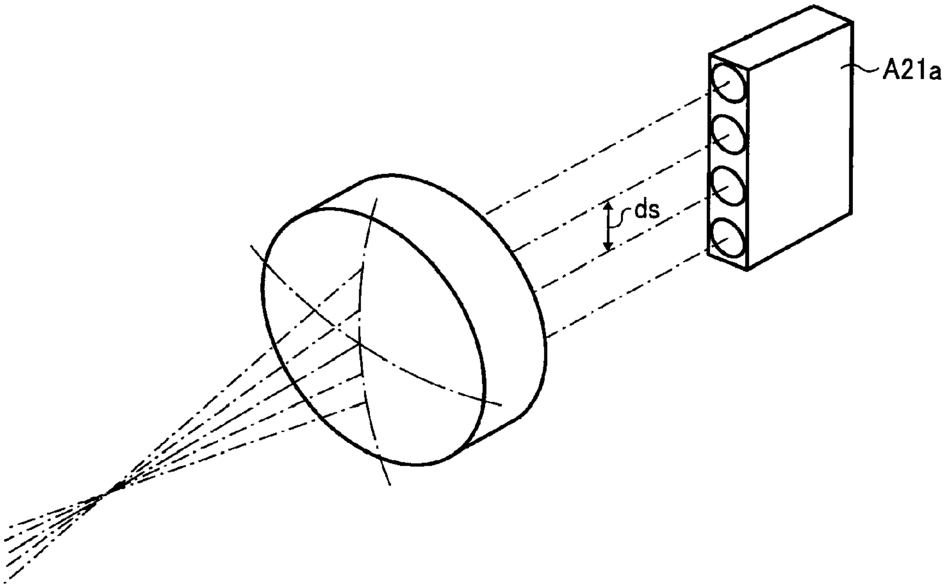
FIGS. 10B-10C are perspective views each illustrating an example of a light source which can be used in the above embodiment.
Figure 10C:
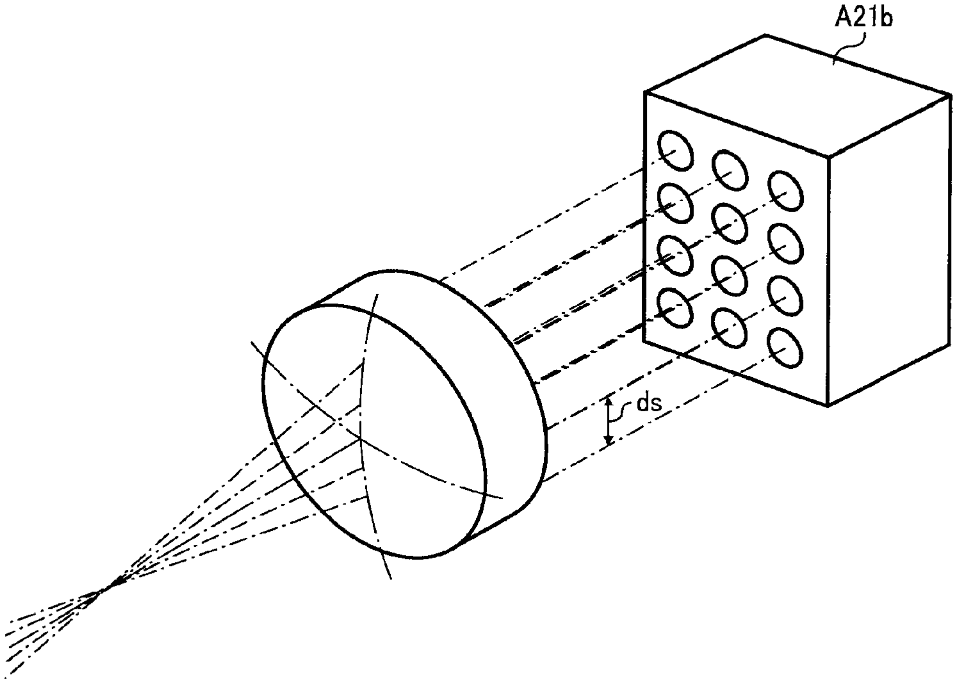

FIGS. 10A, 10B, 10C illustrate an example of a laser scanning unit provided in the optical system A20.

As illustrated in FIG. 10A, the laser light emitted from the LD light source A21 is guided to a polygon mirror A35 via the collimator lens A22, the cylindrical lens A25, and a reflected mirror A26.

The laser light is deflected and scans by the rotating polygon mirror A35, and is focused on a scanned medium or a photoconductor as an image carrier, i.e., the photoconductor sample A30 by condensing lenses AL1, AL2 for scanning and the reflected mirror A26.

A buffer memory in an image processor which controls the flashing of the LD light source A21 stores flashing data corresponding to one scanning (one line) as printing data.

The printing data is read out for every deflection and scanning by each deflection and reflection face A35*a* of the polygon mirror A35, and the laser light flashes according to the printing data on the scanning line of the photoconductor sample A30, so that an electrostatic latent image is formed along the scanning lines.

In the example illustrated in FIG. 10B, a semiconductor laser array A21*a* in which a plurality of semiconductor laser light sources is arranged in line is used as the light source of the laser light scanning unit instead of the single LD light source A21.

In the example illustrated in FIG. 10C, a vertical cavity surface emitting laser (VCSEL) element A21*b* in which semiconductor laser light sources are arranged in a reticular pattern on a plane is used as the light source of the laser light scanning unit instead of the single LD light source A21.

In this example, the vertical cavity surface emitting laser A21*b* having luminous points of m×n (12 points in FIG. 10C), m points (3 points in FIG. 10C) in the horizontal direction (main-scanning direction) and n points (4 points in FIG. 10C) in the vertical direction (sub-scanning direction), is used.

By appropriately using this example in the laser scanning unit illustrated in FIG. 10A, the scanning lines of m×n can be simultaneously scanned.

In order to form a latent image pattern on a predetermined position, a synchronization detector A37 which detects laser light from the optical system A20 can be provided.

The shape of the photoconductor sample A30 can be a flat surface or a curved surface.

As illustrated in FIGS. 1, 2, it is preferable to dispose the laser light scanning unit outside the vacuum chamber such that the vibration of the polygon mirror and the motor rotating and driving the polygon mirror and the influence of the electric magnetic field do not affect the orbit of the electron beam.

The influence of disturbance such as the vibration and the electric field can be controlled by disposing the laser scanning unit away from the orbit scanning range of the electron bream.

It is preferable for the laser light of the laser scanning unit to enter from a transparent entrance window.

A shutter A39 which can always shield the laser light from the optical system A20 is disposed between the photoconductor sample A30 and the optical system A20.

As illustrated in FIG. 2, in the electrostatic latent image measuring device according to the present embodiment, an entrance window, which can allow entry of the laser light scanned from the direction of 45° from the vertical upward into the vacuum chamber, is disposed in the vacuum chamber, and the laser scanning unit is disposed outside the vacuum chamber.

Each of the condensing lenses AL1, AL2 has an f-θ property, and is configured to move the laser light at a substantially constant speed relative to an image face on the photoconductor sample A30 while rotating the polygon mirror A35 at a constant speed, and to make a beam spot diameter be substantially constant.

Since the laser scanning unit is disposed away from the vacuum chamber, the vibration generated when driving the polygon mirror A35 and the like is not directly transmitted to the vacuum chamber.

If a damper is inserted between the structure and a vibration-free stage, a further improved vibration control effect can be obtained.

In the electrostatic latent image measuring device according to the present embodiment, in order to flash the LD light source A21 at a desired position while scanning the laser light with the polygon mirror A35, a writing start position is determined by the detected signal from the synchronization detector A37 illustrated in FIG. 10A.

Since a latent image pattern is formed by the flashing of the laser light for such a short time, it is necessary to improve the response of the emission of the LD light source A21.

When the intensity of the laser light is modulated at 1 μs or below, for example, it is necessary to constantly flow a constant driving current (bias current) to the LD light source A21 even if the LD light source 21 is at a turning-off time, so as to improve the reproducibility of a light pulse pattern or a droop feature.

The semiconductor laser like the LD light source A21 oscillates a laser by applying a standard driving current or more. However, a constant standard bias current or below is constantly supplied in the turning-off period, so as to improve the response of the emission, thus the semiconductor laser emits light by this bias current according to the emission mechanism, similar to that of an LED.

More particular, when using the semiconductor laser like the LD light source A21, the light source slightly emits light even in the turning-off condition.

Figure 4:
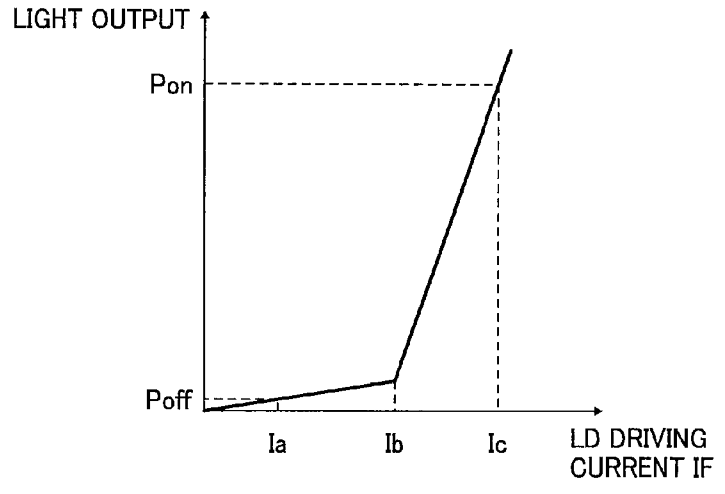
FIG. 4 is a graph illustrating the relationship between the driving current of a semiconductor laser for use in the above embodiment and the light output.

FIG. 4 illustrates the relationship between the driving current IF of the LD light source and the light output.

In the graph, Ia denotes a bias current at the turning-off time, Ib denotes the standard current when starting the laser oscillation, and Ic denotes the driving current at the turning-on time by the laser oscillation.

Pon denotes the light output at the turning-on time by the laser oscillation and Poff denotes the light output when supplying the bias current.

Regarding Ia, Ib, Ic, the relationship of $Ia<Ib<Ic$ is established.

The output at the time of lasing is generally about 1-10 mW, and the light output when supplying the bias current is several ten μW, which is about 1/100 less than the output at the time of lasing. Accordingly, the light output when supplying the bias current is not generally a problem.

For this reason, the bias current maintains flow even in the turning-off period so as to focus on the response of the light emission.

However, even if light of a faint light volume is irradiated for a long period of time, an integrated light volume is increased. If the integrated light volume reaches a required exposure amount of the photoconductor, an electrostatic latent image is formed.

As a result, a desired electrostatic latent image can not be formed.

In this embodiment, in order to control an irradiation time of light to a sample which is emitted by the bias voltage in the turning-off period, when forming a desired electrostatic latent image by using a semiconductor laser, a structure which irradiates a light flux outside an electron beam scanning area of a sample is provided, and off-set emission by the LD bias current is shielded.

As a specific structure, the shutter A39 is provided between the LD light source and the sample. More particularly, before the exposure, the shutter A39 is closed such that the light flux does not pass through, and the shutter A39 is opened such that the light flux passes through at the time of the exposure, so that the offset emission can be shielded.

Figure 5A:
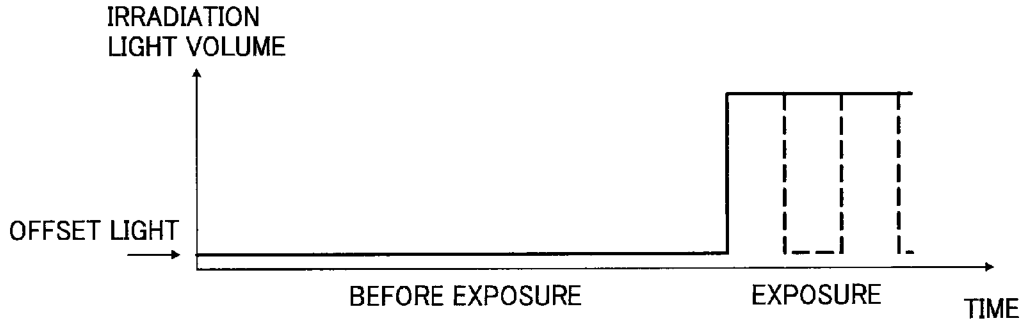
FIG. 5A is a graph illustrating the change in the irradiation volume of the laser light from the light source relative to time in the conventional method.
Figure 5B:
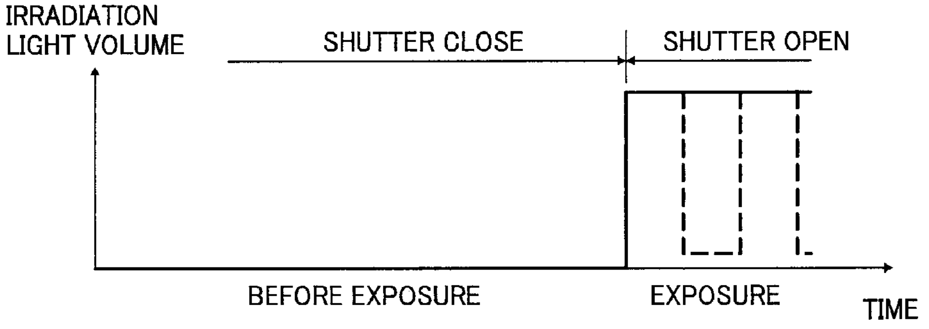
FIG. 5B is a graph illustrating the change in the irradiation volume of the laser light from the light source relative to time in the above embodiment.

As illustrated in FIG. 5A, conventionally, the irradiation time of the offset light before the exposure is long, and if the integrated light volume reaches a required exposure energy, a latent image is formed by the offset exposure. However, by the above-described structure, as illustrated in FIG. 5B, the irradiation time of the offset light before the exposure can be controlled as much as possible, so that the measurement accuracy can be improved.

In addition, after the exposure, the shutter A39 can be closed by applying an exposure end detection signal if required.

Next, a method which forms an electrostatic latent image will be described.

First of all, the electron beam is irradiated onto the photoconductor sample A30.

By setting the acceleration voltage to the acceleration voltage |Vacc| higher than the acceleration voltage in which secondary-emission coefficient becomes 1, the number of incident electrons exceeds the number of emission electrons, so that the electrons are accumulated in the photoconductor sample A30, resulting in the charging-up.

As a result, the photoconductor sample A30 can be negatively and uniformly charged.

By appropriately controlling the acceleration voltage and the irradiation time, a desired charged potential can be formed.

Next, the photoconductor sample A30 is exposed by the optical system A20.

The optical system is adjusted to form a desired beam diameter and a beam profile.

The necessary exposure energy is a factor which is determined by a property of a photoconductor, but it is generally about 2-6 $mJ/m^2$.

Several tens $mJ/m^2$ or more may be required for the photoconductor having a low sensitivity.

It is preferable to set the charged potential and the necessary exposure energy according to the photoconductor property and the condition of the process.

Figure 11:
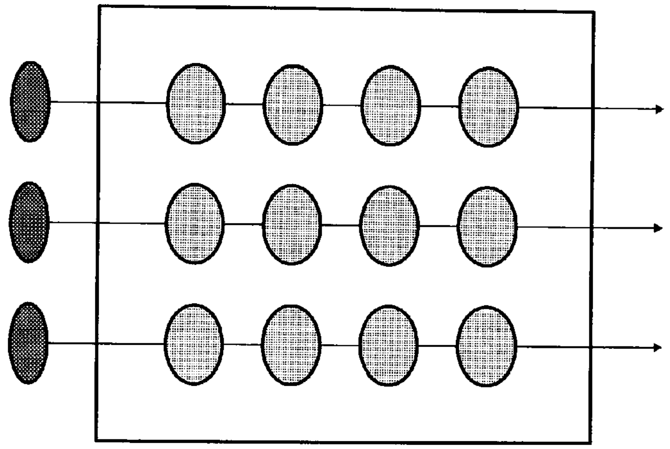
FIG. 11 is a view illustrating examples of latent image patterns formed in the above embodiment.
Figure 11:
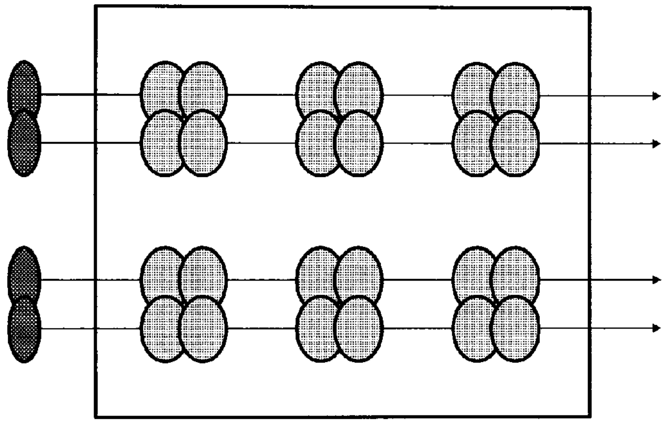
Figure 11:
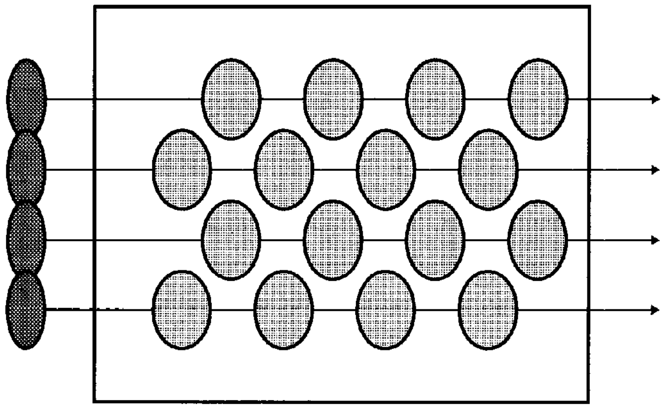

Then, a desired electrostatic latent image such as an image pattern as illustrated in FIG. 11 is formed by shielding the offset light by the LD bias current with the above shutter mechanism.

If the surface of the sample includes an electric charge distribution, an electric field distribution according to the electric charge distribution on the surface is formed in a space.

For this reason, the secondary electron generated by the incident electron is brought back by this electric field, so that the number of electrons which reach the detector A19 is decreased.

Therefore, in the charged leakage portion, the exposed portion becomes black and the non-exposed portion becomes white, and a contrast image according to the electric charge distribution on the surface can be measured.

Figure 3A:
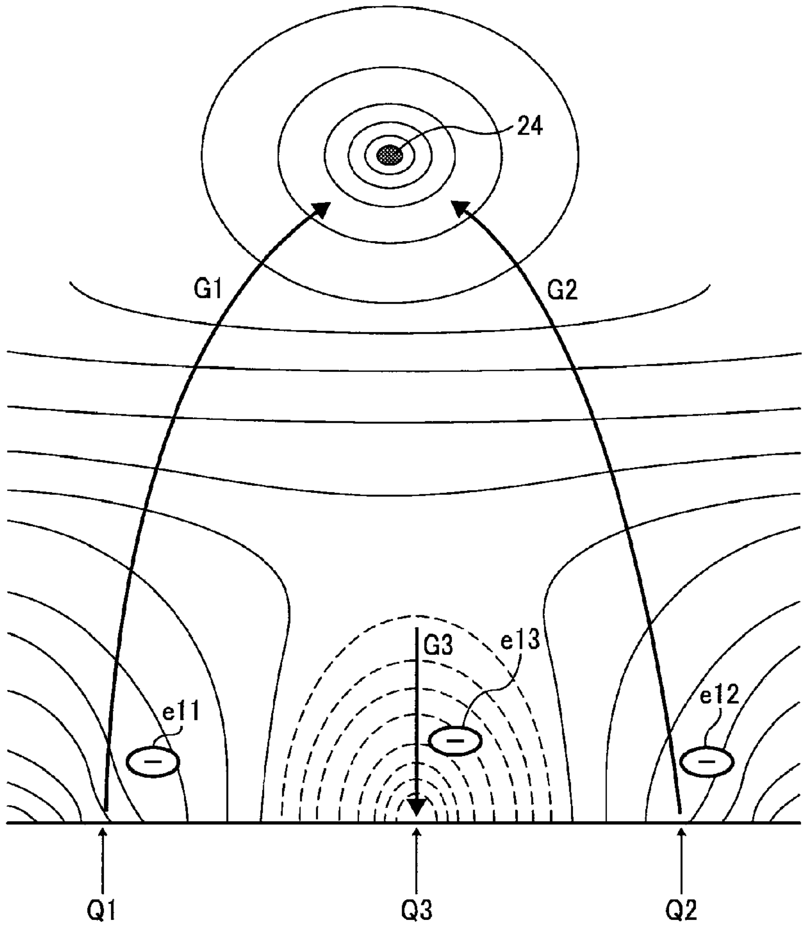
FIG. 3A is a view illustrating a principle for detecting an electric potential distribution.

FIG. 3A is a view describing the electric potential distribution in the space between the detector A19 and the photoconductor sample A30 by the contour lines.

In this case, the surface of the photoconductor sample A30 is uniformly charged to the negative polarity except for the portion where the electric potential attenuates by the light attenuation, and the electric potential of the positive polarity is applied to the detector A19. Therefore, in the equipotential line group illustrated by the solid lines, the electric potential is increased as it approaches the detector A19 from the surface of the photoconductor sample A30.

Accordingly, the secondary electrons el1, el2 generated in the points Q1, Q2 in FIG. 3A, which are portions uniformly charged to the negative polarity in the photoconductor sample A30, are absorbed to the positive potential of the detector A19, are changed as illustrated by the arrows G1, G2, and are captured by the detector A19.

On the other hand, in FIG. 3A, the point Q3 illustrates a portion where the negative potential attenuates by the irradiation of light, and the equipotential lines are illustrated by the dashed lines near the point Q3. In this portion, the electric potential distribution is increased as it approaches the point Q3.

More particularly, the electric force which holds on the photoconductor sample A30 side functions on the secondary electron e13 generated near the point Q3 as illustrated by the arrow G3.

For this reason, the secondary electron e13 is captured by the potential hole as illustrated by the dashed equipotential lines, and is not detected by the detector A19.

Figure 3B:
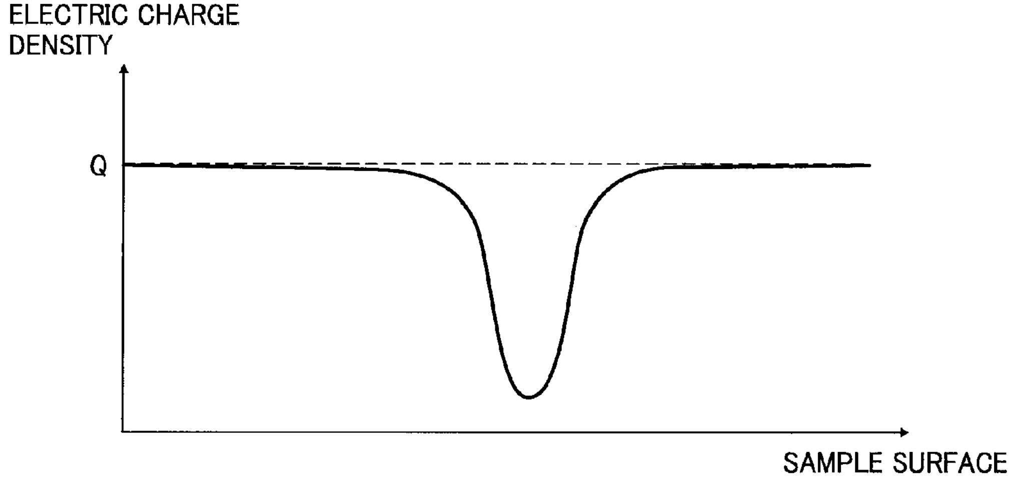
FIG. 3B is a view illustrating an electric potential distribution by a secondary electron.

FIG. 3B schematically illustrates the above potential hole.

Namely, regarding the intensity of the secondary electrons (the number of the secondary electrons) detected by the detector A19, the large intensity portion corresponds to the surface portion of the electrostatic latent image (uniformly and negatively charged portion: portion illustrated by the points Q1, Q2 in FIG. 3A), and the small intensity portion corresponds to the image portion of the electrostatic latent image (irradiated portion: portion illustrated by the point Q3 in FIG. 3A).

Therefore, if the electric signals obtained by the secondary electron detector are sampled at an appropriate time in the signal processor provided in the electrostatic latent image measuring device in this embodiment, as described above, the electric potential distribution on the surface, V(X,Y) can be specified for every minute area corresponding to the sampling with the sampling time T as a parameter.

By constituting the above electric potential distribution on the surface (electric potential contrast image), V(X, Y) as the two-dimensional image data in the signal processor, and outputting the data with an output device, an electrostatic latent image can be obtained as a visible image.

For example, if the intensity of the captured secondary electrons is expressed by the brightness level, the image portion of the electrostatic latent image is dark and the surface portion of the electrostatic latent is bright, which illustrate contrast, so that the electrostatic latent image can be illustrated (output) as a contrast image according to the electric charge distribution on the surface.

If the electric potential distribution on the surface is obtained, the electric charge distribution on the surface is obtained.

Therefore, a contrast image in which the charged portion has a large secondary electron detection amount and the exposed portion has a lesser secondary detection amount is generated.

The dark portion can be regarded as the latent image portion by the exposure.

The broader of the contrasts can be regarded as the diameter of the latent image.

Accordingly, the electrostatic latent image of the photoconductor can be measured with a high resolution in micron order.

In order to reduce the influence of the offset emission by the bias current of the LD light source A21, it is ideal that the shutter is opened only for the exposure time for forming an electrostatic latent image and the shutter is closed before and after the exposure.

In order to achieve this, it is preferable to link the exposure timing and the opening and closing timing of the shutter.

The exposure timing is determined by the synchronization signal of the optical system.

Therefore, it is preferable to open the shutter according to the synchronization signal of the optical system.

As a method of achieving this, if the synchronization signal of the optical system is used as a trigger signal for opening the shutter, the writing timing can be made uniform.

Figure 6:
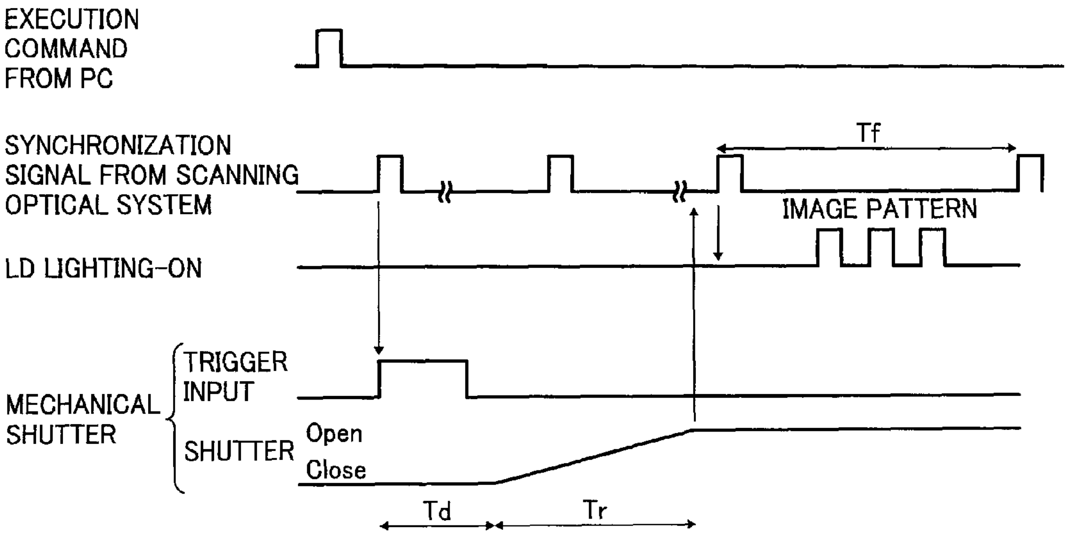
FIG. 6 is a timing chart illustrating the operation of the above embodiment.
Figure 8:
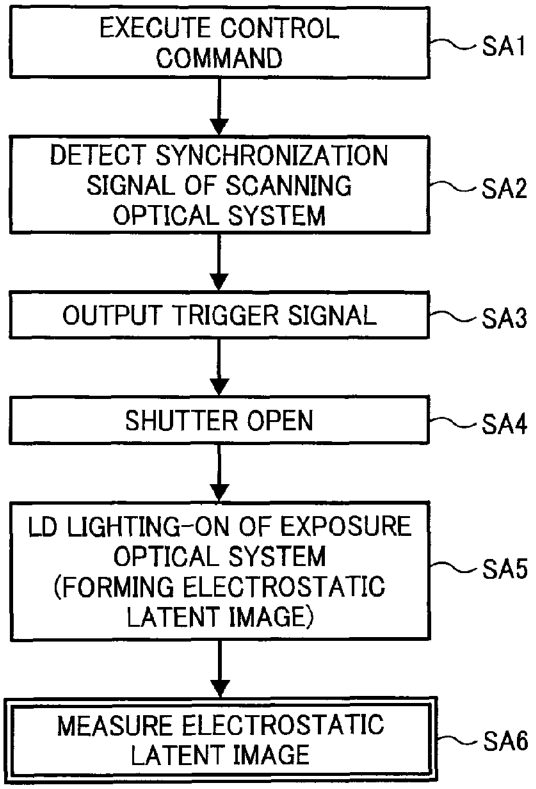
FIG. 8 is a flow chart illustrating a measuring procedure of the above embodiment.

The above operation in the control system is illustrated in FIGS. 6, 8.

Each step of the flow illustrated in FIG. 8 is presented as SA1, SA2 . . . .

In FIGS. 6, 8, after the control command for measuring is conducted (SA1), the synchronization signal of the optical system is detected (SA2), and the detected signal is output as the trigger signal for opening the shutter (SA3).

Then, the shutter A39 opens till the effective diameter of the light flux output from the optical system A20 (SA4), and the LD light source A21 is lighted (SA5) in the opened timing of the shutter. Then, the electrostatic latent image is formed on the sample.

After the exposure is completed, the shutter A39 is closed.

In addition, after the exposing, the bias current of the LD light source A21 is set to 0 so as to stop the emission, in addition to the closing of the shutter A39.

Then, the electrostatic latent image is measured (SA6).

Figure 7:
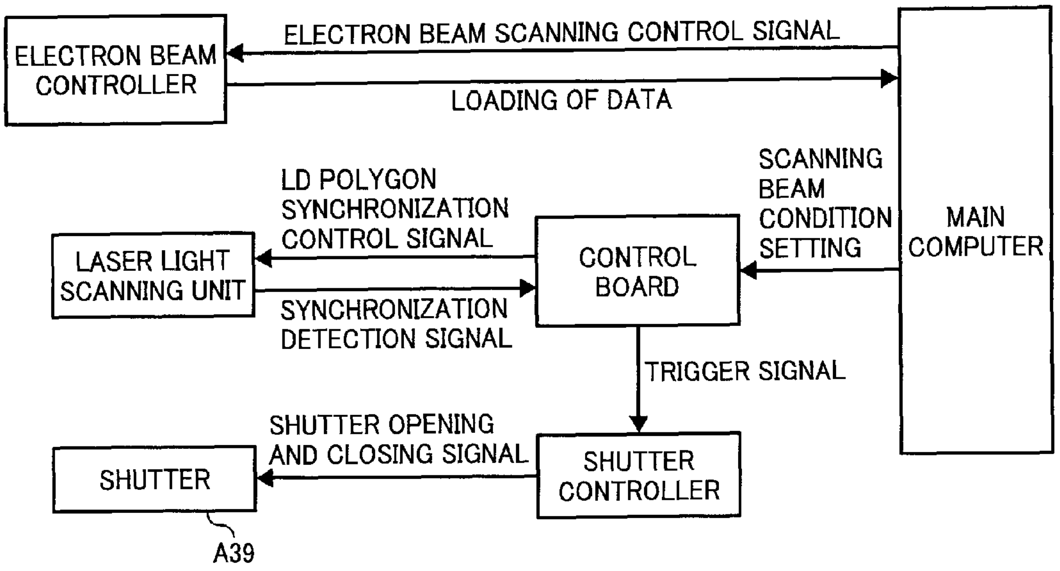
FIG. 7 is a block diagram illustrating a structure of a control system of the above embodiment.

FIG. 7 illustrates the structure of the above-described control system and the like in this embodiment.

A main computer controls each portion.

More particularly, a signal for controlling an electron beam scanning system is sent to an electron beam controller from the main computer, and the loaded various data is input to the main computer from the electron beam controller.

The main computer sends the condition setting data of the scanning beam to a control board, and the control board sets various conditions.

An LD•polygon mirror synchronization control signal and a synchronization detection signal are exchanged between the control board and a laser scanning unit.

The control board sends a trigger signal to the shutter controller and the shutter controller sends an opening and closing signal to the shutter A39 according to the trigger signal, so as to control the opening and closing of the shutter A39.

By the way, whether the shutter A39 is an electron shutter or a mechanical shutter, it has a time lag from a command till it actually opens.

Where a time from the detection of the trigger signal till the start of the opening of the shutter is Td, and a time from the start of the opening of the shutter till the opening corresponding to the effective diameter of the laser light is Tr, the opening of the shutter delays at Td+Tr time after receiving the synchronization signal of the trigger output.

Therefore, it is necessary to light the LD light source A51 according to the delay.

Namely, it is preferable to light the LD light source A51 at Td+Tr time delay after receiving the synchronization signal of the trigger output.

In particular, the LD light source 50 is configured to illuminate the time Td+Tr late which satisfies the inequality $Td+Tr<n\times Tf$ (n is natural number) after receiving the synchronization signal of the trigger output when one scanning time by the laser scanning unit is Tf.

This timing charge is illustrated in FIG. 6.

By the embodiment as structured above, the irradiation time by the offset emission is significantly decreased, but the offset emission is actually irradiated at the time of Tr or more.

The acceptable amount of this time is $Tr<Tf*Pon/Poff$, and it is necessary to be set in this range of this equation.

More particularly, when Tf=250 μs, Pon=4 mW, Poff=20 μW, it is preferable to be Tr<250 μs×200=50 ms, i.e., it is preferable for Tr to be within 50 ms.

When Tf=100 μs, Pon=1 mW, Poff=50 μW, Tr<2 ms.

By appropriately selecting the condition and the method which satisfy this condition, the electrostatic latent image having further reduced light noise can be formed. As a result, the electrostatic latent image can be measured with high accuracy.

The shutter mechanism includes a method of changing an optical transmittance rate by an application voltage as a liquid crystal modulation element. In this case, a mechanical movable portion is not required.

However, there is a possibility which affects the response and the wave front of the transmitted light.

The shutter mechanism also includes a mechanical shutter.

In this case, the mechanical shutter indicates a mechanism which creates a condition having a light-shielding object in an optical path and also a condition without having a light-shielding object in an optical path, and creates the reaching/shielding conditions of a light beam to a sample to be measured by blocking the path of light or changing the path of light.

Figure 9:
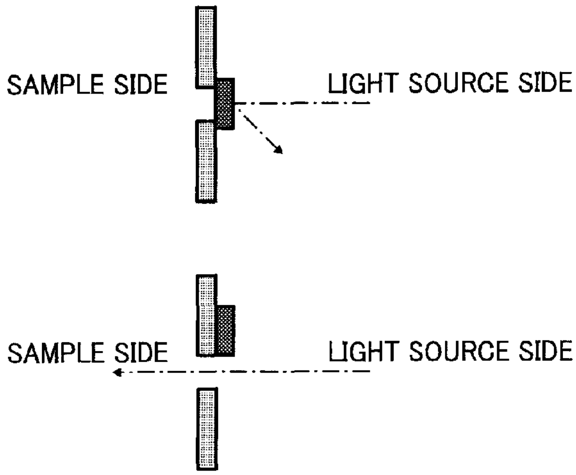
FIG. 9 is a sectional view illustrating a mechanical shutter which can be used in the above embodiment.

FIG. 9 illustrates a part of the mechanism.

In this example, a slider opens and closes the optical path by sliding in the direction orthogonal to the optical path.

The mechanical shutter is configured to mechanically perform the opening and closing operation and the control of the speed of the shutter by means of a governor or a spring as described above.

The mechanical shutter includes a device which opens and closes from the center to the circumference by using a guillotine shutter or a plurality of shutter blades.

The guillotine shutter includes two plates each provided with a hole. The shutter opens and closes the hole, which is a light path, by the running of the plate corresponding to the former curtain after the running of the plate corresponding to the rest of the curtain.

The shutter speed can be changed by the change in the condition of the overlapped holes.

The shutter mechanism is mechanical, but can be controlled by an electric signal.

Thereby, the shutter can be opened and closed at more appropriate timing which corresponds to the synchronization.

By using the mechanical shutter as the shutter mechanism, the offset emission can be shielded at a high speed without deteriorating the wave front of the transmitted light of the laser light.

It is preferable for the shutter mechanism to be disposed outside the vacuum chamber.

If the shutter mechanism is disposed in the vacuum chamber, the electromagnetic field changes by a solenoid when opening and closing the mechanical shutter and after and before opening and closing the mechanical shutter, and the change may curve the orbit of the scanning electron beam. However, by disposing the shutter mechanism outside the vacuum chamber, the change and curve can be controlled By measuring the profiles of the surface electric charge distribution and the surface electric potential distribution, the electrostatic latent image can be measured with a further improved accuracy.

Figure 12:
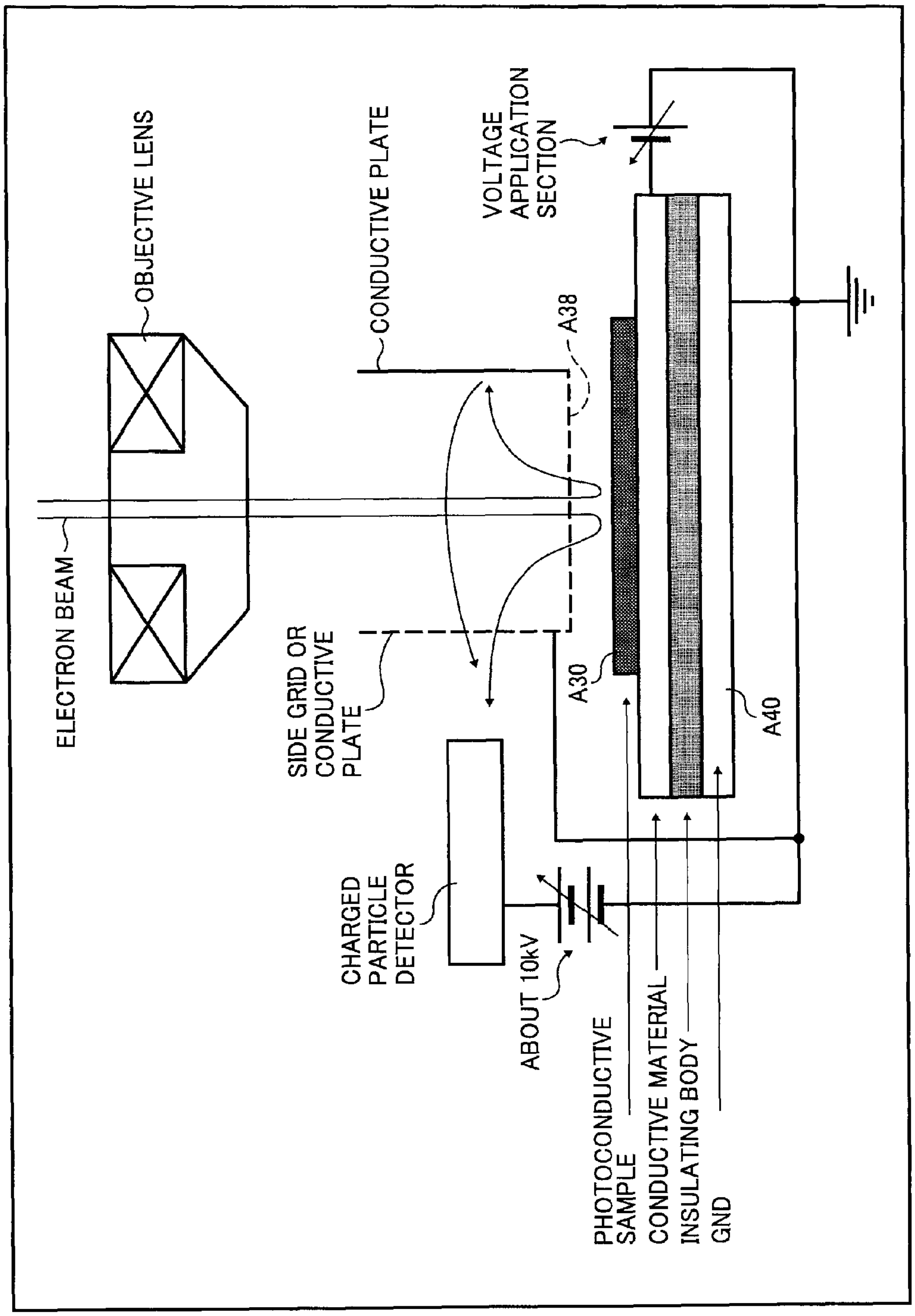
FIG. 12 is a view illustrating a modified example of a measuring method which is applicable to the present invention.

FIG. 12 is a view illustrating another embodiment of the electrostatic latent image according to the present invention, especially an example of a device for measuring a surface electric potential distribution.

In FIG. 12, the stage A40 below the photoconductor sample A30 is connected to a voltage application unit which applies a voltage of ±Vsub.

A grid mesh A38 which prevents the incident electron beam from having the influence of the electric charge on the sample is disposed above the photoconductor sample A30.

Figure 13A:
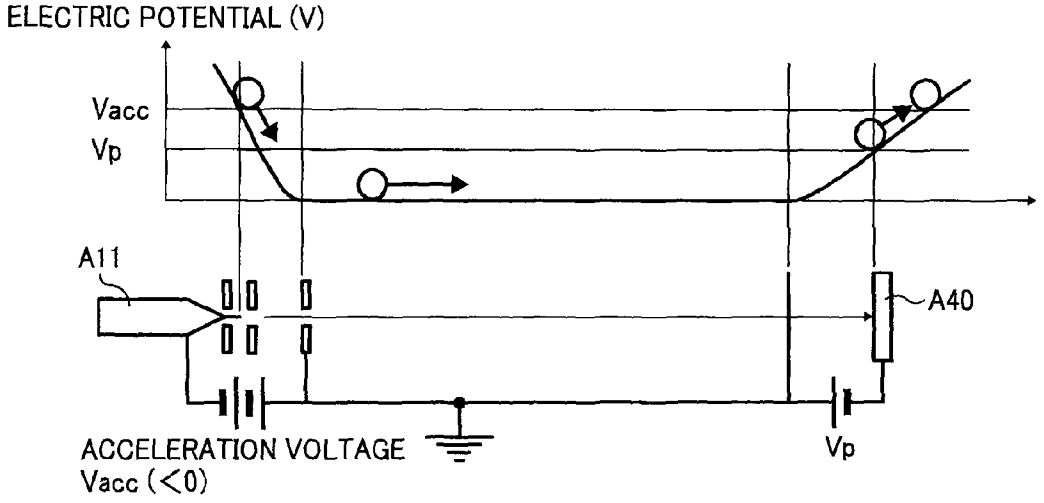
FIGS. 13A, 13B are views each illustrating the relationship between the incident electrons and the sample in the above modified example.
Figure 13B:
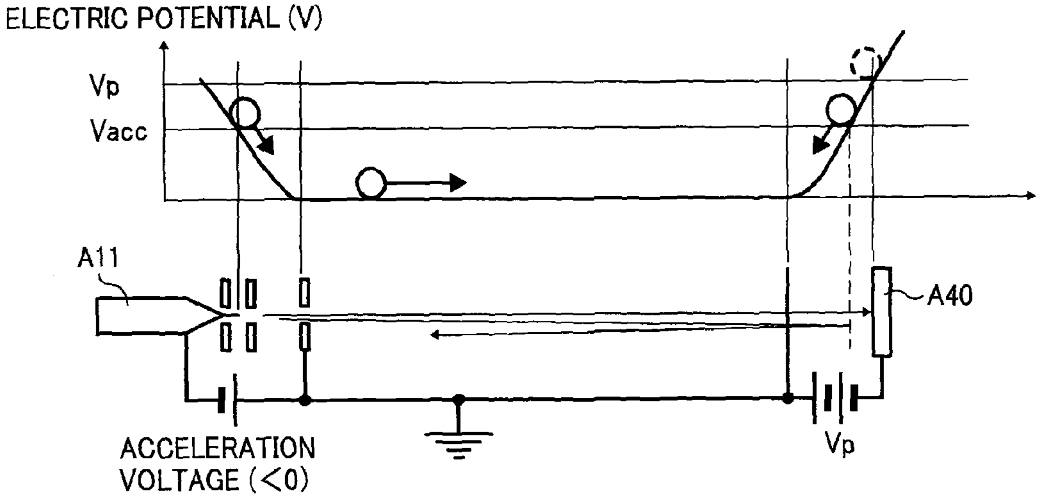

FIG. 13A, 13B illustrate the relationship between the graph of the position, which is between the negative electrode of the electron gun 11 and the stage A40, and the electric potential and the incident electron.

FIG. 13A illustrates a condition when the acceleration voltage is larger than the surface potential. FIG. 13B illustrates a condition when the acceleration voltage is smaller than the surface potential.

The neighborhood of the surface of the sample includes an area where the velocity vector of the incident charged particle in the vertical direction of the sample reverses before reaching the sample, and the primary incident charged particle is detected by the detector.

In addition, the acceleration voltage is generally expressed as positive, but the application voltage Vacc of the acceleration voltage is negative. As an electric potential, it is easy to describe as negative in order to provide physical meaning, so the acceleration voltage here is expressed as negative (Vacc<0).

The acceleration potential of the electron beam is Vacc (<0) and the potential of the sample is Vp (<0).

Since the electric potential is an electric positional energy that a unit charge has, the incident electron moves at a speed corresponding to the acceleration speed Vacc at a potential of 0 (V).

More particularly, where the amount of electric charge of an electron is e and the mass of an electron is m, the first speed $V_0$ of the electron is described by $mv_0^2/2=e\times|Vacc|$.

In a vacuum, according to the energy conservation law, the electron moves at a constant speed in an area without having a potential difference, the electric potential increases as it approaches the surface of the sample, and the speed of the electron is lowered by the influence of the Coulomb repulsion of the electric charge on the sample.

Therefore, the following phenomenon generally occurs.

In FIG. 13A, because of $|Vacc|\geqq|Vp|$, the electron reaches the sample although the speed of the electron decreases.

In FIG. 13B, when $|Vacc|>|Vp|$, the speed of the indecent electron gradually decreases by the influence of the electric potential of the sample, the speed becomes 0 before reaching the sample, and the electron goes to the opposite direction.

In a vacuum without having the influence of an air molecule, the energy conservation law is absolutely achieved.

Therefore, by measuring the condition in which the energy on the surface of the sample when changing the energy of the incident electron, i.e., the landing (reaching) energy substantially becomes 0, the surface potential can be measured.

In this case, when the surface (reflection) scattering charged particle is an electron, it is called a surface (reflection) scattering electron.

The scattering primary particle and the secondary electron generated when reaching the sample differ in the number which reaches the detector, they can be discriminated by the border of the contrast.

In addition, a scanning electron microscope includes a reflection electron detector. In this case, the reflection electron generally indicates an electron which is reflected (scattered) backwardly by the interaction with the substance of the sample, and jumps from the surface of the sample.

The energy of the reflection electron matches the energy of the incidence electron.

The intensity of such a reflection electron increases as the atomic number of the sample increases, so that the irregularity on the surface of the sample can be effectively detected by the difference of the composition of the sample with the method for detecting the intensity of such a reflection electron.

On the other hand, the surface (reflection) scattering electron is an electron in which the movement direction reversely rotates by the influence of the potential distribution on the surface of the sample before reaching the surface of the sample, and is a phenomenon completely different from the above.

Figure 14:
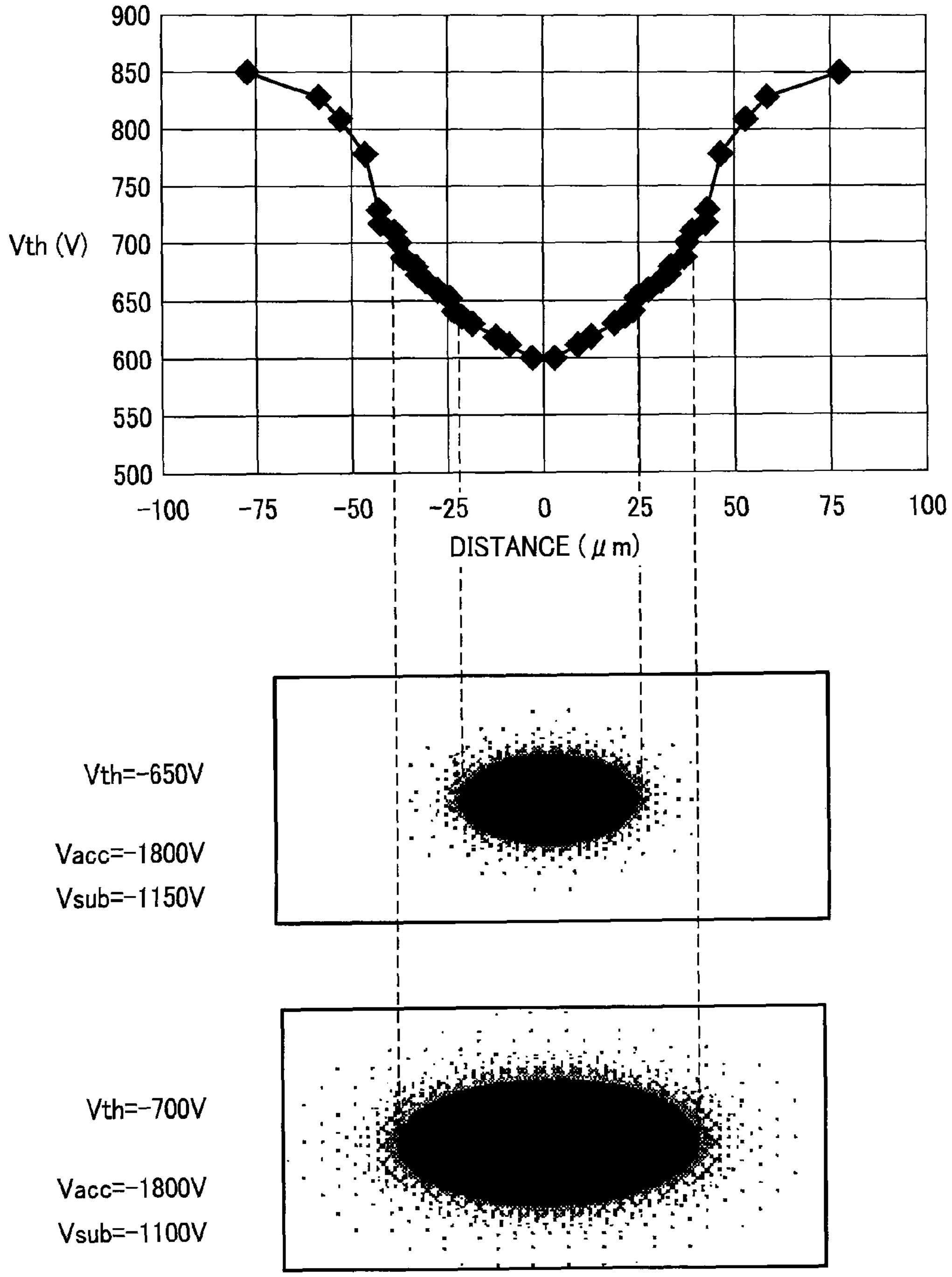
FIG. 14 is a graph and models illustrating one example of the result when measuring a depth of a latent image.

FIG. 14 is a view illustrating one example of the measurement result of a depth of a latent image.

If the difference between the acceleration voltage Vacc and the application voltage Vsub of the lower portion of the sample is Vth (=Vacc−Vsub) in each scanning position (x, y), the electric potential distribution V (x, y) can be measured by measuring the Vth (x, y) when the landing (reaching) energy substantially becomes 0.

Vth (x, y) and the electric potential distribution V(x, y) have a unique correspondence relationship. Vth (x, y) approximately becomes equivalent to the electric potential distribution V (x, y) as long as Vth (x, y) has a smooth electric charge distribution.

In FIG. 14, the upper curved line illustrates one example of surface electric potential distribution generated by the electric charge distribution of the surface of the sample.

The acceleration voltage of the electron gun which two-dimensionally scans is −1800V.

The electric potential in the center (horizontal axis coordinate=0) is about −600V, and the electric potential increases in the minus direction as it approaches the outside from the center. The electric potential of the neighboring area where the radius from the center is over 75 μm is about −850V.

In FIG. 14, the middle oval shape illustrates the imaged output of the detector when setting the back face of the sample Vsub=−1150V.

In this case, Vth=Vacc−Vsub=−650V.

In FIG. 14, the lower oval shape illustrates the imaged output of the detector obtained with a condition which is the same as the above condition, except for Vsub=−1100V.

In this case, Vth is −700V.

As illustrated in FIG. 14, the electric potential information of the surface of the sample can be measured by scanning the surface of the sample with the electron and measuring the Vth distribution while changing the acceleration voltage Vacc or the application voltage Vsub.

By using this method, the profile of the electrostatic latent image can be visualized in micron order, which was conventionally difficult.

In a method, which measures a latent image profile by means of the surface (reflection) scattering electron, since the energy of the incident electron extremely changes, the orbit of the incident electron may deteriorate. As a result, the scanning ratio changes and also distortion occurs.

In this case, the electrostatic field environment and the electron orbit are previously calculated, and the ratio and the orbit are corrected according to the calculation, so that further accurate measurement can be performed.

Although the total exposure energy density to be applied to the photoconductor is the same, if the light volume and the exposure time are different, a reciprocity failure phenomenon in which a latent image forming condition differs occurs in the photoconductor.

Generally, when the exposure energy is constant, the sensitivity (depth of latent image) decreases as the light volume increases, and the toner adhesion amount changes, resulting in the difference of image concentration.

It is considered that if the light volume is large, the recombination amount of carriers increases, and the amount of carriers which reach the surface decreases.

This leads to a remarkably uneven image concentration when an optical system for exposure by a multi-beam such as a VCSEL is used.

By evaluating the electrostatic latent image on the photoconductor with the electrostatic latent image measuring device, the electrostatic latent image can be measured with a resolution of 1 micron order, so that the latent image forming process can be quantitatively analyzed in details at the one-dot level.

Thereby, the most appropriate exposure amount can be obtained, and the charging and exposure conditions which do not increase the stress of the photoconductor are obtained. Accordingly, energy saving and improved durability of the laser scanning unit and the image forming device using the above photoconductor can be achieved.

In order to improve the quality of the output image of the image forming device, the beam spot diameter in the sub-scanning direction is lowered to 60 μm or below by optimizing the optical system and decreasing the wavelength of the light source to a short wavelength of 780 nm or below.

However, the current photoconductor has a low sensitivity relative to light of the short wavelength, and the small diameter beam is significantly affected by the influence of the scattering light and scattering electric charge in the photoconductor. For this reason, the diameter of the latent image increases and the depth of the latent image decreases. In the final output image, a stable tone and a stable sharpness can not be obtained.

Figure 15A:
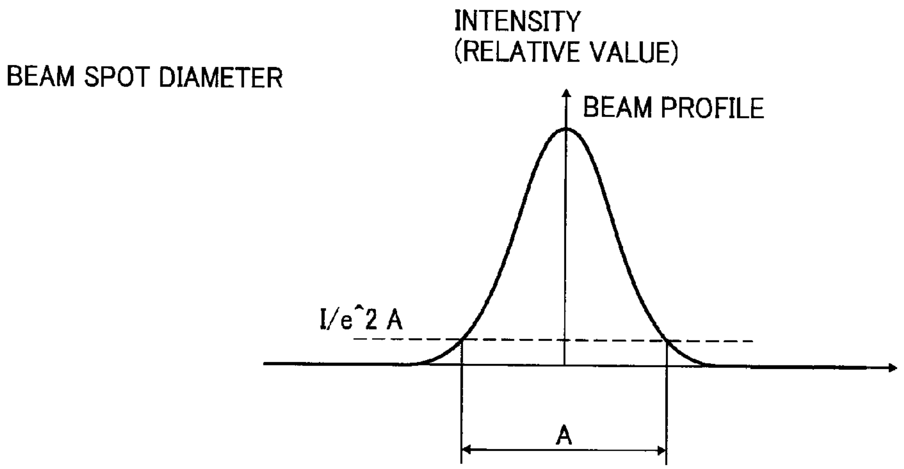
FIGS. 15A, 15B are views illustrating a graph and model of the relationship between the spot diameter of the laser and the latent image diameter.
Figure 15B:
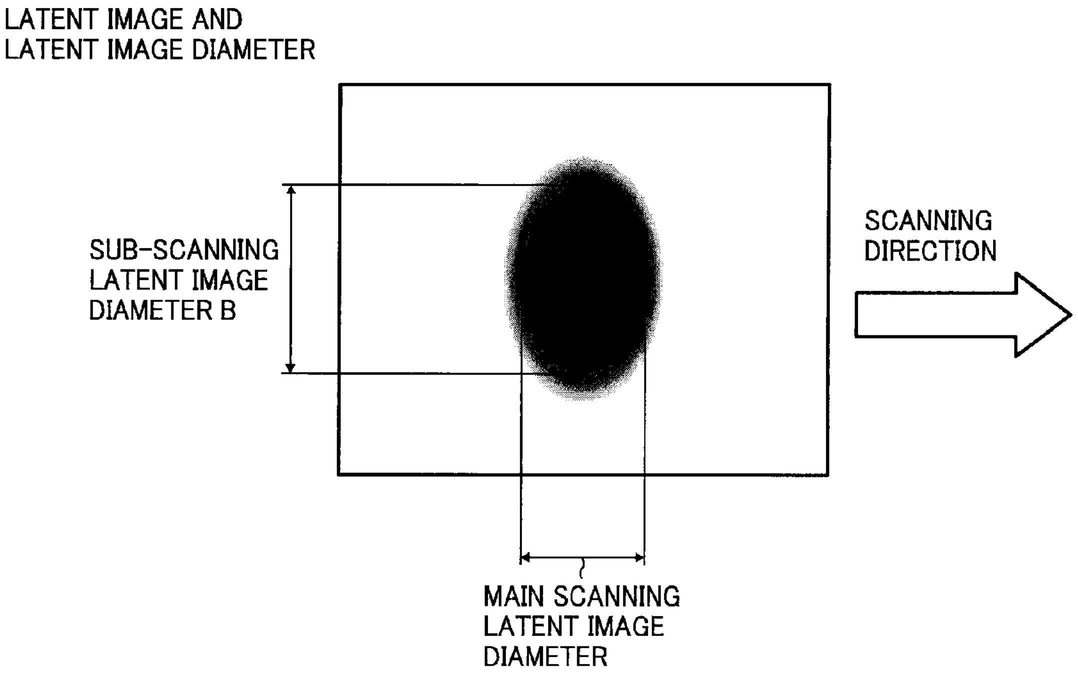

FIGS. 15A, 15B schematically illustrate a beam spot diameter and a latent image diameter.

In this case, the beam spot diameter is defined by the diameter of the range in which the beam spot light volume distribution is the maximum light volume of $e^{-2}$ or more.

The latent image diameter is determined according to the border of the contrast image.

It is known that the composition and the thickness of an electric charge transport layer and layer affect the light scattering and the scattering degree of the electric charge, or the composition of the electric charge generation layer affects the sensitivity. However, the clear mutual relationship is unknown.

Consequently, by changing the photoconductor composition and the thickness of the electric charge transport layer and the composition of the electric charge generation layer, in the electrostatic latent image measurement method by means of the electrostatic latent image device of this embodiment, the exposure and the measurement of the latent image are conducted under the condition which is the same as the condition for use in the image forming device, for example, a charged potential of 800V, an exposure energy of 4 $mJ/m^2$, a light source wavelength of 780 nm or below, and a beam spot of 60 μm in the sub-scanning direction.

As illustrated in FIGS. 15A, 15B, if a photoconductor which satisfies $1.0<B/A<2.0$ is selected, where the beam spot diameter in the sub-scanning direction on the surface of the photoconductor is A and the latent image diameter in the sub-scanning direction is B, an image forming device which can obtain a final output image having stable tone and sharpness can be achieved.

In this case, since the scattering of light and the diffusion of electric charge always occur in any photoconductor, the lower limit of 1.0 is a principle limit which does not become lower than that, and the upper limit 2.0 is a necessary limit for ensuring the stable tone and sharpness in the final output image.

Embodiment 2

Next, an electrostatic latent image measuring device according to Embodiment 2 of the present invention will be described.

Figure 16:
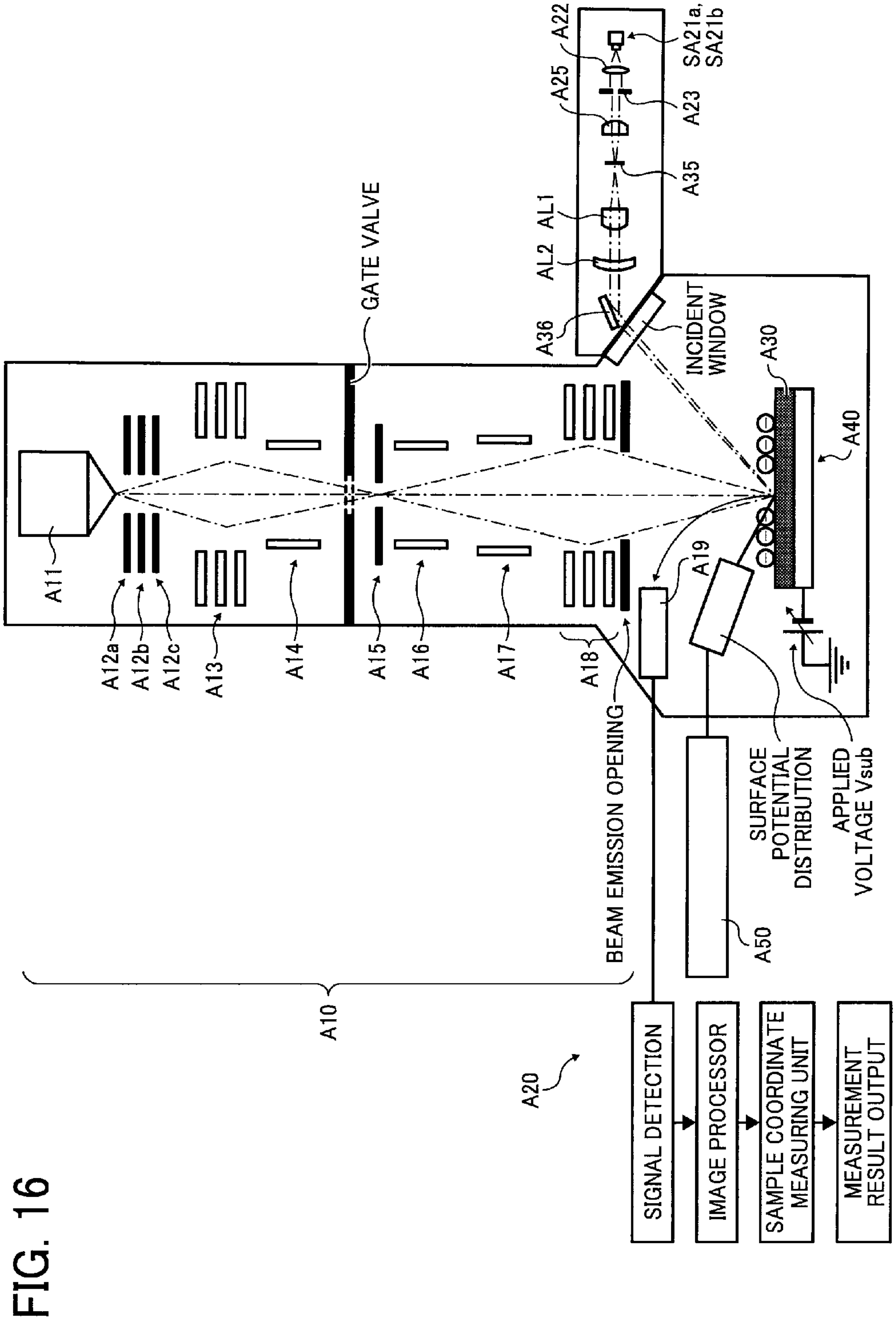
FIG. 16 is view illustrating an optical arrangement of an electrostatic latent image measuring device according to Embodiment 2 of the present invention.

FIG. 16 illustrates the electrostatic latent image measuring device of this embodiment.

In this embodiment, most of the parts are the same as those in Embodiment 1, so the same reference numbers are applied to the same parts and the description will be omitted or simplified. Hereinafter, different parts from Embodiment 1 will be specifically described.

If the surface of the photoconductor sample includes an electric charge distribution, an electric field distribution according to the electric charge distribution on the surface is formed in a space.

For this reason, the secondary electron generated by the incident electron is brought back by this electric field, and the number of electrons which reach the detector is reduced.

A contrast image according to the electric charge distribution on the surface is thereby detected, in which the portion having high electric field intensity is dark and the portion having low electric field intensity is light.

When exposing, the exposed portion becomes black and the non-exposed portion becomes white. The formed electrostatic latent image can be measured If the sample is charged, the orbit of the incident electron curves by the influence of the electrification charge, and the scanning area changes.

Figure 18A:
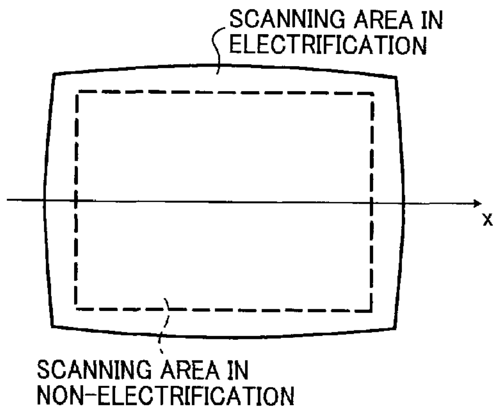
FIG. 18A is a view illustrating the change in the scanning area by charging a photoconductor.
Figure 18B:
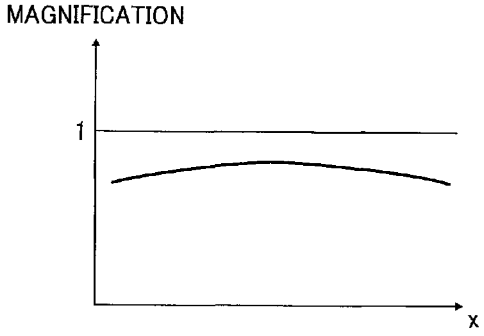
FIG. 18B is a graph illustrating the change in the scanning area by charging the photoconductor.

FIGS. 18A, 18B illustrate the change in the scanning area in the electrification.

FIG. 18A illustrates the relationship between the scanning area in the electrification and the scanning area in the non-electrification. It can be seen from FIG. 18A that the scanning area of the incident electron when the sample is charged to negative is wide with the scanning area in the non-electrification state as a standard.

It can be also seen that distortion occurs.

As a result, if the non-electrification time is 1, the scanning magnification of the observation area in a section vertical to the x axis becomes as illustrated in FIG. 18B.

The magnification depends on the charged electric potential. In the area of −500 to −1000V of the charged potential, the magnification is reduced at about 5 to 20% compared to the non-electrification time.

Accordingly, if the size is measured from the loaded image data by the size in the non-electrification time, an error occurs at the change in the magnification.

Therefore, it is necessary to accurately measure the magnification in the electrification state.

In order to measure the actual size of the loaded image data, one feature of this embodiment is to include an optical system A50 (refereed to FIG. 16) for exposure, which exposes a pattern having a known size, and corrects a coordinate, so as to form a latent image pattern having a known size.

Figure 17:
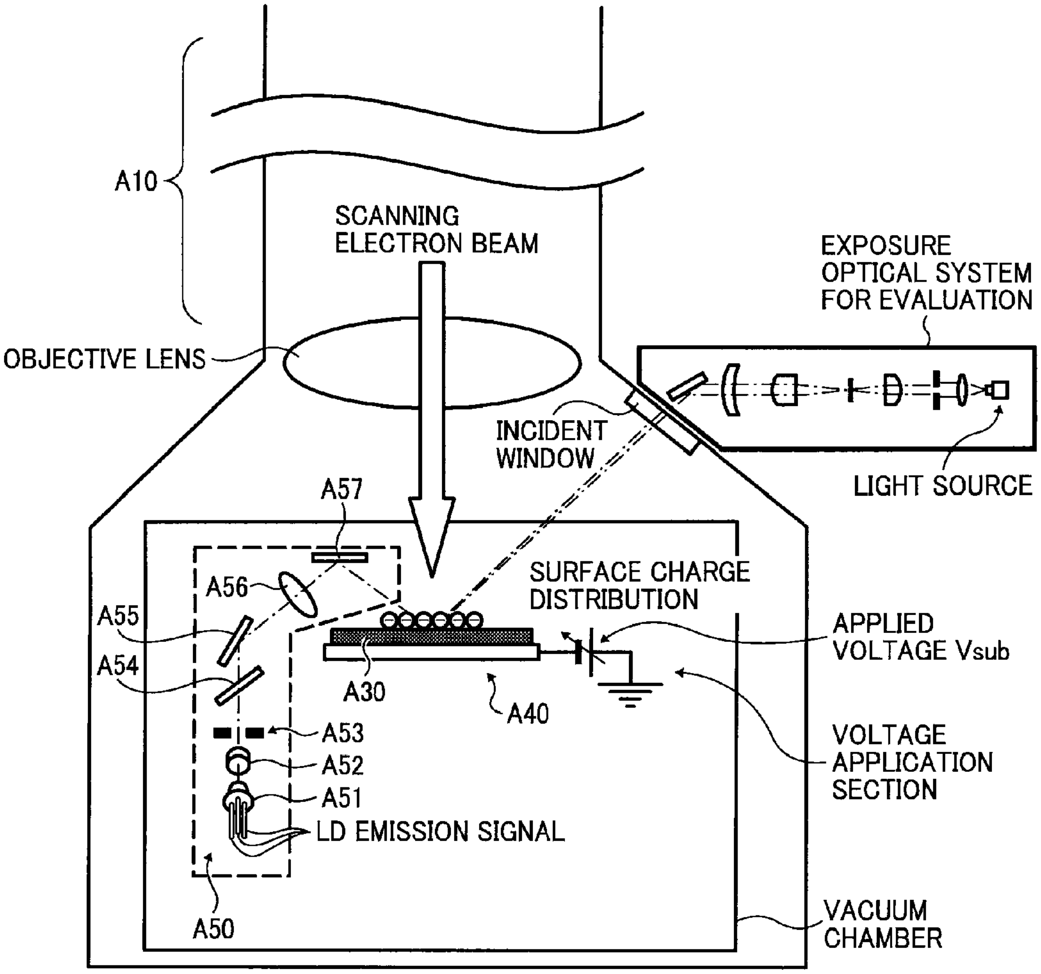
FIG. 17 is a view illustrating an optical arrangement of an optical system for exposing in Embodiment 2.

FIG. 17 illustrates the optical system A50 for exposure, which corrects a coordinate according to the present embodiment.

In FIG. 17, the optical system A50 includes an LD light source A51 which irradiates light with a wavelength of 400-800 nm, such as an LD, a collimator lens A52, an aperture stop A53, a mask pattern A54, a condensing lens A56, and mirrors A55, 57 each of which curves an optical path.

Figure 23:
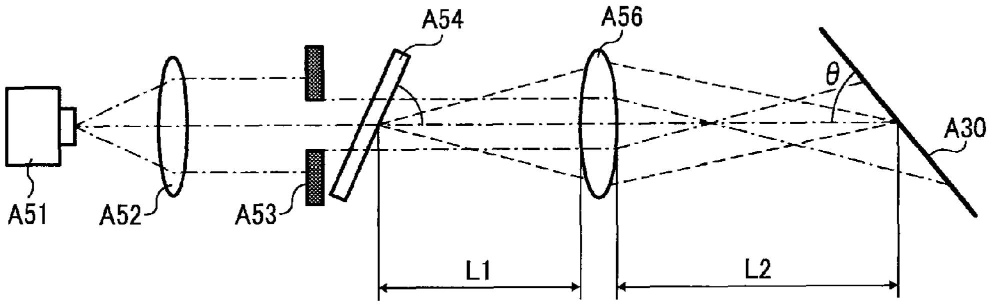
FIG. 23 is a view illustrating an optical arrangement of an optical system for correcting a coordinate in Embodiment 2.

FIG. 23 illustrates a structure of the optical system A50.

Where the object distance from the mask pattern A54 to the condensing lens A56 is L1, and the image distance from the condensing lens A56 to the surface of the sample is L2, a focusing magnification in the direction vertical to a face including an optical axis is $\beta=L2/L1$.

The mask pattern A54 includes a pattern having a portion through which parallel light from the LD light source A51 passes and a portion which blocks the parallel light from the LD light source 51.

The laser light goes in the direction of the photoconductor sample A30 while passing, diffracting or scattering by the mask pattern A54.

The condensing lens A56 is disposed such that the mask pattern 45 and the surface of the photoconductor sample A30 are conjugated.

Since the focusing magnification β and the pattern size are previously known, the pattern size and the pitch on the surface of the photoconductor sample A30 can be calculated, and a desired latent image pattern can be formed on the surface of the sample.

Since the optical system A50 irradiates from an oblique direction such that the irradiation area of the optical system A50 does not overlap with the irradiation area of the electron beam, the surface of the sample (image face) can be inclined relative to the optical axis.

According to the inclination of the image face, the mask pattern A54 can be inclined, and thus, the regular pattern of the mask pattern A54 can be focused on the image face.

In the example illustrated in FIG. 23, the electrostatic latent image measuring device is constituted such that the incident angle relative to the photoconductor sample A30 is about 45°.

In this case, the pattern of the latent image distribution formed by the mask pattern A54 is increased at $\sqrt{2}$ times in the inclination direction, compared to the case in which the irradiation direction is vertical. Accordingly, the mask pattern A54 can be previously designed according to the increase.

FIGS. 19A-19D illustrate examples of the mask pattern A54 for exposing.

At least one exposure pattern is required if a size and a focusing magnification are known. However, since the latent image is larger than the conjugate image on the surface of the sample, distance between the points is calculated by using two points or more and obtaining the center of each point.

In order to measure both sizes of xy, it is preferable to use 3 points or more.

Figure 19A:
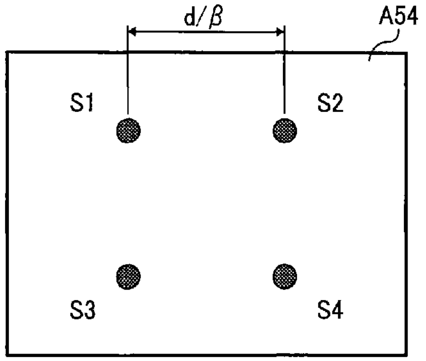
FIGS. 19A, 19C, 19D are views each illustrating an example of an exposure master pattern which can be used in Embodiment 2.

FIG. 19A illustrates an example in which the mask includes the total of 4 latent image forming patterns S1, S2, S3, S4.

The size and pitch of the mask pattern and the focusing magnification of the optical system are previously obtained.

Where the focusing magnification of the optical system is β and the interval of the above patterns on the mask is d/β, as the coordinate on the surface of the sample, the patterns S1, S2 are exposed at the interval d, and the latent image is formed.

Figure 19B:
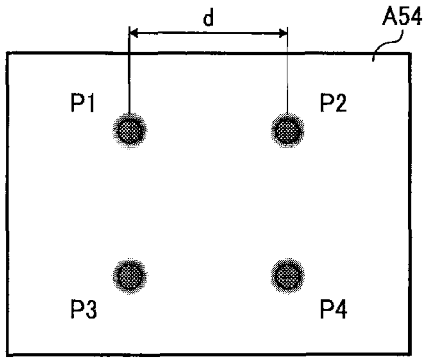
FIG. 19B is a view illustrating an example of a latent image obtained by the master pattern.

In this condition, the latent image is loaded as the latent image data as illustrated in FIG. 19B.

In order to measure the size of the line connecting the pattern S1 and the pattern S2 by the patterns S1, S2, an interval per one pixel of an image in the horizontal direction can be obtained by $d/(x2-x1)$, where the central position of the loaded image data of the latent image patterns by the patterns S2, S2 is P1 (x1, y1), P2 (x2, y1).

Accordingly, the interval per one pixel of the loaded image in the P1-P2 direction can be accurately measured.

By calculating P1 and P3 as described above, an interval per one pixel of an image in the vertical direction can be obtained by $d/(y3-y1)$, where P3 (x1, y3).

Accordingly, the interval per one pixel of the loaded image in the P1-P3 direction can be measured.

In the observation area on the horizontal plane, if 1 mm having pixels corresponding to XGA (1024×768 pixels) is loaded, the position can be specified in a resolution of about 1 μm.

There is also a method of calculating a central position by the gravity center of signal intensity of a latent image.

By using this method, the central portion can be calculated in one pixel or less, so that the size can be measured with high accuracy.

Figure 19C:
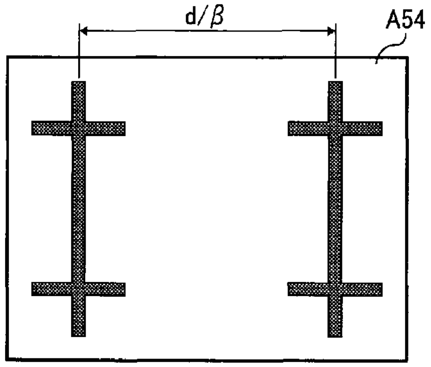
Figure 19D:
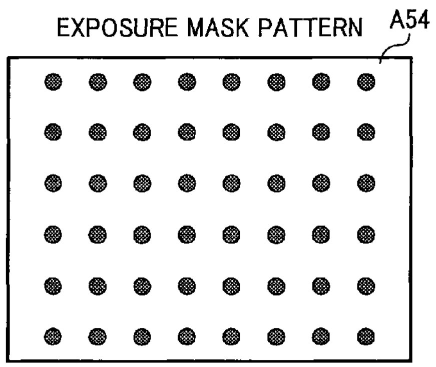

The latent image pattern can be a parallel line shape as illustrated in FIG. 19C. As illustrated in FIG. 19D, 3 latent image patterns or more can be disposed to conduct an averaging process.

Figure 20:
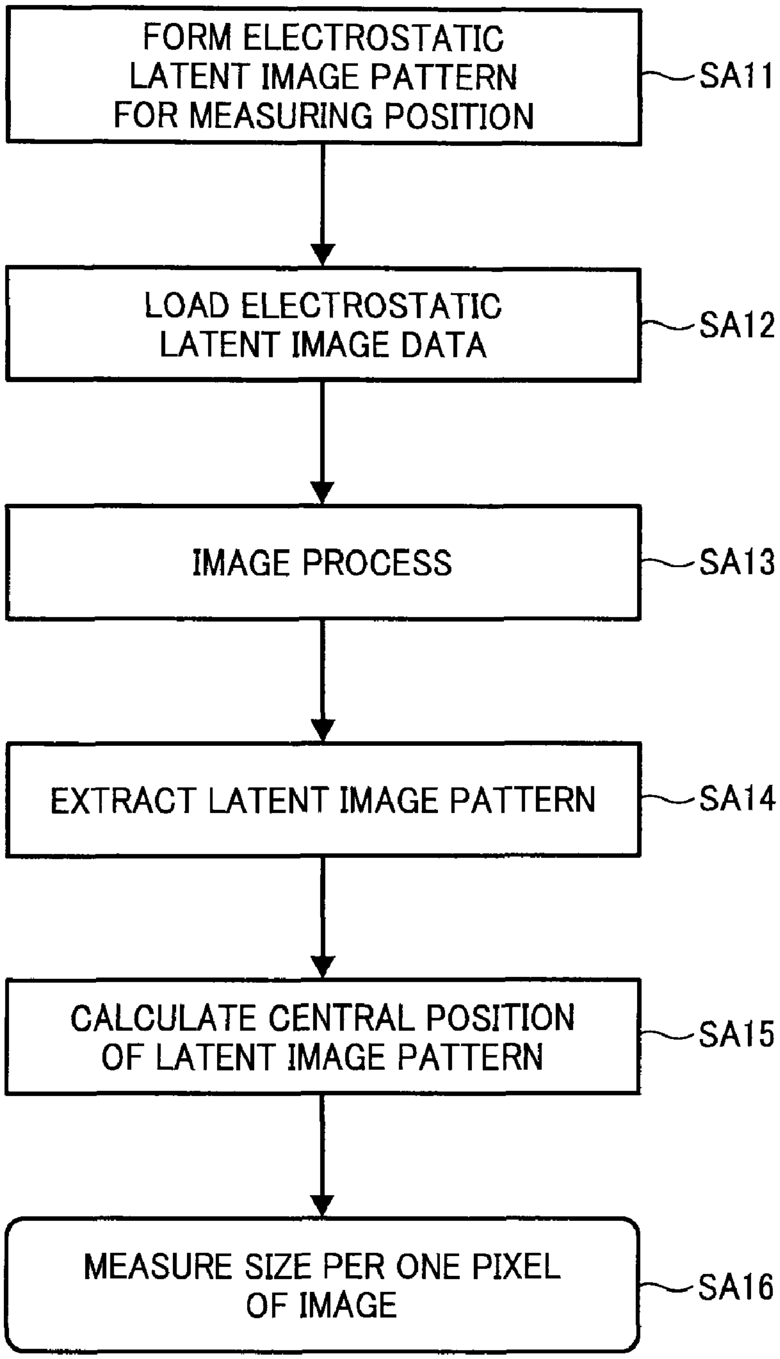
FIG. 20 is a flow chart illustrating a measuring procedure in Embodiment 2.

FIG. 20 illustrates the flow of the above measurement method.

The method is conducted in order from a process which forms an electrostatic latent image pattern for measuring a measurement position (SA11), a process which loads electrostatic latent image data (SA12), an image process (SA13), a process which extracts a latent image pattern (SA14), a process which calculates a central position of a latent image pattern (SA15), and a process which measures a size per one pixel (SA16).

Next, a method of forming an electrostatic latent image in this embodiment will be described.

In FIG. 16, the electron beam is irradiated to the photoconductor sample A30 from the charged particle optical system A10.

By setting the acceleration voltage to the acceleration voltage |Vacc| higher than the acceleration voltage in which secondary-emission coefficient becomes 1, the number of incident electrons exceeds the number of emission electrons, so that the electrons are accumulated in the photoconductor sample A30, resulting in the charging-up.

As a result, the photoconductor sample A30 is uniformly charged to negative.

By appropriately controlling the acceleration voltage and the irradiation time, a desired charged electric potential can be formed on the photoconductor sample A30.

Next, the photoconductor sample A30 is exposed by the optical system A50.

The optical system A50 substantially has a structure which is the same as the optical system A20 in Embodiment 1, and is adjusted to form a desired beam diameter and a desired beam profile.

If the surface of the sample includes an electric charge distribution, an electric field distribution according to the electric charge distribution is formed in a space.

For this reason, the secondary electron generated by the incident electron is brought back by the electric field, and the number of electrons which reaches the detector is decreased.

Therefore, in the electric charge leakage portion, the exposed portion becomes black and the non-exposed portion becomes white, and a contrast image according to the electric charge distribution can be measured.

By forming latent image patterns whose intervals are known on the surface of the photoconductor sample A30, an average magnification can be measured.

However, as illustrated in FIG. 18A, 18B, the magnification is locally changed to a small degree.

If the surface includes uneven electrification, the magnification certainly changes.

The change by the uneven electrification is not large compared to the change in the average magnification, but if the local magnification can be corrected, the accuracy is further improved.

As a method of correcting the local magnification, it is preferable to form 3 latent image patterns or more in a line in which the pitch on the surface of the sample is known.

In particular, it is preferable to provide patterns having an equal interval, and measure the linearity from the degree of the uneven interval of the latent image pattern.

Figure 21A:
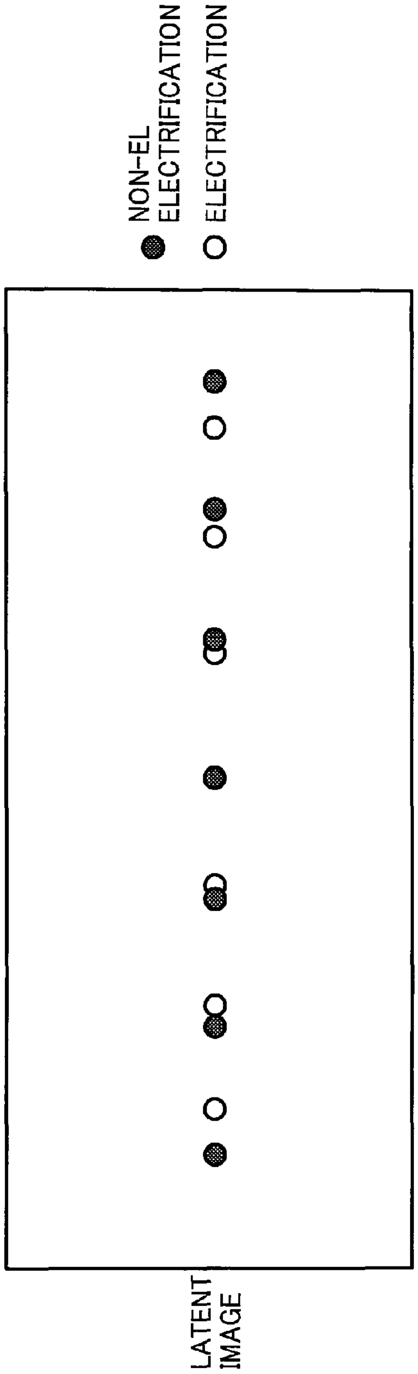
FIG. 21A is a view illustrating an example of the local change in the magnification in the photoconductor.
Figure 21B:
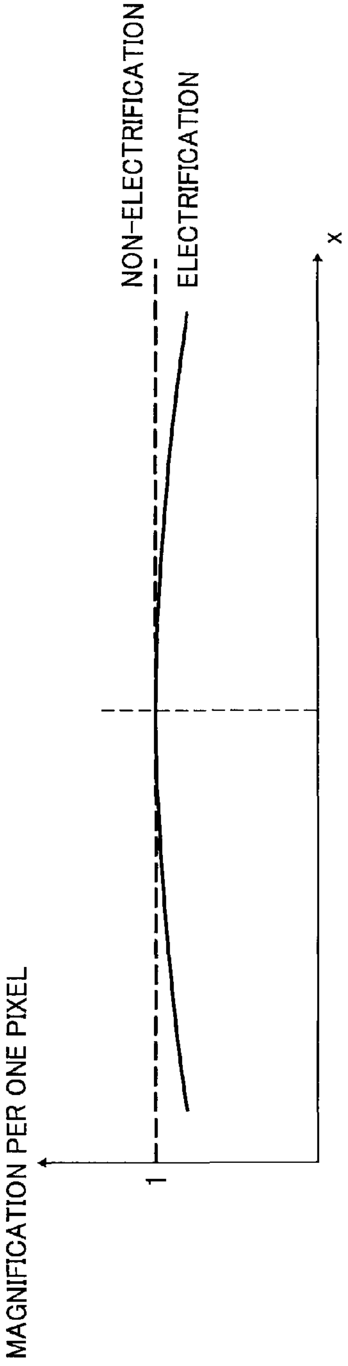
FIG. 21B is a graph illustrating the local change in the magnification in the photoconductor.
Figure 22:
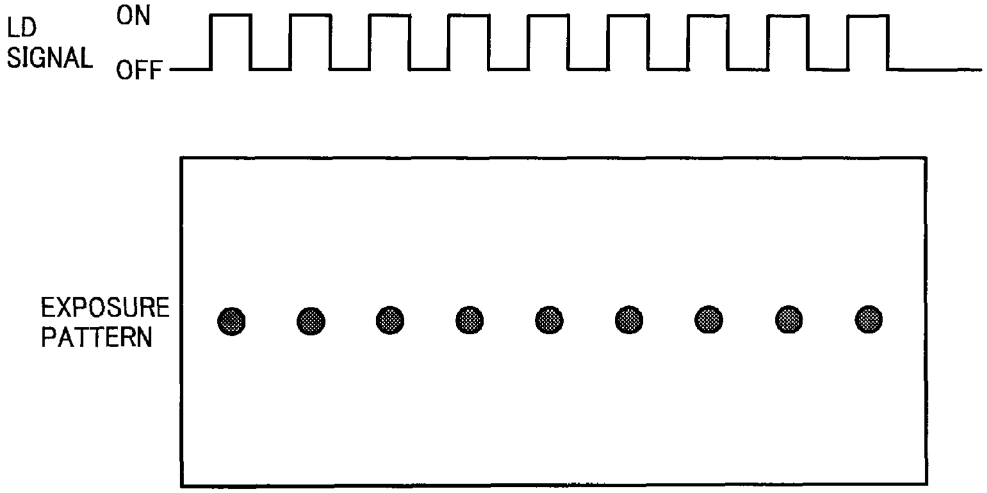
FIG. 22 is a waveform view and a model view illustrating a pattern for measuring by the optical system and the example of the LD operation for forming the pattern.

FIG. 21A, 21B illustrates a schematic view for measuring a local magnification.

On the surface of the sample, 3 exposure patterns or more (in FIG. 21A, 7 patterns) are formed at equal intervals.

In the non-electrification, the latent image patterns are formed on the surface of the sample at equal intervals.

However, by the electrification, the loaded latent images are formed at unequal intervals (reference to FIG. 21A).

Where the central portion of the latent image patterns next to each other on the loaded image data is Pi (xi, y0), Pj (xj, y0), an interval per one pixel of an image of Pi–Pj can be expressed by d/{P_j (x_i+1, y0)–Pi (xi, yo)}.

By conducting the calculation similar to the above for each latent image pattern, the local magnification change can be calculated.

As another calculation method, a plurality of latent image patterns can be used as one reference for calculating.

Where the central portion of the latent image patterns S1, S2 on the loaded image data is P1 (x1, y1), P2 (x2, y1), the correction function as illustrated in FIG. 21B can be formed by correcting this result with space interpolation or an approximate curve, and the size of the latent image can be further accurately measured.

As a method of forming a latent image pattern for measuring a size of a latent image, an optical system for exposure can be used.

A laser light scanning unit deflects a luminous flux from a light source by a polygon mirror having deflection and reflection faces at an equal angular speed, condenses the deflected luminous flux on a surface to be scanned as a light spot by an optical system for scanning and focusing, and scans the surface of a photoconductor sample at an equal speed.

Since the scanning is conducted on the surface of the sample at an equal speed, the exposure patterns at equal intervals are easily formed on the surface of the sample by flashing the LD light source 51 at equal time intervals.

The pitch of the interval of the exposure patterns can be easily changed by changing the frequency of the flashing of the LD light source A51.

By using the laser light scanning unit, the latent image pattern can be freely changed by the ON/OFF of the electric signal of the LD light source A51.

Accordingly, when changing the magnification percentage, the size and pitch according to the change can be appropriately selected, and in the laser light scanning unit, the lighting conduction of the light source is changed.

Moreover, when the distortion is large, the neighboring pitch can be reduced.

The patterns whose intervals are not equal can be easily formed. Therefore, in a condition in which the distortion occurs by the electrification, the latent image patterns are formed at equal intervals, and the change in the magnification can be measured from the condition of the ON/OFF of the electric signal of the LD light source A51.

The optical system for measuring a size and the optical system for exposure, which evaluates a latent image, can be commonly used.

The optical system for exposure is originally designed for lighting image patterns at equal intervals, so that the condition of the optical system for exposure is suitable for the condition of the optical system for measuring. For this reason, if the optical system for measuring and the optical system for exposure are commonly used, space can be saved, the system can be simplified and also the size can be stably measured.

Figure 24:
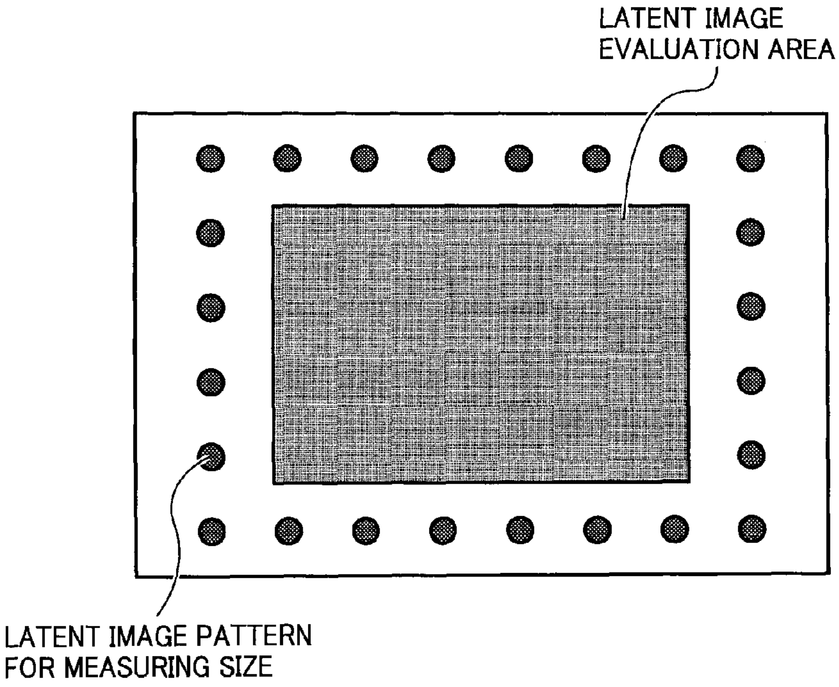
FIG. 24 is a view illustrating an example of a latent image pattern when simultaneously forming a latent image for measuring and a latent image for evaluating which are applicable in Embodiment 2.

The size measurement is conducted before measuring the latent image so as to be used as correction data, but the measurement of the actual latent image and the size measurement can be simultaneously conducted as illustrated in FIG. 24.

As illustrated in FIG. 24, the latent image patterns for measuring a size are formed in a periphery area having a high sensitivity and large influence of a magnification, and the electrostatic latent image to be evaluated is formed near the center.

By simultaneously forming the latent image patterns for measuring a size and the electrostatic latent image to be evaluated, the influence of the magnification change by the actual electrification can be corrected every time, and the measurement can be conducted with high accuracy.

The size on the surface of the sample in the electrification can be measured in high resolution of 1 μm or below, which was difficult in a conventional technology, by using the above method.

If the exposure energy density is smaller than 0.5 $mJ/m^2$, a narrow latent image is measured, so the detection becomes difficult.

If the exposure energy density is larger than 10 $mJ/m^2$, a latent image becomes large by the excessive exposure although the latent image is formed, and the central position can not be accurately measured.

If the size of the latent image becomes 10 μm or below, the size generally becomes small and a deep latent image is formed. However, since a focus depth is narrow, the beam spot size on the surface of the photoconductor becomes large, which becomes an error factor, as it moves away from the focus position.

If the size of the latent image becomes 100 μm or more, the central position can not be accurately measured.

It is preferable for the irradiating exposure energy density to be 0.5-10 $mJ/m^2$, and the size of one latent image to be 10 μm or more and 100 μm below.

In addition, regarding the size of the latent image, the above size indicates the sectional direction to be measured, and its vertical direction can be larger than that.

More particularly, the pattern can be a line pattern.

Next, an image forming device according to the embodiment of the present invention will be described.

This image forming device uses the electrostatic latent image measuring device according to the embodiment of the present invention and the photoconductor having the data obtained by the method of measuring the electrostatic latent image according to the embodiment of the present invention.

Figure 25:
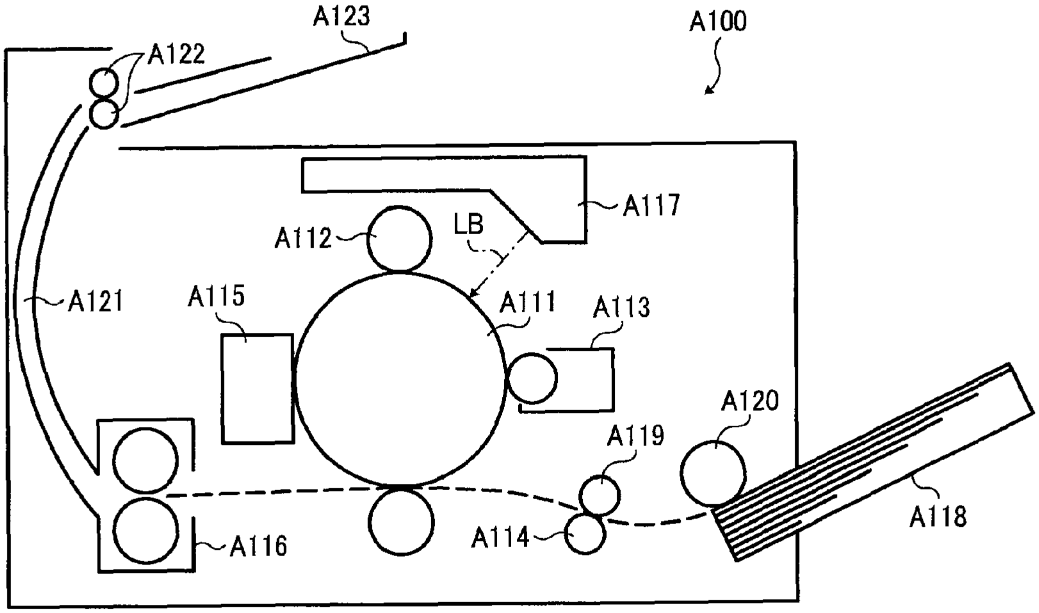
FIG. 25 is a front view schematically illustrating an embodiment of an image forming device.

FIG. 25 illustrates an example of a laser printer as one example of the image forming device.

A laser printer A100 includes a cylindrical photoconductive photoconductor as an image carrier A111.

The image carrier A111 includes therearound a charging roller A112 as a charging station, a developer station A113, a transfer roller A114 and a cleaning station A115.

In this embodiment, the contact type charging roller A112 in which the generation of ozone is small is used as the charging station, but a corona charger using corona discharge can be used as the charging station.

The laser printer A100 also includes a laser light scanning unit A117 which conducts exposure by the scanning of a laser beam LB between the charging roller A112 and the developer station A113.

In FIG. 25, reference number A116 denotes a fuser station, reference number A118 denotes a cassette, reference number A119 denotes a pair of resist rollers, reference number A120 denotes a paper feeding roller, reference number A121 denotes a transfer path, reference number A122 denotes a pair of paper discharging rollers, and reference number A123 denotes a tray.

When forming an image, the image carrier A111, which is a photoconductor, rotates at a constant speed in the clockwise direction in FIG. 25, and the surface of the image carrier is uniformly charged by the charging roller A112, and an electrostatic latent image is formed by the exposure of light writing with the laser beam of the laser light scanning unit A117.

The formed electrostatic latent image is a so-called negative latent image in which an image portion of the image is exposed.

The electrostatic latent image is reversely developed by the developer station A113 and a toner image is formed on the image carrier A111.

The cassette A118 in which transfer paper is housed is detachably attached to the laser printer A100, and the top sheet of the housed paper is fed by the paper feeding roller A120 in the state as illustrated in FIG. 25.

The leading end portion of the fed transfer sheet is held by the resist rollers A119.

The resist rollers A119 send the transfer sheet to the transfer station in accordance with a timing in which the toner image on the image carrier A11 moves to the transfer position.

The sent transfer sheet is overlapped with the toner image in the transfer station, and the toner image is electrostatically transferred by the function of the transfer roller A114.

The transfer sheet onto which the toner image is transferred is fused by the fuser station A116, and then is discharged on the tray A123 by the paper discharging rollers A122 via the transfer path A121.

After the toner image is transferred, the surface of the image carrier A111 is cleaned by the cleaning station A115, and the residual toners and paper powder are eliminated.

By conducting the measuring method according to the embodiment of the present invention with the electrostatic latent image measuring device according to the embodiment of the present invention, a preferable latent image carrier can be used for the image forming device.

Therefore, the image forming device having high resolution, high durability and high reliability can be obtained.

Embodiment 3

In this embodiment, an electrostatic latent image is formed on the photoconductor by irradiating the charged particle beam, and the condition of the photoconductor onto which the electrostatic latent image is formed is measured with high resolution in a short time without destroying the latent image.

Moreover, a device which can quantitatively evaluates a beam profile of an electrostatic latent image with high accuracy and can be actually used for not only the beam profile but also an electrophotographic device, or evaluate an electrostatic latent image obtained by a photoconductor by dynamically conducting beam scanning, a device which can measure the influence on the formation of the latent image such as a reciprocity failure by multi-exposure or can generate and reproduce these phenomenon on the photoconductor, and a device which can measure and evaluate an electrostatic latent image on the photoconductor, a residual image and time degradation, can be achieved.

In order to achieve the above device, a semiconductor laser having a wavelength from a visible light area to an infrared light area is used as an exposure light source, and an electrostatic latent image is formed by the scanning of the light ray and the ON/OFF of the light from the optical system.

The semiconductor laser oscillates a laser by applying a reference driving current or more. In order to increase the response of the laser emission, a constant driving current (bias current) which is less than a reference current is always applied to the semiconductor laser even in a non-emission state.

By applying such a bias current, the semiconductor laser emits light by a mechanism similar to an LED without emitting laser light.

More particularly, when the semiconductor laser is used, the semiconductor laser emits light even in the non-emission state.

In this case, since the light volume is very small, it does not affect the electrostatic latent image when the irradiation time is short. However, even if the light volume is very small, the integrated light volume is increased if it is irradiated for a long period of time, and the electrostatic latent image is formed if the integrated light volume reaches the necessary exposure amount of the photoconductor.

The small emission by the application of the bias current becomes noise, which affects the original electrostatic latent image.

Accordingly, in the device according to the embodiment of the present invention, in order to form a desired electrostatic latent image by using a semiconductor laser, unnecessary light emitted by the bias current is blocked by a mechanical shutter and flare light when scanning can be blocked, so that a preferable electrostatic latent image is formed.

By blocking the offset light volume by the bias current with a mechanical shutter, the multi-exposure, which becomes an error factor for forming an electrostatic latent image, can be prevented.

In the device according to the present embodiment, since the semiconductor laser is used, a compact device can be provided at low cost compared to a device using a gas laser as a light source.

In this electrostatic latent image measuring device according to the present embodiment, the scanning of the optical system does not electrically and magnetically affect a vacuum chamber, and the mechanical vibration can be eliminated. Therefore, the light can be irradiated on the surface of the sample by the optical system with high accuracy and also the optical system, which can be used in an actual device (image forming device), can be adopted, so that a pure analysis can be conducted without having another factor which is different from the actual device.

As described above, in the electrostatic latent image measuring device according to the present invention, another factor which is different from the actual device is eliminated, and a flexible design is adopted for achieving the analysis without having a longstanding problem.

At first, the electrostatic latent image measuring device according to the present embodiment will be described.

Figure 26A:
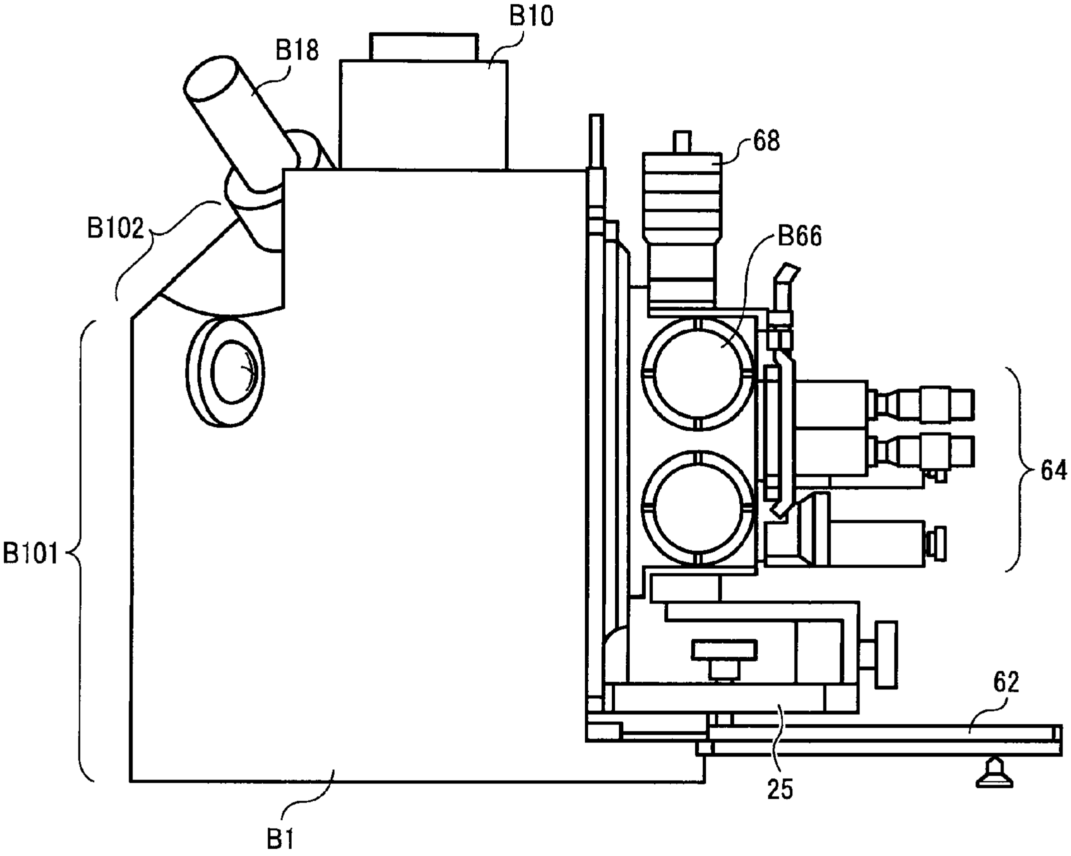
FIG. 26A is an external lateral view illustrating the electrostatic latent image measuring device.
Figure 26B:
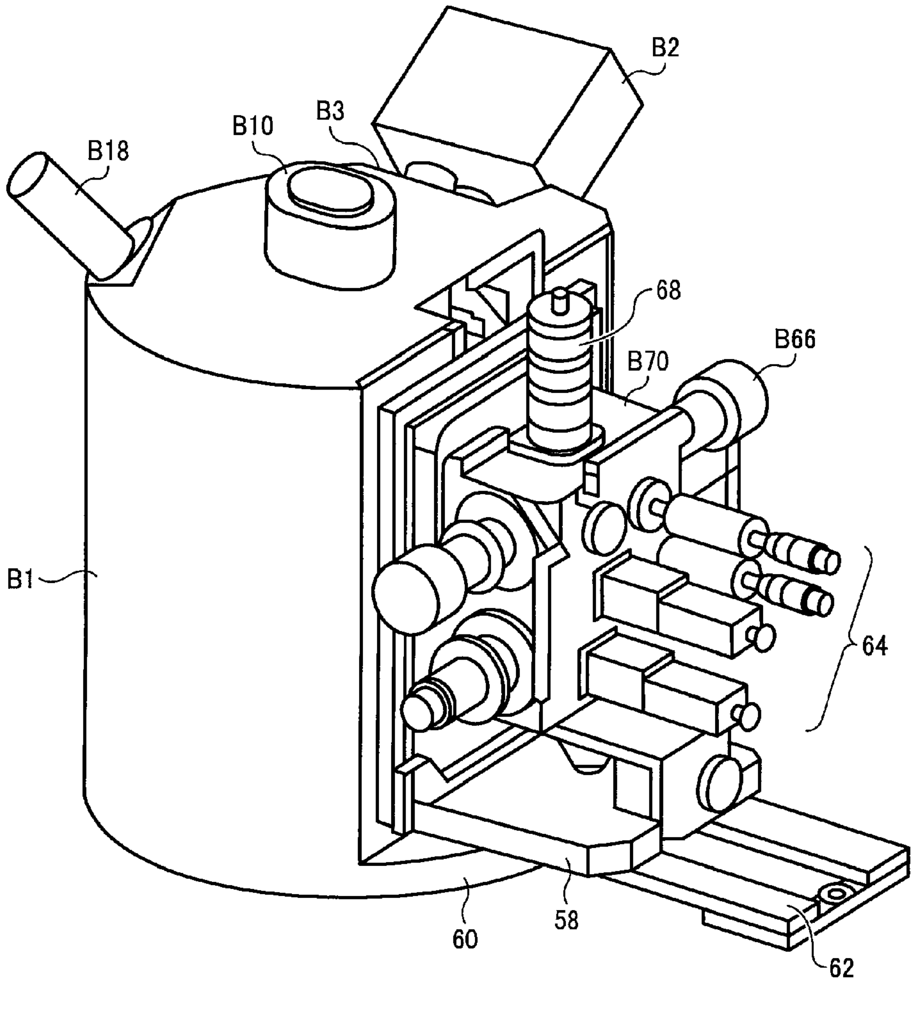
FIG. 26B is a view illustrating the entire electrostatic latent image measuring device as viewed down from an oblique 45° direction.

The electrostatic latent image measuring device according to the present embodiment, as illustrated in FIGS. 26A, 26B includes a vacuum chamber B1 and an optical system B2 for exposure which is connected to a shoulder portion of the vacuum chamber B1 via a window B3.

(Vacuum Chamber B1)

As illustrated in FIGS. 26A, 26B, the electrostatic latent image measuring device according to the present embodiment includes the vacuum chamber B1.

The vacuum chamber B1 is maintained in a high vacuum condition by discharging air inside the chamber by means of a vacuum pump when the electrostatic latent image measuring device is used.

In the vacuum chamber B1, the photoconductor is charged by irradiating a scanned charged particle or light onto the photoconductor which is a sample, or a latent image is generated by generating an electric charge distribution after charging the sample.

By using the electrostatic latent image measuring device, the photoconductor condition which is charged or has a latent image can be visualized, or a transit phenomenon such as a temporal change which occurs on the sample is tracked, and the factor of the change is analyzed.

Figure 27:
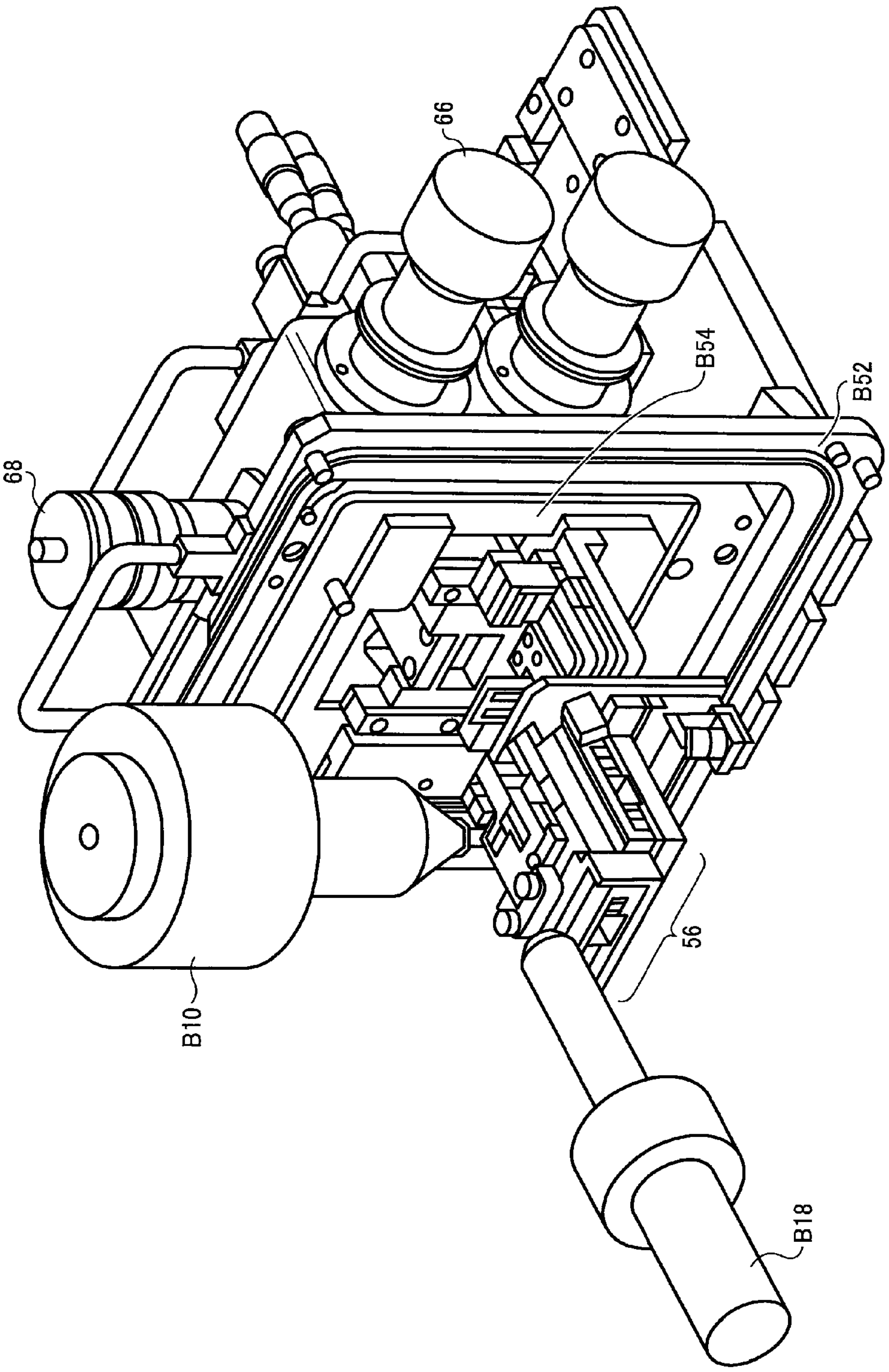
FIG. 27 is a view illustrating a structure in a chamber of the electrostatic latent image measuring device.

As illustrated in FIG. 27, the vacuum chamber B1 in FIGS. 26A, 26B includes inside thereof a sample stage B56.

In the electrostatic latent image measuring device of this embodiment, the sample is placed on the sample stage B56, and a portion of the sample to be measured can be moved to a predetermined position (X0, Y0, Z0).

As illustrated in FIG. 26A, the vacuum chamber B1 includes a body portion B101 and a shoulder portion B102. The body portion B101 has a tubular body having a D-shape in the outer circumference. The side wall portion of the body portion B101 includes an opening (not shown) and a flange mounting section (not shown) formed on this opening.

FIG. 27 is an example illustrating the inside of the vacuum chamber B1 from which the circumference wall section is removed.

However, the driving and operating sections of the XYZ stage are illustrated together with the side wall portions (large flange B52 and small flange B54) of the vacuum chamber B1.

As illustrated in FIG. 27, the sample stage B56 (XYZ stage) is mounted inside the vacuum chamber B1 for moving the sample in the three directions.

The sample is placed and fastened on the sample stage B56.

For example, after fastening the sample on the sample stage B56 at atmospheric pressure, the entrance (not shown) for the sample is closed, and the air in the vacuum chamber B1 is deaerated.

The measuring position of the sample is located in the predetermined position (X0, Y0, Z0) by a sample stage positioning unit provided outside the vacuum chamber, in order to locate the sample in a predetermined position in the vacuum chamber B1.

The sample stage B56 is attached to the small flange B54 which is slidably incorporated to the large flange B52.

A case B70 is disposed outside the vacuum chamber B1 so as to hold the large flange B52, and the case B70 includes a stepping motor, a microhead and the like as the driving section of the sample stage B56. Air leakage of these is prevented by an O-ring.

The harness, which takes out a signal from the vacuum chamber B1 and supplies power to the vacuum chamber B1 from the outside, can be inserted from a feed through B66. The sample stage, the stage driving unit, the feed through and the like are unitized together with the flange, so that the vacuum degree in the vacuum chamber B1 is maintained in a constant condition and the leakage is prevented.

This case B70 includes a magnetic shield section formed by a permalloy, for example. The weight of the case B70 is reduced by using an aluminum alloy or a magnesium alloy.

This vacuum sample stage unit is placed on a stage for the vacuum sample stage unit disposed on a guide rail and slides, so that it is detachably attached to the electrostatic latent image measuring device as illustrated in FIG. 27.

The top portion of the vacuum chamber B1 includes a charged particle optical system B10 which irradiates a charged particle beam on a predetermined position of the sample with the approximate vertical direction as the central axis (hereinafter, this axis is referred to as a particle beam axis), so that the charged particle is irradiated on the sample on the sample stage B56.

The window is disposed in the shoulder portion B102 of the vacuum chamber B1 which is located in the direction of about 45° with the particle beam axis as a reference, relative to a predetermined position (X0, Y0, Z0) of the sample, i.e., the elevation direction of about 45° relative to the surface of the sample (horizontal direction), so as to maintain a high vacuum degree, and prevent the influence of outside light except for the scanning light as much as possible.

The vacuum chamber B1 includes the top portion provided with the charged particle optical system B10 as described above. In order to block the influence of an electric field or a magnetic filed on the electric beam to be irradiated from the charged particle optical system B10 as much as possible, the body portion B101 and the shoulder portion B102 of the vacuum chamber B1 are formed by using an iron material which is a magnetic body and a conductor.

Therefore, the electrostatic latent image measuring device of this embodiment prevents disturbance and noise to the charged particle as much as possible, so that it can obtain effective information.

If the electrostatic latent image measuring device is disposed on a vibration removing stage, and the vibration from the harness, the vacuum pump and an electric cable are removed, information without having noise can be thereby obtained.

As the charged particle from the charged particle optical system B1 for use in the electrostatic latent image measuring device according to the present embodiment, a particle which is affected by an electric field and a magnetic field, such as an electron beam or an ion beam, is used.

These beams can be obtained by using an ion gun or an electron gun, and also obtained by using a known ion beam device. A device for obtaining a beam is not limited Various elements can be used for the positive charged beam. It is not limited to, for example, hydrogen, noble gas, oxygen, carbon, nitrogen, or a metal.

Figure 28:
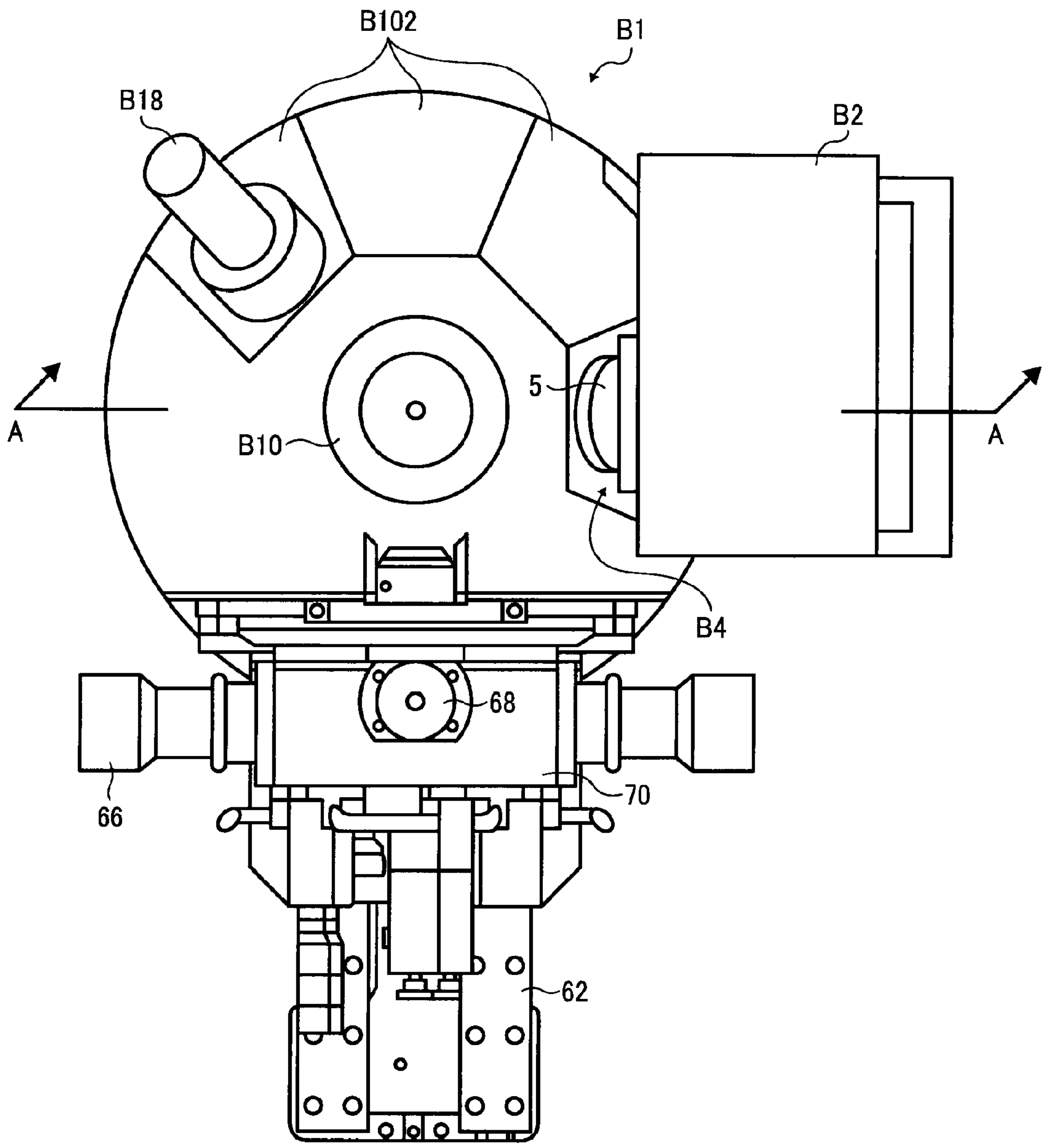
FIG. 28 is a view illustrating an example of the electrostatic latent image measuring device in which the optical system having a light source unit is disposed outside the chamber.

The flange can be freely disposed in the body portion B101 or the shoulder portion B102 of the vacuum chamber, so as to arrange the secondary electron detector B18 in the horizontal direction (90° direction relative to the particle beam axis) or the direction of about 45°, for example (FIGS. 26-28). Therefore, the charged particle beam is irradiated and the phenomenon generated in the sample is observed by the reflection particle or the irradiation of the charged particle beam.

(Exposure Optical System B2)

Next, the exposure optical system B2 for use in the electrostatic latent image measuring device according to the present embodiment will be described.

For example, the optical system B2 for use in the electrostatic latent image measuring device according to the present embodiment as illustrated in FIG. 28 is disposed on the shoulder portion B102 of the vacuum chamber B1 via the window (window plate) of the vacuum chamber B1. The optical system B2 includes a labyrinth section B4 for eliminating the entrance of outside light and a mechanical shutter which shields offset light. The optical system B2 is movably disposed in the scanning optical axis direction (elevation direction) of about 45° relative to the vacuum chamber 1.

The scanning light from the optical system B2 enters at about 45° (elevation direction) relative to the surface of the sample.

On the other hand, the secondary electron detector B18 for detecting a charged particle beam can be disposed in the direction of 45° lower from the vertical upper side relative to the particle beam axis, or in various directions so as to freely capture a particle beam such as a horizontal direction.

For example, when the scanning optical axis is an incident direction, the detector B18 can be disposed in the direction of 90° relative to the scanning optical axis, i.e., the opposite direction with the charged particle axis as a symmetric axis.

In FIG. 28, the detector B18 is disposed at 135° (in the direction of 90°+45°) in the horizontal direction (azimuth) with the scanning optical axis as a reference.

The detector B18 can be disposed in the right angle direction relative to the particle beam axis (the above-described vertical direction), i.e., the horizontal direction.

When providing the detector B18 in the horizontal direction, it can be disposed in a plane including the particle beam axis and the scanning axis or can be disposed in a plane (for example, a plane including particle beam axis) orthogonal to that plane.

For positioning the optical system B2, when the charged particle axis is limited to the vertical direction, the scanning optical axis can be slightly adjusted with a point at the junction of the charged particle axis in the vertical direction and the scanning optical axis as a predetermined position (X0, Y0, Z0).

The optical system B2 is movable in the optical axis direction relative to the window disposed in the shoulder portion of the vacuum chamber B1, so that the shape of the beam spot on the surface of the sample in the optical system B2, the beam shape and the beam diameter from the optical system B2 can be slightly adjusted.

More particularly, for aligning the optical axis and the charged particle axis, since the beam spot of the scanning light is irradiated to the photoconductor of the sample at about 45°, the beam shape and the beam spot diameter are slightly changed compared to the case when the beam spot vertically enters relative to the sample.

The sample has a cylindrical shape or a belt-like shape, which is not a plane, so the scanning laser light shape and the beam spot shape on the surface of the sample are further affected.

In this condition, in order to charge the sample and form the latent image, in the electrostatic latent image measuring device according to the present embodiment, a cross angle with the scanning optical axis is set in the direction of 45° when the charged particle beam axis is the vertical as described above, so as to observe (calculate) and further analyze various influences on the surface of the sample.

Figure 29A:
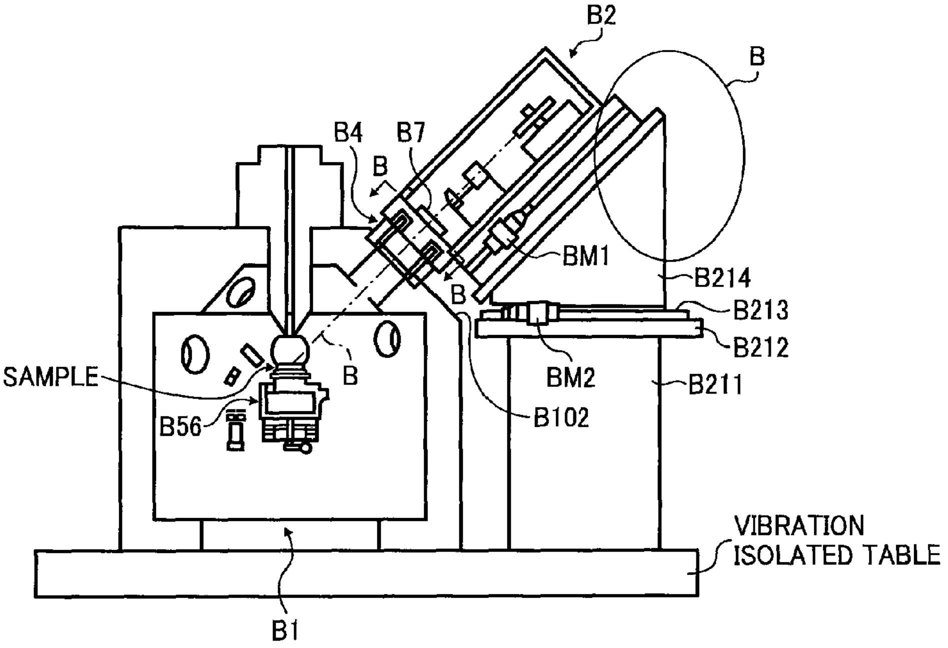
FIG. 29A is a view describing the positional relationship between the optical axis of the optical system for exposing and the irradiation axis of the charged particle irradiation section (vertical axis of vacuum chamber) in the A-A line in the example illustrated in FIG. 28.
Figure 29B:
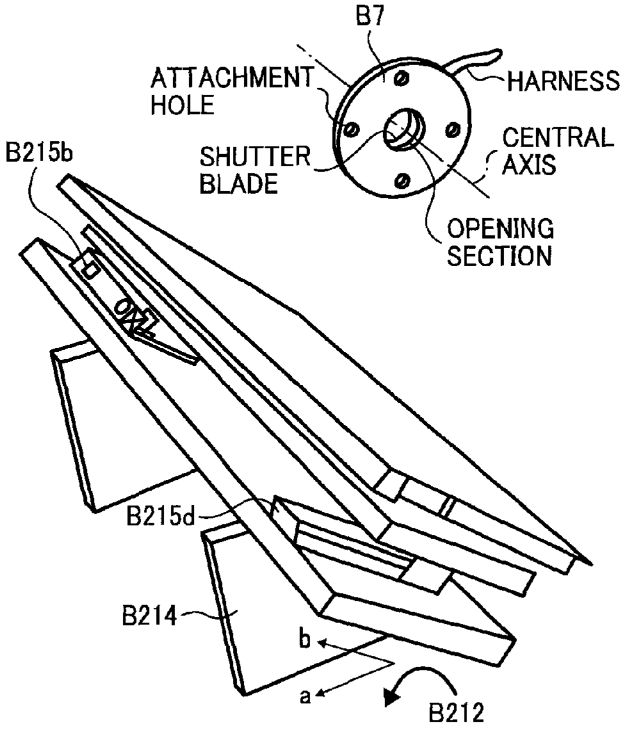
FIG. 29B is a view illustrating a main portion of the guide unit illustrated by B in FIG. 29A.
Figure 29C:
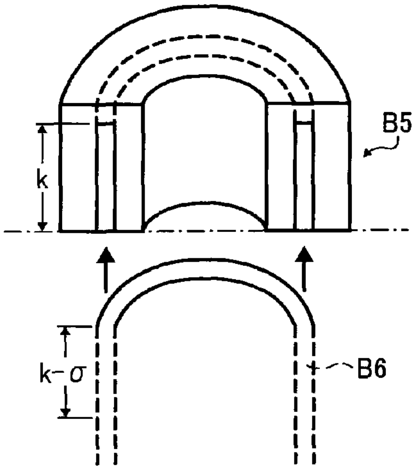
FIG. 29C is a view describing a labyrinth structure in the B-B line direction of FIG. 19A.

In the electrostatic latent image measuring device, as illustrated in FIG. 29A, 29B, 29C, in order to avoid outside light (stray light) to be irradiated on the sample, in the connected portion between the optical system B2 and the vacuum chamber B1, the portion except for the window is covered by a light-shielding member. Moreover, in the measuring device, the window is provided in the flange of the shoulder portion of the vacuum chamber, the edge portion of this window is covered by an outside light shielding tube, and a labyrinth structure is provided.

Therefore, the entrance of the stray light except for the scanning light is prevented.

In this embodiment, regarding a labyrinth section B4 having a labyrinth structure, a window (window plate) is provided in the flange provided in the shoulder portion B102 of the vacuum chamber B1, and the entire flange is shielded by the light-shielding tube.

The light-shielding tube includes an outer tube B5 and an inner tube B6. The inner tube B6 is disposed to surround the window (window plate), and the inner tube B6 is integrally attached to the vacuum chamber B1 via the flange.

In this embodiment, a mechanical shutter B7 is attached to the end face of the outer tube B5 on the optical system B2 side, and it is also integrally attached to the optical system B2.

However, the mechanical shutter B7 can be attached to the inner tube B6.

The mechanical shutter B7 includes a circular opening, and is arranged such that the central axis of the opening and the central axis of the outer tube B5 are coaxial.

The central axis of the outer tube B5 and the optical axis of the optical system B2 are coaxial. By positioning and fastening the outer tube B5 such that the central axis of the outer tube B5 and the central axis of the circular opening of the mechanical shutter B7 are coaxial, the opening diameter of the mechanical shutter B7 can be minimized, and the response of the mechanical shutter B7 can be improved.

The opening is always closed by a plurality of shutter blades. The shutter blades open by an outside signal by a predetermined amount, and then close by an outside signal after opening (exposing) for several milliseconds or more.

The opening time (exposure time) is controlled by freely controlling the outside signal.

Therefore, if the mechanical shutter B7 is opened just before forming an electrostatic latent image by scanning the photoconductor, and if the mechanical shutter B7 is closed just after forming the electrostatic latent image, the multiple exposure by the offset light generated by the continuous rotation of a polygon mirror B25 can be prevented (because it is difficult to suddenly stop the polygon mirror B25).

As illustrated in FIG. 29C, the leading end portion of the outer tube B5 includes a cylindrical concave portion. The inner tube B6 is inserted in the concave portion, so that the inner tube B6 is engaged with the outer tube B5, so as to form a labyrinth structure.

It is preferable to cover the outer circumference of the engaged portion by an elastic body made of a rubber or a rubberized nonwoven fabric, so that the entrance of the outside light into the vacuum chamber B1 can be prevented.

As illustrated in FIG. 29B, this labyrinth structure can be movable in a predetermined range in the optical axis direction of the optical system B2.

Therefore, fine adjustment of the focal point of the optical system B2 and the like can be simultaneously conducted.

(Structural Example of Optical System)

Next, a structural example of the optical system according to the present embodiment will be described.

The optical system for use in the electrostatic latent image measuring device according to the present embodiment includes at least a light source.

The scanning is conducted by controlling a deflection unit such as a galvano mirror and a polygon mirror, or is conducted such that a scanning light is fixed to irradiate from a constant direction.

In this case, a fixed mirror is used as the deflection unit, or the deflection unit such as the polygon mirror can be used in a fixed state by stopping the deflection mirror.

The optical system can be provided in the optical system for exposure which condenses the irradiation light from the light source.

Figure 30:
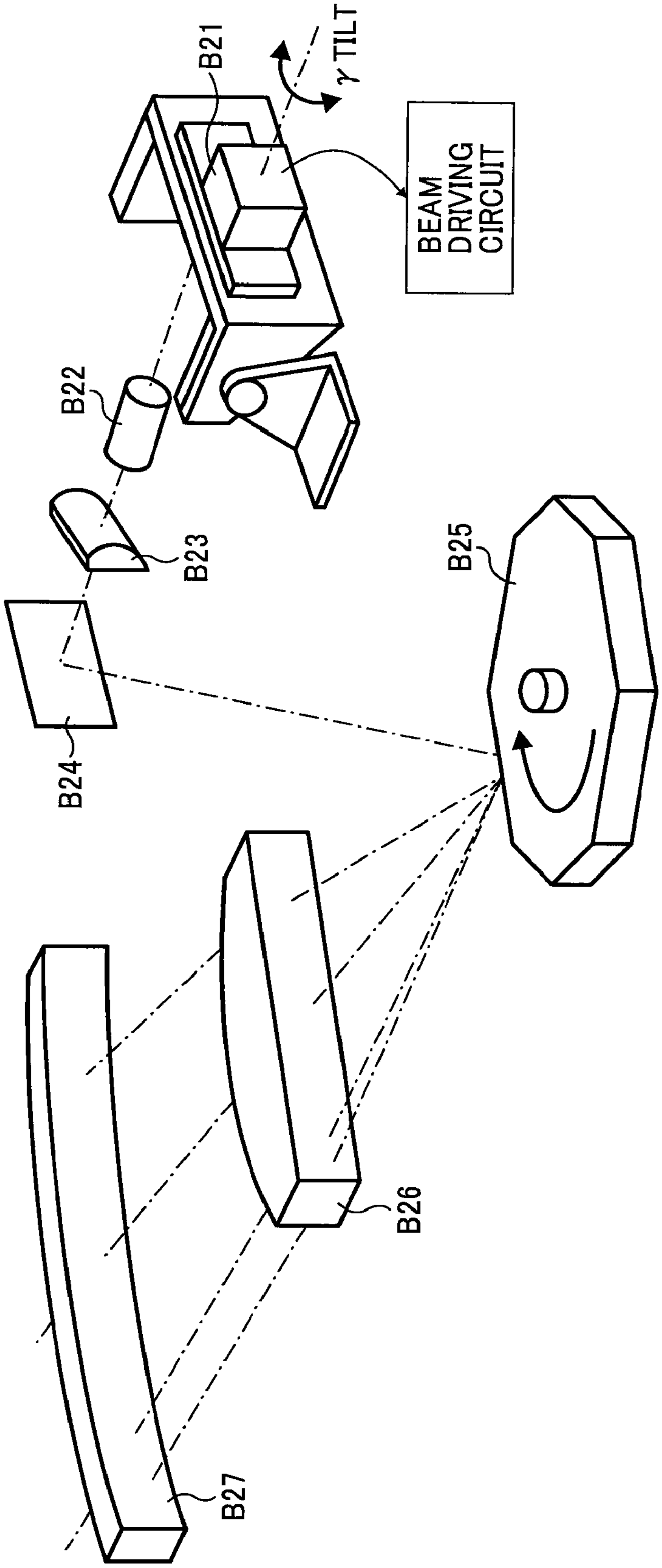
FIG. 30 is a view illustrating a typical structure of the optical unit for use in the electrostatic latent image measuring device and describing the attachment of the light source unit to the optical housing and the adjustment of the light source unit by a γ tilt adjustment mechanism.

FIG. 30 illustrates a typical structural example of the optical system.

As illustrated in FIG. 30, the optical system includes a light source B21, a collimator B22, a cylinder lens B23, a reflection mirror B24, a polygon mirror B25 (deflection unit), a toroidal lens B26, and an f-θ lens B27.

These are adopted structures which are similar to those in the writing unit of the image forming device.

By adopting the above-described structure, the condition of the actual image forming device can be reproduced in detail. Moreover, regarding the photoconductor onto which the latent image is formed, and the residual image is remains after developing the latent image, the developed residual image can be reproduced, the development is obtained, analyzed and the cause of the residual image can be examined.

Figure 31A:
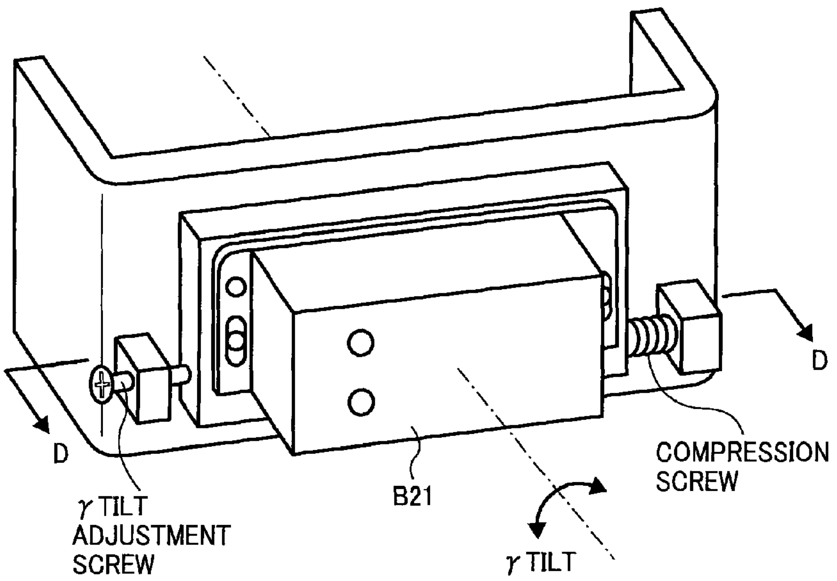
FIG. 31A is a view illustrating the light source unit of the optical scanning system.
Figure 31B:
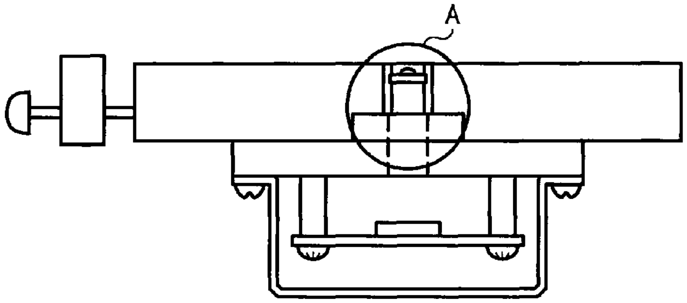
FIG. 31B is a view illustrating a structure by the cross-section of the D-D line of FIG. 31A when using a surface emitting laser array as the light source.
Figure 31C:
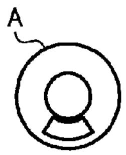
FIG. 31C is a detail view illustrating the A portion in FIG. 31B (coupling lens) as viewed from the optical axis direction.

FIG. 31 is a view illustrating the light source B21.

As the light source, a light-emitting diode, an LD, an LD array and the like can be used.

The mechanical shutter B7 can be provided in the joint portion of the optical system B2 and the outer tube B5 or the inner tube B6.

By this aperture stop, the irradiation onto the surface of the sample can be controlled even if light except for the scanning light occurs, and also the return of light to the light source by the reflection can be controlled.

(Movable Unit of Optical System B2)

Next, the movable unit of the optical system B2 according to the present embodiment will be described.

The optical system B2 as illustrated in FIG. 29A, 29B, 29C for use in the electrostatic latent image measuring device according to the present embodiment may includes microhead BM1 or a micrometer BM2 which are movable in the optical axis direction and the horizontal direction of the optical system B2.

The optical system B2 is disposed in the vacuum chamber B1 via the window provided in the shoulder portion of the vacuum chamber B1.

Since the optical system B2 is provided separately from the vacuum chamber B1, the rotation and the electromagnetic vibration, which occur in the optical system B2, associated with the scanning by the optical system, the deflection unit and the like are not transferred to the vacuum chamber B1.

Therefore, since the scanning can be conducted without affecting the photoconductor which is a sample, the scanning and sweeping in an arbitrary condition can be simply conducted on the surface of the sample in terms of developing and analyzing. Also, a phenomenon generated in the photoconductor can be measured and analyzed by various methods.

The optical system B2 for use in the electrostatic latent image measuring device according to the present embodiment is set such that the center of the scanning position or the scanning start position becomes a position which can irradiate from the direction of about 45° relative to the particle beam axis (or elevation angle from the setting position (X0, Y0, Z0) of the sample) as described above. Accordingly, in the optical system B2, the optical scanning can be freely conducted.

As illustrated in FIG. 29A, 29B, 29C, the optical system B2 includes a parallel movable section having a parallel fixed base B212 supported by a plurality of leg sections B211 and a guide rail B213 (first guide rail B213*a* and horizontal guide rail B213*b*) disposed on the fixed base B212, and a scanning axis direction movable section having a movable stage B214 which obliquely retains the optical system B2 movable along the guide rail B213 at about 45° relative to the horizontal direction and a guide rail (second guide rail B215*a* and 45° inclination guide rail B215*b*) B215 disposed on the movable stage B214.

The parallel movement distance of the parallel movement section is measured by the microhead or the micrometer BM1, BM2. The parallel movement section is thereby positioned.

By moving the optical system B2 in the optical axis direction, the focusing can be conducted and the beam shape or the beam spot shape can be adjusted.

This movement is conducted in the optical axis direction, and can be conducted in the movable direction of the labyrinth section B4, for example.

With a condition in which the inner tube B6 is completely contained in the labyrinth section B4 as a reference, as illustrated in FIG. 29C, if the length in the movable direction of the labyrinth section B4 is k, the maximum is k−δ (δ is larger than 0, about k/2 (about several millimeters)).

As described above, the fine adjustment of the movable section of the optical system B2 for use in the electrostatic latent image measuring device can be conducted in the horizontal direction or the optical axis direction of 45° elevation angle. FIG. 29B illustrates a main portion of the movable section which can move in the direction of a 45° elevation angle (optical axis direction).

As illustrated in FIG. 29B, the movement of the movable direction in the horizontal direction is conduced by moving the movable stage B214 on the fixed base B212.

For example, the adjustment of the movement in the optical axis direction illustrated by the arrow b in FIG. 29B can be conducted by the micrometer BM1 disposed in the portion of 45° elevation angle illustrated in FIG. 29A.

By appropriately adjusting the micrometer BM1 attached to the movable section of the elevation angle 45°, the optical system B2 slides on the guide rail B215*a*, 215*b* together with the movable section, so that the spot size on the sample is changed.

As described above, the micrometer BM1 disposed in the direction of 45° elevation angle can adjust the focal point direction.

The micrometer BM1 is loaded at least in a part by its own weight, so that looseness of the movement of the optical system B2 is extremely small. Therefore, the optical system moves with highly accuracy.

In this embodiment, similar to the movement in the horizontal direction, since the number of positioning and focusing is less, it is not necessary to consider the friction by the load to the micrometer or the microheads BM1, BM2.

In this embodiment, the own weight of the micrometer BM1 attached to the movement section of 45° elevation angle can be adjusted to be appropriately reduced by means of a known method.

The optical system B2 can move in the parallel direction along the first guide rail B213*a* on the fixed base B212.

The distance relative to the particle beam axis (vertical axis) can be changed by the movable portion including the optical system B2 on the first guide rail B213*a*.

This movement can be performed by using the micrometer BM2 disposed in the movable section which is movable in the horizontal direction in FIG. 29A.

In FIG. 29A, the optical axis moves in the right-lateral direction of the plane of paper relative to the position where the particle beam axis and the optical axis cross (X0, Y0, Z0) while maintaining its angle.

In FIG. 29B, as an example of the movable section, an example in which the second guide rail 215*a* and the guide rail 215*b* inclined at 45° are different to each other is illustrated, but another known guide rail can be used for the movable section.

In this case, an appropriate known guide rail can be adopted, which does not impose the load of the guide rail to the micrometer or the microhead.

Hereinafter, the usage example of the electrostatic latent image measuring device according to the present invention will be described.

However, the present invention is not limited to a scope described in these embodiments.

Hereinafter, an embodiment using the electron gun B11 as the charged particle optical system B10 will be described.

However, as described above, in the present invention, various devices can be used as the charged particle optical system B10, and the electron beam for use in this embodiment belongs to the scope of the present invention even if it is substituted by an irradiator of a positive electric charge beam.

Figure 32:
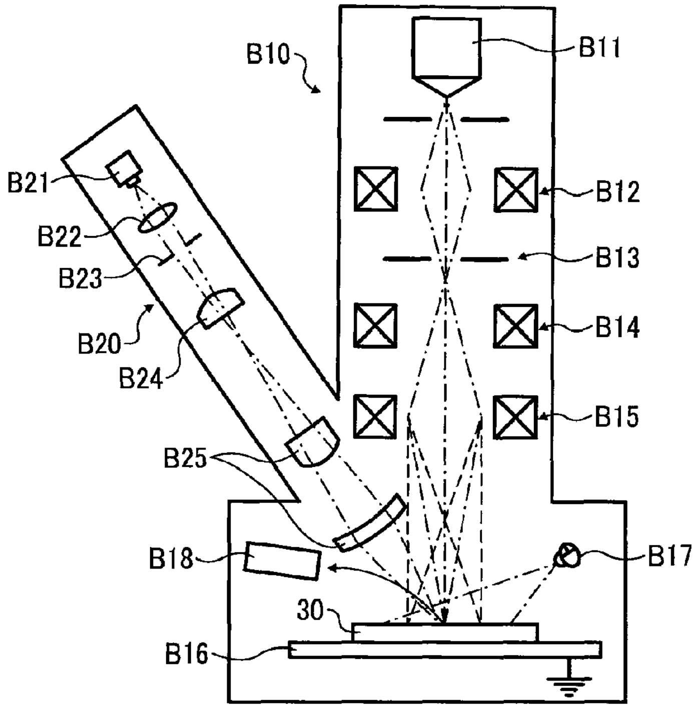
FIG. 32 is a view illustrating a spectrographic arrangement of the optical system during exposure, and the irradiation system of the charged particle irradiation unit of the latent image measuring device when using the electrostatic latent image measuring device according to the embodiment of the present invention.

As illustrated in FIG. 32, the charged particle optical system B10 includes the electron gun B11, which generates an electron beam, the condenser lens B12, which condenses the electron beam emitted from the electron gun B11, the beam blanking electrode B13 for the ON/OFF of the electron beam, the scanning lens B14 for scanning the electron beam which has passed through the beam blanking electron B13, and the objective lens B15 for re-condensing the electron beam which has passed through the scanning lens B14.

The scanning lens B14 is a so-called deflection coil.

A power source for driving (not shown) is connected to each of the lenses.

When an ion beam is used, a liquid metal ion gun can be used or an ion gun using gas such as hydrogen, oxygen, nitrogen and noble gas as an ion source can be used instead of the electron gun.

When using the electron beam as the charged particle beam, the secondary electron detector B18 can be used as a detector. In particularly, a scintillator, a photoelectron multiplier (PMT) or the like can be used as the detector.

When a charged particle except for an electron is used, a detector such as a semiconductor detector, a photoelectron multiplier (PMT) or a scintillator can be used.

The optical system B20 includes the light source B21, the collimator B22, the aperture stop B23, the cylinder lens B24, and the focusing lens B25. The optical system B20 can form a beam profile at a predetermined beam diameter on the photoconductor sample B30 placed on the sample stage B16.

As the light source B21, an LD (laser diode) or an LD array can be used.

By controlling the light source B21 with the LD controller, the irradiation can be conducted in an appropriate exposure time.

In order to form a line pattern made of an electrostatic latent image on the photoconductor sample B30, a scanning mechanism using a galvano mirror and a polygon mirror can be provided in the optical unit of the optical system B20.

These can be used as a reflection mirror by fixing those without scanning.

Figure 35:
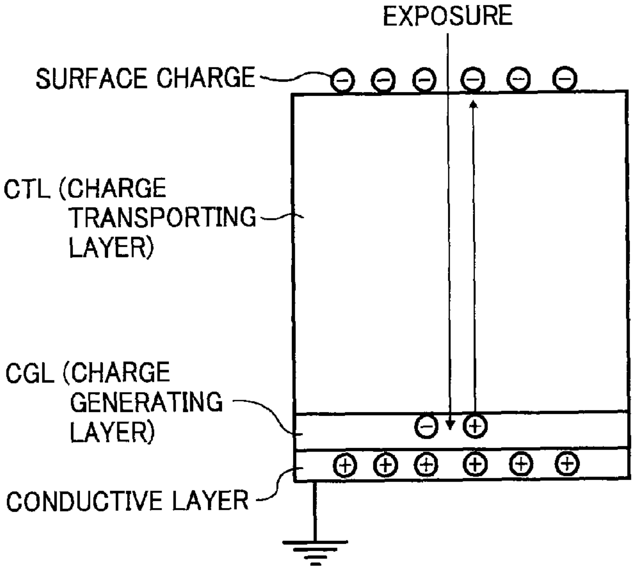
FIG. 35 is an enlarged sectional view illustrating an example of the structure of the photoconductor as an object to be measured in the present invention.

The structure of the photoconductor of the photoconductor sample B30 is not limited. For example, as illustrated in FIG. 35, a photoconductor having on a conductive supporting body a charge generating layer (CGL) and a charge transporting layer (CTL) is used as a sample.

Such a sample includes, for example, a cylindrical or a belt-shaped photoconductor. Moreover, the sample includes a part of a photoconductor which is cut to an appropriate size.

If the charged surface of the photoconductor sample is exposed, the light is absorbed by the charge generating material (CGM) of the charge generating layer (CGL), thus, the positive and negative charged carriers are generated (hv→p+e: however, p is a positive carrier and e is a negative carrier).

One of the carriers is supplied to the charge transporting layer (CTL) and the other is supplied to the conductive supporting body by an electric field.

The carrier supplied to the charge transporting layer (CTL) moves in the CTL and reaches the surface of the CLT by the electric field. Then, the carrier combines with the electric charge on the surface of the photoconductor, and disappears.

The electric charge distribution is thereby formed on the surface of the photoconductor. Namely, an electrostatic latent image is formed.

Next, a method of measuring an electrostatic latent image will be described together with the operation example of the electrostatic latent image measuring device with reference to FIG. 32.

At first, an electron beam is irradiated on the photoconductor sample B30 by the charged particle optical system B10.

Figure 33:
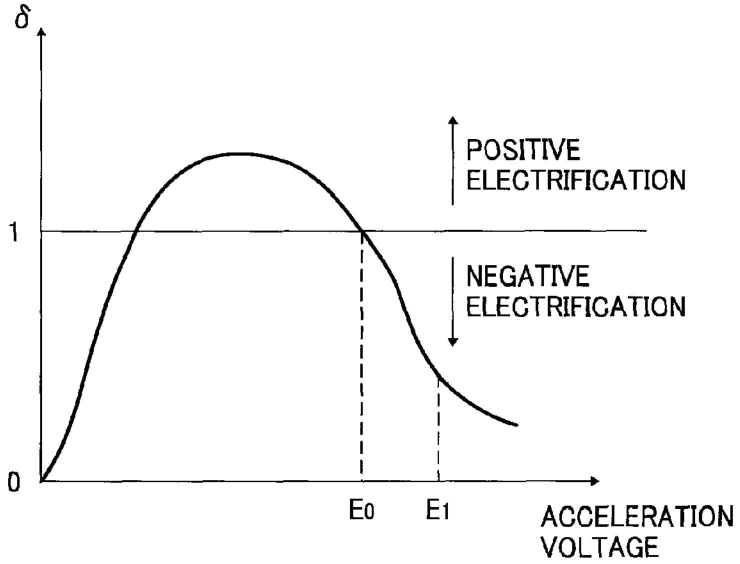
FIG. 33 is a graph illustrating the relationship between the acceleration voltage and the secondary-emission coefficient δ when the charged particle beam irradiation unit is an electron gun in the electrostatic latent image measuring device according to the embodiment of the present invention.

FIG. 33 illustrates a relationship between the acceleration voltage and the secondary-emission coefficient δ.

By setting the acceleration value E1 to the acceleration value higher than the acceleration value E0 in which the secondary-emission coefficient δ becomes 1, the number of the incident electrons exceeds the number of emission electrons, so that the electrons are accumulated in the photoconductor sample B30, resulting in the charging-up phenomenon.

As described above, the photoconductor sample B30 is uniformly and negatively charged.

In this case, appropriate values of the acceleration voltage and the irradiation time are set for the photoconductor, so that a desired electric charge potential can be formed according to the photoconductor.

The electrostatic latent image measuring device according to the embodiment can be used as the charging-up device of the photoconductor as described above.

Accordingly, the uniform condition of the electric charge distribution of the charged-up photoconductor sample B30 can be output as an image.

A different type of photoconductor can be measured, or the process in which the electric charge distribution disappears with time can be tracked by an image (transient image) with an electron microscope (or electric field microscope).

If a desired charged potential is formed, the electron beam is turned off.

Next, the photoconductor sample B30 having an electric charged potential is exposed by the optical unit of the optical system B20.

The optical system B20 is adjusted to form a desired beam diameter and a beam profile.

In this embodiment, the charged area or the exposed area provided in the photoconductor is contained in another area.

In accordance with a purpose, by setting the size of the charged area different from the size of the exposed area, or by setting the size of the charged area the same as the size of the exposed area, an intended phenomenon can be generated on the photoconductor.

As described above, the photoconductor sample B30 of the sample is exposed by the optical system B20 as described above, and the electrostatic latent image can be formed on the photoconductor sample B30.

The electrostatic latent image measuring device of the present invention can be used as a device which reproduces (achieves) a latent image of a photo conductor.

After forming the electrostatic latent image, the mode of the device is changed to the observation mode.

In the observation mode, while scanning by the electron beam, the photoconductor sample B30 is irradiated, the emitted secondary electron is detected by the detector B18 such as a scintillator or a photomultiplier (PTM), and an electric potential contrast image is observed by converting the detected electron into an electric signal.

In order to convert the electric potential contrast image into an electric potential, a conversion table presenting the correlation between the electric potential and the signal intensity is previously prepared. The electric potential is calculated from the signal intensity according to the table.

A method which applies a known reference potential in the electron beam scan area compares the signal intensity of the secondary electron with the reference potential, and calculates the electric potential distribution, can be used.

Figure 36:
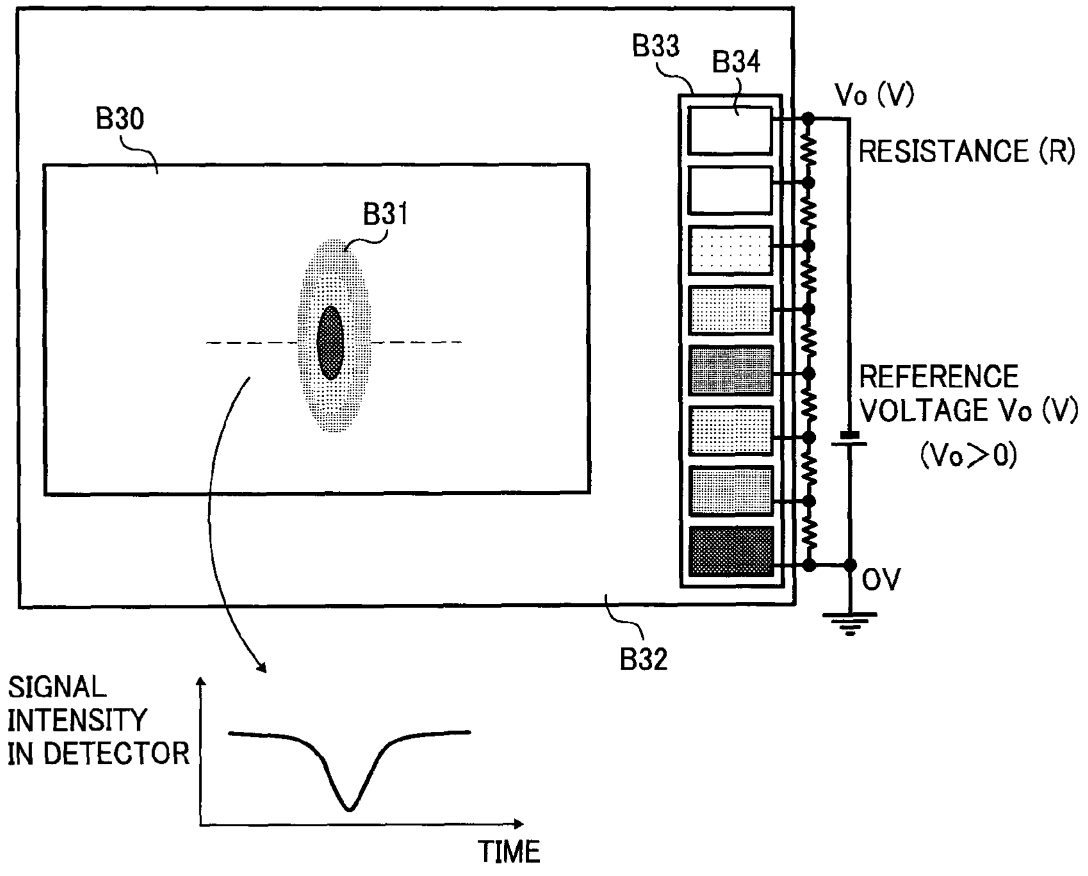
FIG. 36 is a plan view illustrating a measurement example and an arrangement example of a reference potential in an electron beam scanning area when irradiating an electron beam from the charged particle beam irradiation unit.

Moreover, as illustrated in FIG. 36, a method which sets a reference electric potential to each of conductive bases B34 disposed on an insulation body B33 can be used as the method of setting a reference electric potential.

The voltage from the reference voltage source is divided by using a resistance, and the electric potential which becomes a reference is applied to each of the conductive bases B34.

Generally, a portion having a low electric potential has the emission amount of the secondary particles than that in a portion having a high electric potential, so that the image measured in the portion having a low electric potential becomes bright.

In the example illustrated in FIG. 36, a white portion illustrates a relatively low potential portion, and a black portion illustrates a high potential portion.

In FIG. 36, reference number B30 denotes the sample, reference number B31 denotes the electrostatic latent image and reference number B32 denotes the electron beam scanning area.

While scanning the surface of the photoconductor sample B30 by an electron beam, the secondary electron is detected by the secondary electron detector B18.

In this case, the change in the detection signal intensity is illustrated in the lower portion in FIG. 36 as the signal intensity of the detector.

When the signal intensity in the secondary electron detector B18 is changed by the setting condition, it can be appropriately corrected.

In addition, calibration can be conducted in advance.

Figure 37:
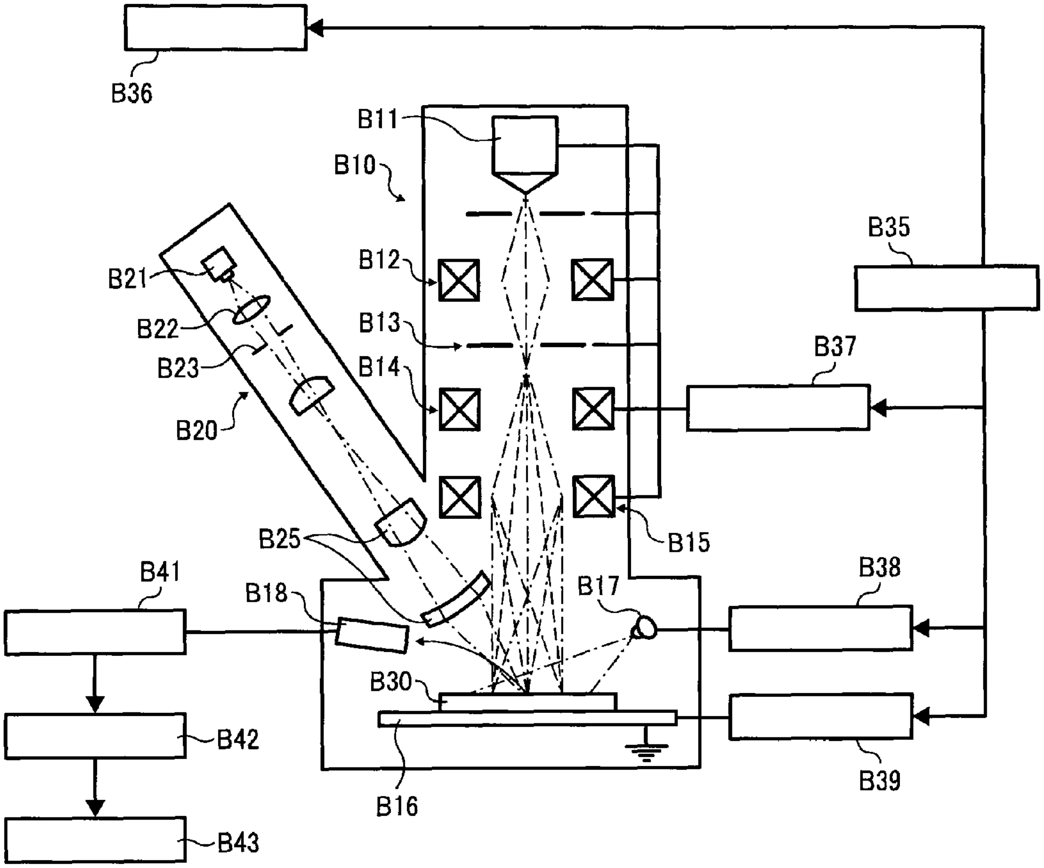
FIG. 37 is a block diagram illustrating a control system of each unit for use in the electrostatic latent image measuring device according to the embodiment of the present invention.
Figure 38A:
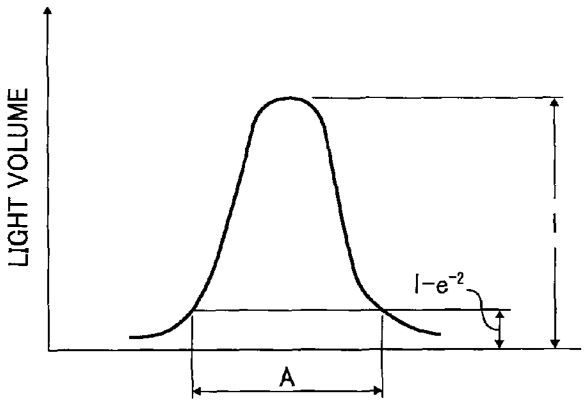
FIG. 38A is a graph illustrating the relationship between the beam spot diameter A and the beam spot light volume on the surface of the photoconductor.
Figure 38B:
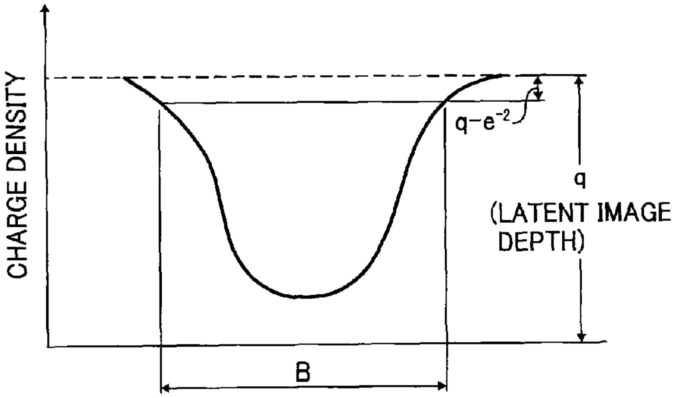
FIG. 38B is a graph illustrating the relationship between the latent image diameter B and the charge density up to the latent image depth q.
Figure 38C:
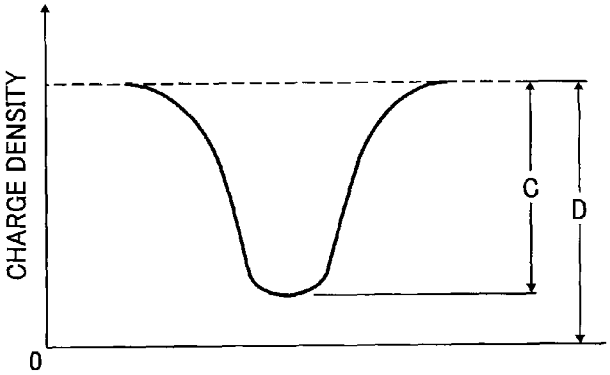
FIG. 38C is a graph illustrating the relationship between the absolute value C of the charged potential of the photoconductor and the charge density up to the latent image diameter D of one beam spot.

After the measurement is completed, the light source B17 for eliminating residual charge illustrated in FIG. 37 eliminates the residual charge on the photoconductor sample B30 by irradiating light onto the entire surface of the photoconductor sample B30 with an LED, for example.

FIG. 37 illustrates an example of a controller used in the above embodiment.

In FIG. 37, the controller according to the present embodiment includes an LD controller B36 which controls the light source B21, a charged particle controller B37 which controls the scanning lens B14, an LED controller B38 which controls a light source B17 for eliminating a residual charge, and a sample base controller B39 which controls the movement of the sample stage 16. These controllers are controlled by a main computer B35.

The output of the secondary electron detector B18 is detected by a secondary electron detecting section B41, the detected signal is processed by a signal processing section B42, and the secondary electron measuring result is output from a measuring result output section B43.

The secondary-emission coefficient δ is expressed by the following formula (1).

$$\text{Secondary-emission coefficient } \delta = \text{the number of emitted electrons/the number of incident electrons} \quad (1)$$

The secondary-emission coefficient δ is expressed by the above formula (1). It is more preferable to use the following formula (2) because it is necessary to consider the transmission electron and the reflection electron.

$$\text{The number of emitted electrons} = \text{the number of transmission electrons} + \text{the number of reflection electrons} + \text{the number of secondary electrons} \quad (2)$$

When positively charging, it is preferable to irradiate at an acceleration voltage in which the secondary-emission coefficient becomes 1 or more as illustrated in FIG. 33.

In a sample observation by a general SEM, it is general to observe under a condition of δ=1 in order to avoid the influence of charging-up, and an acceleration voltage except for that voltage is not used.

One feature of this embodiment is to form a charged electric potential by intentional charging-up.

In the above method, after forming the charged electric potential, the electron beam is once turned off. However, without turning off the electron beam, the voltage is changed to the acceleration voltage of δ=1, which does not generate the charging-up, and the exposure is conducted under that observation condition which does not generate the charging up.

As the charging method, another charging unit which has contact with a sample can be used.

In this embodiment, an LD array can be used as a light source.

Figure 39:
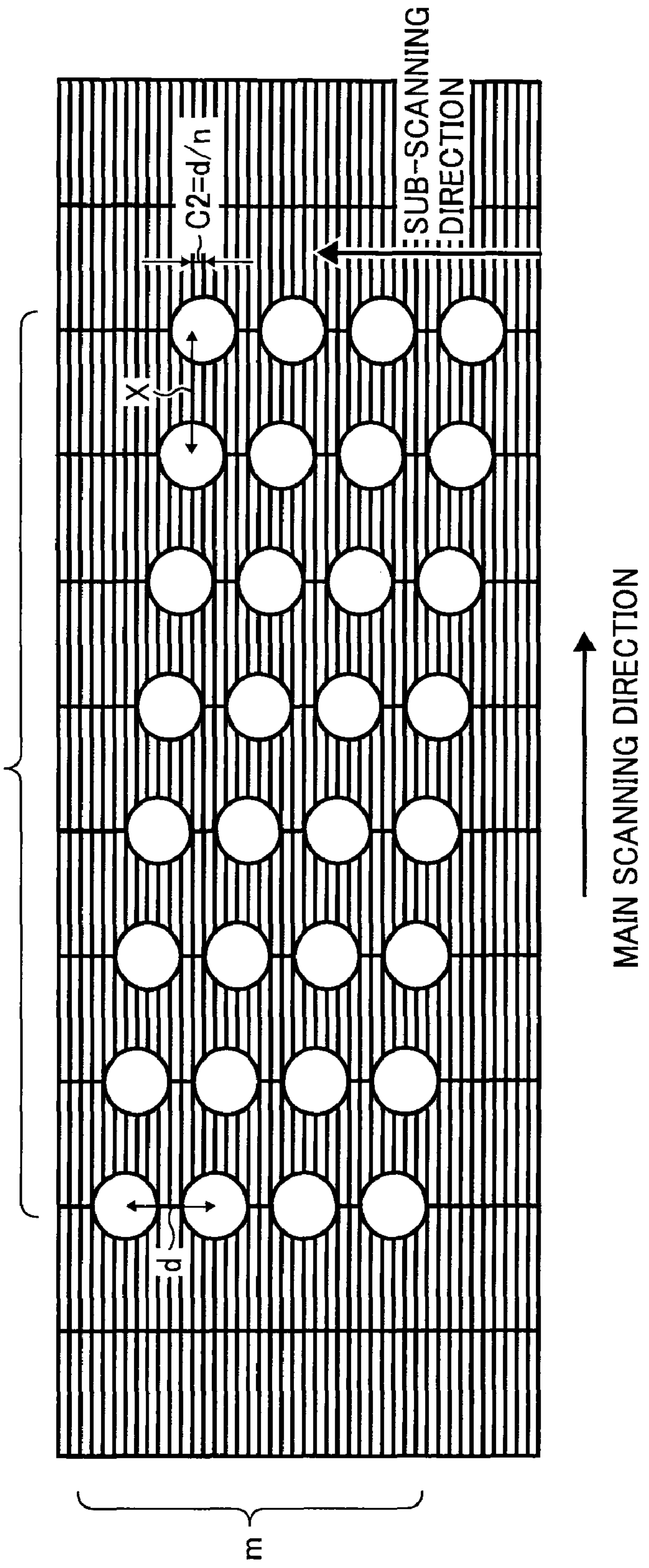
FIG. 39 is a schematic plan view illustrating an arrangement example when adopting a surface emitting laser array as the optical system for exposure in the electrostatic latent image measuring device according to the embodiment of the present invention.

As illustrated in FIG. 39, a 4×8 array can be used, for example.

In this array, the elements are arranged with equal intervals (d: an interval between elements next to each other in the sub-scanning direction) in the sub-scanning direction, and the positional relationship in the sub-scanning direction is an equal interval c=d/n.

Moreover, the elements are also arranged with equal intervals (x: an interval between elements next to each other) in the main-scanning direction in the array.

Especially, in this case, d is 18.4 μm and X is 30 μm.

C=18.4/2.3 μm.

As illustrated in FIG. 39, each element can be disposed to slightly incline in the main-scanning direction, for example.

Such adjustment can be conducted by adjusting γ tilt illustrated in FIG. 31A.

In the example illustrated in FIGS. 31A, 31B, the adjustment of the y tilt angle (for example, 5 degrees or below, or about 3 degrees) is conducted by means of a γ tilt adjustment screw, but another means g can be used.

By this adjustment, the substantially same positions on the sample on the same scanning lines can be multiply exposed.

In this embodiment, if the element intervals d, X are applied to the conventional example, C=d/n=18.4/4=4.6 μm. Therefore, the interval between each element in the sub-scanning direction is 50% when taking the vertical line down in the sub-scanning direction from the center of each element in the array. Even if the element interval in the plane is the same, high density can be obtained.

Each of element intervals d, X can be determined in view of the heat interference from another element in an array in the operation except for the restrictions of the above process.

The element interval in the main-scanning direction, which does not affect the increase in the density in the sub-scanning direction, is increased, so that the influence of the heat interference between the elements can be reduced, and a space required for wiring each element can be ensured.

Moreover, the threshold can be reduced by the improvement in the closing of carriers and the increase in the gain by a distortion quantum well active layer. Therefore, the reflection rate on the light taking-out side DBR (Distributed Bragg Reflector) can be reduced, so that the output can be further improved.

As illustrated in FIGS. 29A, 29B, 29C, the electrostatic latent image measuring device includes a laser scanning unit (exposure optical system), a vacuum chamber, and a connection section. The laser scanning unit (exposure optical system) is substantially horizontally-disposed and has an opening in the one end side. The vacuum chamber has inside thereof the vacuum sample stage, and is disposed in a position lower than the laser scanning unit (exposure optical system) for scanning the sample placed on the vacuum sample stage by the transmittance section disposed on the shoulder section of the vacuum chamber. The vacuum chamber is also disposed such that the opening side of the laser scanning unit faces the transmittance section. The connection is disposed to connect the end portion of the opening side of the laser scanning unit and the transmittance section.

The connection section has an outer light-shielding tube, an inner light-shielding tube and a glass member (window plate). The outer light-shielding tube has one end side connected to the side end section of the opening, and is inclined. The inner light-shielding tube has one end inserted in a circular concave groove provided in the end face of the lower side of the outer light-shielding tube and the other end inserted into the vacuum chamber. The glass member is inserted in the other end side of the inner light-shielding tube to surround the other end side of the inner light-shielding tube.

As described above, the connection between the outer light-shielding tube and the inner light-shielding tube includes a labyrinth structure in which the one end of the inner light-shielding tube is inserted into the circular concave groove provided in the end face of the lower side of the outer light-shielding tube, and the outside light is completely blocked.

The entire optical system is covered. The outer light-shielding tube and the mechanical shutter are integrated, so that the outside light and the offset light in addition to the scanning light are blocked.

In this embodiment, as a light source unit for the optical scanning system of the electrostatic latent image measuring device, it is preferable to use a surface-emitting laser array. The structure of the light source unit will be described with reference to FIG. 31.

The surface-emitting laser array is fastened on the control base in a state packaged by a cover glass and the like.

The control base is fastened (screwed) to the boss of the coupling lens holder such that the surface-emitting laser array corresponds to the optical axis.

The opposite side of the control base attachment section of the coupling lens is provided with a fitting section of the optical housing and a fan-shaped projection. The coupling lens is bonded by using a UV hardening bond with an optical axis collimating adjuster or the like.

FIG. 30 is a view describing the attachment of the light source unit to the optical housing and the adjustment by the γ tilt adjustment mechanism.

The optical unit is previously biased in the counter-clockwise direction by a compression spring, and the optical unit is defined at the tilt angle (γ) by the adjustment screw from the biased condition.

In order to adjust the pitch on the image face of the light emitting points arranged in 4×8, the entire light source unit is tilted.

The overlapping condition of beam spots and the reciprocity failure phenomenon in which the concentration changes although the product of the exposure energy and the exposure time are constant can be experimentally changed, so that the quantitative analysis can be conducted.

The optical system is fastened on the parallel movement stage, moves in the horizontal direction by the driving controller such as a stepping motor (not shown), and conducts simultaneous scanning. Accordingly, two-dimensional scanning can be conduced by laser light.

Referring to the acceleration and the deceleration time of the stepping motor, by setting the space in the light-shielding section to the required distance+the acceleration and deceleration distance or more, the writing can be conducted at a constant velocity.

The required distance for this device is several millimeters, so that the writing can be conducted at a constant velocity.

The distance to the image face is constant and the diameter of the beam spot is constant, so the writing can be conducted with high accuracy.

The optical system is disposed without having contact with the vacuum chamber, so the vibration which occurs when driving the light deflector such as a polygon scanner does not directly disperse to the vacuum chamber.

Moreover, if a damper is inserted between the structure body and the vibration eliminating stage, the vibration control effect can be further improved.

By scanning the sample state provided in the vacuum chamber while driving in a direction orthogonal to the scanning beam, the two-dimensional scanning can be achieved even in a condition in which the parallel movement stage is stopped.

When an experimental measurement is conduced by this device, a scanning frequency and a linear velocity are determined according to a necessary writing density, and the exposure energy is varied as a parameter. Thereby, various events can be reproduced on the photoconductor or measured.

As described above, the electrostatic latent image measuring device according to the present embodiment includes the vacuum chamber, the optical system for exposure, and the sample stage which is located in a predetermined position in the vacuum chamber. The operation section of the sample stage has contact with the vacuum chamber and is provided under the outside atmospheric pressure. The sample placed on the sample stage is located in a predetermined position under high vacuum by the operation portion. The optical system is provided separately from the vacuum chamber. The scanning light from the optical system enters from the window provided in the shoulder section of the vacuum chamber, and scans the sample in the vacuum chamber by the deflection scanning unit of the optical system. Accordingly, the laser light of the optical system is guided into the vacuum chamber and scans the sample while blocking the outside light from the outside of the electrostatic latent image measuring device. The size of the electrostatic latent image measuring device is not limited compared to the device in which the optical system is disposed inside the vacuum chamber. The electrostatic latent image has a high degree of freedom of the arrangement.

In addition, the laser light scanning unit for use in the image forming device is shared, so that costs can be reduced.

The optical system includes the adjuster which adjusts the irradiation position from the light source which irradiates from the elevation angle of about 45° relative to the sample place in the chamber, so that the scanning can be conducted.

The optical system also includes the adjuster which adjusts the scanning light in a predetermined area. The optical system can be adjusted in the incident axis direction or the horizontal direction, so that the two-dimensional scanning using the vacuum stage, which can be offset according to the size and the observation position of the sample, can be conducted without causing the deterioration of the vacuum degree and the contamination of the inside by the lubricant of the driving source.

The light-shielding unit includes the first and second light-shielding units. The first light-shielding units include a plurality of cylindrical sections each having a different diameter, and the second light-shielding unit includes a cylindrical member which is inserted between the cylindrical sections. The central axis of the cylindrical sections coincides with the central axis of the cylindrical member. Preferably, the connection section of the first and second light-shielding sections is a labyrinth structure. The flexible light-shielding member is inserted between the first and second light-shielding sections.

The flexible light-shielding member is made of an elastic body or a rubber-coated unwoven cloth. Therefore, various events can be reproduced on the photoconductor while maintaining a high vacuum degree and the events can be analyzed.

The device including the electrostatic latent image measuring device and the unit for scanning by a charged particle beam can be provided. The device generates the charged distribution on the sample by scanning the surface of the sample provided in the vacuum chamber with the charged particle beam, and measures the surface of the sample according to the detection signal obtained by scanning the surface of the sample provided in the vacuum chamber of the electrostatic latent image measuring device with the charged particle beam scanning unit. The charged sample is scanned and exposed by the optical system of the electrostatic latent image measuring device, and the electric distribution generated thereby is measured.

After that, the various conditions which can occur on the photoconductor in the cleaning process or the like are generated, and the various conditions can be analyzed.

In the image forming device having the photoconductor evaluated by the electrostatic latent image forming device, the wavelength of the writing light source is 780 nm or below, the beam spot diameter on the surface of the photoconductor is 60 μm or below, the following formula (3) is satisfied where the beam spot diameter on the surface of the photoconductor is A and the latent image diameter to be formed is B.

$$1.0<B/A<2.0 \tag{3}$$

Thereby, the electrostatic latent image is diffused, the narrow latent image is controlled, the prompt deterioration of the photoconductor by the excessive exposure can be controlled, the environmental load can be reduced by extending the operating time of the photoconductor, and a high density, high tone and sharp final output image can be obtained.

In the image forming device, the writing light volume is set to satisfy the following formula (4), where the absolute value of the charged electric potential of the photoconductor is C and the depth of the latent image of one beam spot is D.

$$0.7<D/C<0.9 \tag{4}$$

Thereby, the reproducibility of one beam spot is improved, and a final output image having a high concentration, tone and sharpness can be achieved without reducing the durability of the photoconductor.

Figure 34:
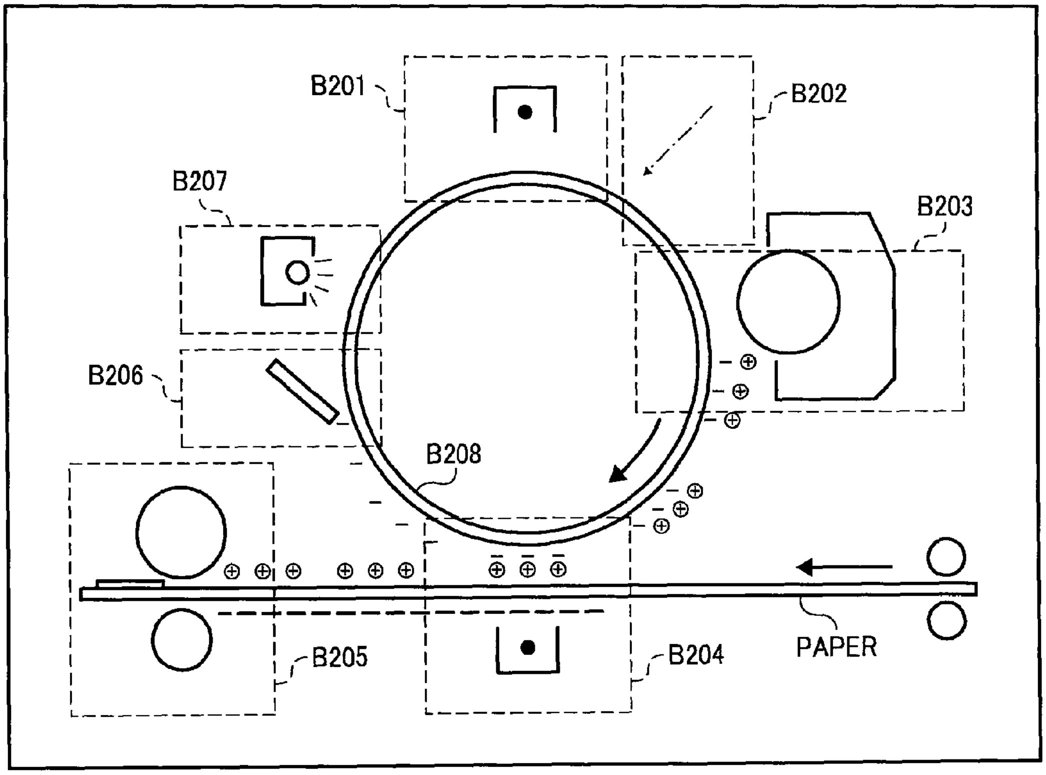
FIG. 34 is a lateral view illustrating a schematic structure of an image forming device using a photoconductor as an object to be measured in the present invention.

The example of the above image forming device is illustrated in FIG. 34.

The image forming device is one example of a general printer, and includes an electrostatic charger B201, an exposing unit B202, a development unit B203, a transfer unit B204, a fuser unit B205, a cleaning unit B206, an electric elimination unit B207, and a photoconductor B208 cylindrically formed as a photoconductive medium.

The conductor having a composition which is the same as the composition of the sample evaluated by the measuring method for a surface potential distribution or the electrostatic latent image measuring device according to the present invention is used for this photoconductor B208.

In this embodiment, by evaluating the measuring method for a surface potential distribution or the electrostatic latent image measuring device according to the present invention on the photoconductor B208, the process for forming a latent image can be quantitatively analyzed. Therefore, the exposure amount can be optimized, the charging and exposure conditions which do not increase load to the photoconductor can be obtained, and the energy saving and high durability can be achieved.

Moreover, in order to increase the quality of the output image, the decrease in the beam spot diameter to 60 μm or below is attempting by reducing the wavelength of the light source to 780 nm or below.

By the low sensitivity of the present photoconductor to the short wavelength and the small diameter beam, the influence of the scattering light and the diffusion of charge are increased in the photoconductor, and the depth of the latent image is reduced. Therefore, a final output image having a high tone, sharpness and stability can not be obtained.

The beam spot diameter in this case is defined by the diameter in the range in which the beam spot light volume distribution is the maximum light volume of $e^{-2}$ or more.

It is known that the composition and thickness of the charge generating layer affects the light scattering and the diffusion degree of the charge, and the composition of the charge transporting layer affects the sensitivity, but the clear correlation is unknown.

Consequently, the photoconductor is formed by changing the composition and the thickness of the charge transporting layer and the composition of the charge generating layer, when the exposure and the latent image measurement is conducted in the measuring method for the surface electric potential distribution and the electrostatic latent image measuring device in this embodiment in the conditions for use in the image forming device, for example, the charge electric potential of 800V, the exposure energy of 4 $mJ/m^2$, the light source wavelength of 680 nm or below, and the beam spot diameter of 60 μm or below, if the photoconductor which satisfies the following formula (5) is selected when the beam spot diameter on the surface of the photoconductor is A the latent image diameter to be formed is B, a final output having a high tone, sharpness and stability can be achieved.

$$1.0<B/A<2.0 \tag{5}$$

In this case, the lower limit of 1.0 is the principle limit because the light scattering and the electric charge diffusion occur in any photoconductor. The upper limit of 2.0 is a necessary limit for ensuring the high tone, sharpness and stability for the final output image.

Moreover, when the absolute value of the charging potential of the photoconductor is C (V), the latent image depth of one beam spot is D (V), if the writing light volume is set to satisfy the following formula (6), the reproducibility of one beam spot is improved, and the durability of the photoconductor is not deteriorated.

$$0.7<D/C<0.9 \tag{6}$$

In this case, the lower limit of 0.7 is a necessary latent image depth for effectively developing one beam spot, and the upper limit of 0.9 is a limit in which the early deterioration of the photoconductor is concerned when the light which increases the depth of the latent image more than this upper limit is irradiated.

The electrostatic latent image diameter is actually measured by the electrostatic latent image measuring device according to the present invention, and the photoconductor is evaluated by the electrostatic latent image measuring device according to the present invention. Therefore, the exposure amount can be optimized, and the wasted energy consumed by the excessive exposure can be controlled.

Moreover, the charging and exposure conditions which do not increase the load to the photoconductor are obtained, and the operating life of the photoconductor can be extended.

The image forming device can be a multi-beam by providing a plurality of light sources in the laser scanning unit.

Furthermore, a plurality of toner images each having a different color can be formed by using a plurality of laser scanning units and photoconductors, and a color image can be formed by overlapping the images.

According to one embodiment of the present invention, the semiconductor laser is used as the light source of the optical system, and the luminous flux irradiates the sample from the outside of the electron beam scanning area, so that the offset emission by the bias current of the LD light source can be shielded.

If the shutter mechanism is provided for shielding the offset emission from the bias current of the LD light source, a predetermined electrostatic latent image can be formed; as a result, the electrostatic latent image can be measured in a high resolution of micron-order.

If the unit which opens the shutter in conjunction with the synchronization signal of the optical system is provided, the shutter can be opened at the most appropriate time, so that the electrostatic latent image can be measured in a high resolution of micron-order.

If the unit which opens the shutter and then closes the shutter after forming the electrostatic latent image with the synchronization signal of the optical system as a trigger signal is provided, the opening time of the shutter can be minimized, so that a predetermined electrostatic latent image can be formed. As a result, the electrostatic latent image can be measured in a high resolution of micron-order.

In addition, by optimizing a time from the beginning of the opening of the shutter to the beginning of the exposure by the LD, a predetermined electrostatic latent image can be formed. As a result, the electrostatic latent image can be measured in a high resolution of micron-order.

As the shutter mechanism, a mechanical shutter can be used. Thereby, the offset emission can be shielded at high speed without deteriorating the wave front of the transmitted light of the laser light.

Furthermore, by disposing the shutter mechanism outside the vacuum chamber for controlling the electromagnetic change, the orbit curve of the scanning electron beam by the change in the neighboring magnetic electron field can be controlled.

By providing the unit for measuring in the condition having an area where the velocity vector of the sample of the incident charged particle in the vertical direction reverses, the quantification measurement of the electric potential depth can be conducted, and the electric potential distribution can be measured with high accuracy.

The LD light source is used as the light source for the optical system, and the shutter mechanism for shielding the offset emission by the bias current of the LD light source is provided. Thereby, a predetermined electrostatic latent image can be formed. As a result, the electrostatic latent image can be measured in a high resolution of micron-order.

By evaluating the electrostatic latent image formed on the photoconductor with the above-described measurement device and measurement method, the feedback can be conducted on the design of the image forming device, and the quality of each process can be improved.

Thereby, the latent image carrier and the optical system for exposure having a high quality, a high durability, a high stability and high energy conservation can be provided.

Moreover, according to the image forming device having the latent image carrier and the optical system for exposure, the electrostatic latent image to be formed on the image carrier is developed and visualized, so that the image forming device having a high concentration, a high image and a high durability can be provided.

The present invention can be applied to the image forming device having the optical system of a multi-beam such as VCSEL, in which an image having uneven concentration likely occurs.

The latent image patterns having known intervals are formed on the surface of the sample according to the present invention, and the patterns are loaded as image data. Thereby, the coordinates of the sample relative to the change in the observation area by the charge can be measured without damaging the sample, and the measurement of the electrostatic latent image can be measured with high accuracy.

As the unit for forming the latent image patterns having known measurement, the unit for projecting and exposing the mask pattern having the known measurement is used, so that the measurement of the electrostatic latent image can be measured with high accuracy.

By forming two or more latent image patterns having known intervals on the surface of the sample, and calculating the central position from the loaded image data, the average magnification can be measured, and the measurement of the electrostatic latent image can be measured with high accuracy by correcting the central position.

By forming three or more latent image patterns having known pitches on the surface of the sample in line, the local magnification change can be corrected, and the local change associated with the uneven charging can be preferably corrected.

By using the laser scanning unit which scans at a constant velocity to the surface of the photoconductor sample, arbitrary latent image patterns can be easily formed by changing an electric signal.

In addition, the optical system to be evaluated can be shared.

By setting the exposure energy density to 0.5-10 mJ/m$^2$, and one latent image size to 10 μm or more and 100 μm or below, the central position from the latent image patterns can be measured with high accuracy.

The LD light source is used as the light source for the optical system, and the shutter mechanism for shielding the offset emission by the bias current of the LD light source is provided. Thereby, a predetermined electrostatic latent image can be formed. As a result, the electrostatic latent image can be measured in a high resolution of micron-order.

By measuring the coordinate of the sample relative to the change in the observation area by the charging, the measurement of the electrostatic latent image can be measured without damaging the sample.

According to the present invention, the electrostatic latent image measuring device, the electrostatic latent image measuring method and the image forming device which can preferably reproduce various events generated on the sample, and can analyze the events on the reproduced sample, can be provided.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An electrostatic latent image measuring device comprising:

a charged particle optical system which irradiates an electron beam and charges a photoconductor sample;

an exposure optical system which forms an electrostatic latent image on a surface of the photoconductor sample; and a scanning unit which scans the surface of the photoconductor sample by the electron beam, a distribution of the electrostatic latent image on the surface of the sample being measured by a signal detected by the scanning, wherein the exposure optical system includes a semiconductor laser as a light source, and the optical system includes a shutter which shields offset emission by a bias current of the semiconductor laser.

2. The electrostatic latent image measuring device according to claim 1, wherein a luminous flux of the light source is irradiated outside an electron beam scanning area of the photoconductor sample.

3. The electrostatic latent image measuring device according to claim 1, further comprising a unit which opens the shutter in connection with a synchronization signal of the exposure optical system.

4. The electrostatic latent image measuring device according to claim 3, further comprising a unit which opens the shutter and closes the shutter after forming the electrostatic latent image with the detected synchronization signal of the exposure optical system as a trigger signal.

5. The electrostatic latent image measuring device according to claim 1, further comprising a unit which illuminates the semiconductor laser Td+Tr late after receiving a synchronization signal as a trigger output, where a time to start opening the shutter after detecting the synchronization signal is Td and a time to open an effective diameter of a laser light after the start of the opening of the shutter is Tr.

6. The electrostatic latent image measuring device according to claim 1, wherein a condition, Tr<Tf*Pon/Poff is satisfied, where one scanning time by the exposure optical system is Tf, the light volume of the offset emission by the bias current when turning off the semiconductor laser is Poff, and the light volume when illuminating the semiconductor laser is Pon.

7. The electrostatic latent image measuring device according to claim 1, wherein the shutter is a mechanical shutter.

8. The electrostatic latent image measuring device according to Claim 1, further comprising a unit which measures the distribution of the electrostatic latent image under a condition having an area where a component in a normal direction of the surface of the photoconductor sample of a speed of the incident charged particle reverses.

9. An electrostatic latent image measuring device, comprising:

a unit which irradiates an electron beam to a photoconductor sample within a vacuum chamber, and charges the photoconductor sample;

an exposure optical system which forms an electrostatic latent image on a surface of the photoconductor sample, the surface of the sample being scanned by the electron beam, and a distribution of the electrostatic latent image of the surface of the photoconductor sample being measured by a signal detected by the scanning;

a unit which forms a pattern of the electrostatic latent image having a known size on the surface of the photoconductor sample by irradiating light whose wavelength is 400-800 nm;

a unit which loads a latent image obtained as the electrostatic latent image; and a unit which measures coordinates of the photoconductor sample, and wherein the exposure optical system is disposed outside the vacuum chamber.

10. The electrostatic latent image measuring device according to claim 9, further comprising a unit which projects and exposes a mask pattern having a known size as the unit which forms the pattern of the electrostatic latent image having a known size.

11. The electrostatic latent image measuring device according claim 9, wherein two or more latent image patterns having a known interval on a sample are formed, and an average magnification is calculated from the loaded image data.

12. The electrostatic latent image measuring device according to claim 11, wherein three or more latent image patterns having a known pitch on the sample are formed in line, and a local change in a magnification is measured from the loaded image data.

13. The electrostatic latent image measuring device according to claim 9, wherein a pattern of a latent image having a known interval is formed by using a laser light scanning unit which performs optical scanning at a constant speed to the photoconductor sample by deflecting a luminous flux from a light source at an equal angular speed by a light deflector having a deflection and a reflection face and condensing the deflected luminous flux as a light spot on a surface to be scanned by an optical system for scanning and focusing, and a coordinate of the sample is calculated from data into which the latent image obtained as the electrostatic latent image is loaded.

14. An electrostatic latent image measuring device comprising:

a charged particle optical system which irradiates an electron beam and charges a photoconductor sample;

an exposure optical system which forms an electrostatic latent image on a surface of the photoconductor sample; and a scanning unit which scans the surface of the photoconductor sample by the electron beam, a distribution of the electrostatic latent image on the surface of the sample being measured by a signal detected by the scanning, wherein the exposure optical system includes a semiconductor laser as a light source, and the optical system includes a shutter which shields offset emission by a bias current of the semiconductor laser, and wherein the shutter is disposed outside a vacuum chamber so as to control noise by a change in an electromagnetic field.

* * * * *